(12) United States Patent
Back et al.

(10) Patent No.: US 12,522,560 B2
(45) Date of Patent: Jan. 13, 2026

(54) QUATERNARY AMMONIUM COMPOUNDS

(71) Applicant: SPECIALTY OPERATIONS FRANCE, Lyons (FR)

(72) Inventors: Olivier Back, Lyons (FR); Sergio Mastroianni, Lyons (FR)

(73) Assignee: SPECIALTY OPERATIONS FRANCE, Lyons (FR)

( * ) Notice: Subject to any disclaimer, the term of this patent is extended or adjusted under 35 U.S.C. 154(b) by 1022 days.

(21) Appl. No.: 17/618,107

(22) PCT Filed: Jun. 16, 2020

(86) PCT No.: PCT/EP2020/066649
§ 371 (c)(1),
(2) Date: Dec. 10, 2021

(87) PCT Pub. No.: WO2020/254337
PCT Pub. Date: Dec. 24, 2020

(65) Prior Publication Data
US 2022/0306570 A1  Sep. 29, 2022

(30) Foreign Application Priority Data

Jun. 19, 2019 (EP) .................... 19305787

(51) Int. Cl.
*C07C 229/12* (2006.01)
*C07C 219/06* (2006.01)
*C07C 219/08* (2006.01)
*C07C 219/16* (2006.01)
*C11D 1/62* (2006.01)

(52) U.S. Cl.
CPC .......... *C07C 229/12* (2013.01); *C07C 219/06* (2013.01); *C07C 219/08* (2013.01); *C07C 219/16* (2013.01); *C11D 1/62* (2013.01)

(58) Field of Classification Search
None
See application file for complete search history.

(56) References Cited

U.S. PATENT DOCUMENTS

| | | |
|---|---|---|
| 3,974,224 A | 8/1976 | Waldmann |
| 5,851,982 A | 12/1998 | Sakata |
| 5,858,960 A | 1/1999 | Conroy |
| 10,035,746 B2 | 7/2018 | Back |
| 2013/0338210 A1 | 12/2013 | Manoharan |
| 2018/0093936 A1 | 4/2018 | Back |

FOREIGN PATENT DOCUMENTS

| | | |
|---|---|---|
| CN | 107353216 A | 11/2017 |
| DE | 1149363 B | 5/1963 |
| DE | 3402146 A1 | 7/1985 |
| EP | 721936 A1 | 7/1996 |
| GB | 941752 A | 11/1963 |
| JP | H08198828 A | 8/1996 |
| JP | H08198827 A | 9/1996 |
| JP | H08232168 A | 9/1996 |
| JP | H09105076 A | 4/1997 |
| JP | H09195167 A | 7/1997 |
| KR | 20060060776 A1 | 6/2006 |
| WO | 9708284 A1 | 3/1997 |
| WO | 2018033607 A1 | 2/2018 |
| WO | 2018087179 A1 | 5/2018 |

OTHER PUBLICATIONS

Machine translation of JPH08198827 (JP '827), obtained Jan. 22, 2025 (Year: 2025).*
Machine translation of JPH09105076 (JP '076), obtained Jan. 22, 2025 (Year: 2025).*
Kenji Mori, Narshinha P. Argade—Pheromone Synthesis, CLXIII. Synthesis of (9Z,25S,26R,43Z)-25,26-Epoxy-9,43-henpentacontadiene and Its Antipode, Components of the Nymph Recognition Pheromone Produced by Nymphs of the Cockroach Nauphoeta cinerea—European Journal of Organic Chemistry (1994), Issue 7, p. 695-700—DOI: 10.1002/jlac.199419940711.
T. G. Tomabene, S. P. Markey—Characterization of branched monounsaturated hydrocarbons ofSarcina lutea andSarcina flava—Lipids (1971) vol. 6, No. 3, pp. 190-195—DOI: 10.1007/BF02533037.
G.B.V. Subramanian, Alka Mehrotra, Kalpana Mehrotra—Enamine condensation on derivatives of aleuritic acid and synthesis of (Z)-9-tricosene (muscalure), its (E)-isomer, and (E)-13-heptacosene—Tetrahedron (1986) vol. 42, No. 14, pp. 3967-3972—DOI: 10.1016/S0040-4020(01)87551-7.
Baumann, C.; Becker, F.—Thermokinetics of reactions with liquidliquid phase separation—Ber. Bunsenges. Phys. Chem. (1996 )vol. 100, Iss. 8, 1335-1340—DOI: 10.1002/bbpc.19961000811.
R Garcia, M Martinez, J Aracil—Enzymatic esterification of an acid with an epoxide using an immobilized lipase from Mucor miehei as catalyst: Optimization of the yield and isomeric excess of ester by statistical analysis—Journal of Industrial Microbiology and Biotechnology (2002) vol. 28, Issue 3, pp. 173-179—DOI: 10.1038/sj.jim/7000218.

(Continued)

Primary Examiner — Amy C Bonaparte
(74) Attorney, Agent, or Firm — Osha Bergman Watanabe & Burton LLP

(57) ABSTRACT

The invention concerns new quaternary ammonium compounds with surfactant properties and improved biodegradability.

(I)

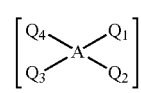

(II)

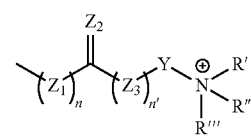

6 Claims, No Drawings

(56) References Cited

OTHER PUBLICATIONS

Kimberly Sloan Stakleff, Fei Lin, Laura A. Smith Callahan, Mary Beth Wade, Andrew Esterle, James Miller, Matthew Graham, Matthew L. Becker—Resorbable, amino acid-based poly(ester urea)s crosslinked with osteogenic growth peptide with enhanced mechanical properties and bioactivity—Acta Biomaterialia (2013) vol. 9, Issue 2, pp. 5132-5142—DOI: 10.1016/j.actbio.2012.08.035.

B. S. Lele, M. A. Gore, M. G. Kulkarni—Direct Esterification of Poly (Ethylene Glycol) With Amino Acid Hydrochlorides—Synthetic Communications (1999) 29:10, 1727-1739—DOI: 10.1080/00397919908086160.

H Grano, J Yli-Kauhaluoma, T Suortt, J Kaki, K Nurmi—Preparation of starch betainate: a novel cationic starch derivative—Carbohydrate Polymers (2000) vol. 41, Issue 3, pp. 277-283—DOI: 10.1016/S0144-8617(99)00146-0.

V. L. Hansley—The Preparation of High Molecular Weight Acyloins—J. Am. Chem. Soc. (1935) 57, 11, 2303-2305—DOI: 10.1021/ja01314a076.

Earle Van Heyningen—The Acyloin Condensation of Aralkyl Esters—J. Am. Chem. Soc. (1952) 74, 19, 4861-4864—DOI: 10.1021/ja01139a038.

Marijke Van der Steen, Christian V. Stevens, Yves Eeckhout, Laurent De Buyck, Franco Ghelfi, Fabrizio Roncaglia—Undecylenic acid: A valuable renewable building block on route to Tyromycin A derivatives—Eur.J. Lipd Sci. Technol. (2008) vol. 110, Issue 9, pp. 846-852—DOI: 10.1002/ejlt.200800024.

E.K. Oikonomou—Fabric Softener-Cellulose Nanocrystal Interaction: A Model for Assessing Surfactant Deposition on Cotton—J. Phys. Chem. B (2017) 121(10):2299-2307. doi: 10.1021/acs.jpcb.7b00191.

Abramson F B; Barlow R B; Mustafa M G; Stephenson R P—Relationships between chemical structure and affinity for acetylcholine receptors—British Journal of Pharmacology (1969) vol. 37, NR:1, pp. 207-233—DOI: 10.1111/j.1476-5381.1969.tb09539.x.

\* cited by examiner

QUATERNARY AMMONIUM COMPOUNDS

This application is a U.S. national phase entry under 35 U.S.C. § 371 of International Application No. PCT/EP2020/066649, filed on Jun. 16, 2020, which claims priority to EP application No. 19305787.4 filed on Jun. 19, 2019. The entire contents of these applications are explicitly incorporated herein by this reference.

The present invention relates to new quaternary ammonium compounds, in particular new quaternary ammonium compounds derived from internal ketones obtained from fatty acids or their derivatives and the use of the new compounds as surfactants.

Fatty quaternary ammonium compounds which have surfactant properties and can be used in respective applications have been described in the literature and are available commercially in a variety of different types from various suppliers.

WO 97/08284 discloses compositions comprising Guerbet alcohol betaine esters which are represented by the general formula

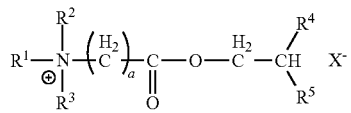

in which $R^1$ to $R^3$ are independently selected from $C_1$ to $C_4$ alkyl groups or $C_2$-$C_4$ alkenyl groups, a is from 1 to 4 and $R_4$ and $R_5$ are independently selected from $C_{12}$ to $C_{22}$ alkyl or alkenyl groups, the sum of chain lengths of $R_4$ and $R_5$ preferably being at least 30. Since the compounds are derived form Guerbet alcohols, the number of carbon atoms in groups $R_4$ and $R_5$ differs always by 2.

EP 721 936 is related to liquid quaternary ammonium compounds of the general formula

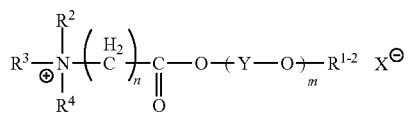

wherein $R^{1-2}$ is a linear or branched $C_{36}$-$C_{44}$ alkyl or alkenyl group, $R_2$ to $R_4$ are $C_1$-$C_5$ alkyl or hydroxyalkyl groups, Y is a linear or branched $C_2$-$C_4$ alkylene group, m is a number of 0 to 20 and n is an integer of 1 to 6. Preferred compounds of EP 721 936 are, as in WO 97/08284, derived from Guerbet alcohols and are represented by the formula

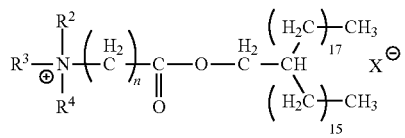

DE 3402146 relates to quaternary ammonium compounds. As in WO 97/08284 and EP 721 936, the compounds comprise two long chain substituents which are esters of Guerbet acids.

While fatty quaternary ammonium compounds are widely used as surfactants, there is still a need for compounds of this type having a good combination of surfactant properties on one hand and biodegradability on the other hand. Biodegradability has become more and more important in the recent past due to the desire of customers to have more environmentally friendly products. The improvement in biodegradability should not negatively affect the surfactant properties.

It was thus an object of the present invention to provide new quaternary ammonium compounds with good surfactant properties and a good biodegradability.

This object is achieved with the compounds of formula (I). Preferred embodiments of the present invention are also detailed hereinafter.

The novel ionic compounds in accordance with the present invention have the general formula (I)

wherein A is a tetravalent linker selected from the group consisting of A-1 to A-6,

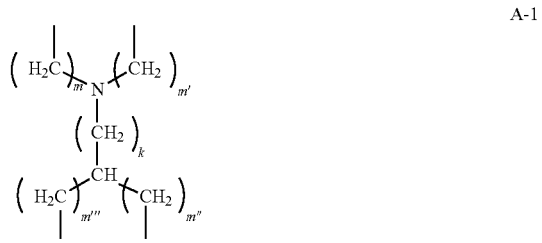

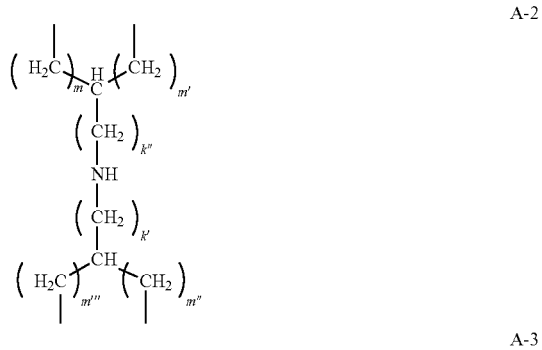

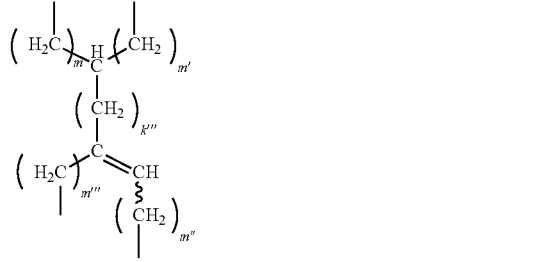

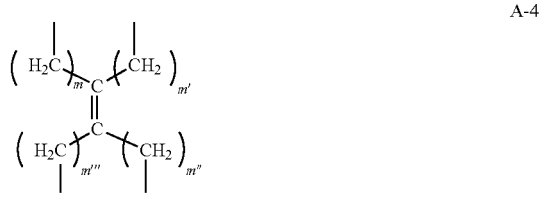

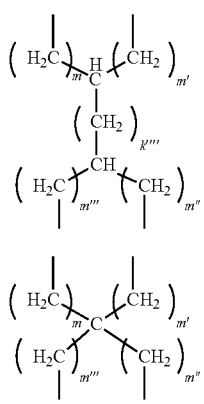

A-5

A-6

$Q_1$ to $Q_4$, which may be identical or different from each other, are selected from the group consisting of hydrogen, R and X, wherein R, which may be the same or different at each occurrence, is a $C_5$-$C_{27}$ aliphatic group, preferably a $C_6$ to $C_{24}$ aliphatic group, m, m', m" and m'", which may be the same or different at each occurrence, are 0, 1, 2 or 3, k, k', k", k'" and k"", which may be the same or different, are 0, 1, 2 or 3, and X, which may be the same or different at each occurrence, is represented by formula II

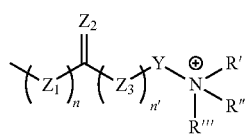

(II)

wherein $Z_1$, $Z_2$ and $Z_3$, which may be the same or different, are O, S or NH, Y is a divalent $C_1$-$C_6$ aliphatic radical, R', R" and R'", which may be the same or different, are hydrogen or a $C_1$ to $C_4$ alkyl group, n and n' are 0 or 1 with the sum of n+n' being 1 or 2, wherein at least one of $Q_1$ to $Q_4$ is represented by X and at least two of groups $Q_1$ to $Q_4$ are represented by R, which groups R may be the same or different at each occurrence, and wherein, if the ionic compound is such that (i) A is represented by A-6 with m, m', m" and m'" equal to 0, (ii) one and only one of $Q_1$ to $Q_4$ is represented by a substituent X and n in the substituent X is equal to 0 and (iii) two and only two of $Q_1$ to $Q_4$ are represented by substituents R, then the difference of the number of carbon atoms of the two substituents R is 0, 1, 3 or more than 3.

m, m', m", m'", which may be the same or different at each occurrence, are preferably 0, 1 or 2, even more preferably 0 or 1.

k, k', k'" and k"", which may be the same or different, are preferably 0, 1 or 2, even more preferably 0 or 1.

The novel compounds in accordance with the present invention are quaternary ammonium derivatives and comprise a tetravalent linker A and four substituents $Q_1$ to $Q_4$ which may be the same or different from each other at each occurrence. At least two of $Q_1$ to $Q_4$ are groups R, i.e. an aliphatic group comprising from 5 to 27, preferably from 6 to 24 carbon atoms.

The aliphatic groups R may be free of any double bond and of any triple bond. Alternatively, the aliphatic groups R may comprise at least one —C=C— double bond and/or at least one —C≡C— triple bond.

The aliphatic groups R are advantageously chosen from alkyl groups, alkenyl groups, alkanedienyl groups, alkanetrienyl groups and alkynyl groups.

The aliphatic groups R may be linear or branched.

Preferably, the aliphatic groups R are independently chosen from alkyl and alkenyl groups.

More preferably, the aliphatic groups R are independently chosen from alkyl and alkenyl groups, generally from $C_6$-$C_{24}$ alkyl and $C_6$-$C_{24}$ alkenyl groups, very often from $C_6$-$C_{21}$ alkyl and $C_6$-$C_{21}$ alkenyl groups and often from (i) $C_6$-$C_{19}$ alkyl and $C_6$-$C_{19}$ alkenyl groups or from (ii) $C_6$-$C_{17}$ alkyl and $C_6$-$C_{17}$ alkenyl groups. More preferably, R represent an alkyl group, generally a $C_6$-$C_{24}$ alkyl group, very often a $C_6$-$C_{21}$ alkyl group, often a $C_6$-$C_{19}$ alkyl group or a $C_6$-$C_{17}$ alkyl group. Aliphatic groups, in particular alkyl groups, with 10 to 20, preferably with 11 to 17 or with 10 to 17 carbon atoms have been found advantageous in certain cases.

Acyclic aliphatic groups, more preferably linear aliphatic groups, still more preferably linear alkyl groups may be mentioned as preferred examples of substituents R.

The number of carbon atoms of R can be even or odd and each group R can have the same number of carbon atoms or the number of carbon atoms of different groups R may be different.

If A is represented by A-6 with m, m', m" and m'" equal to 0, (ii) one and only one of $Q_1$ to $Q_4$ is represented by a substituent X and n in the substituent X is equal to 0 and (iii) two and only two of $Q_1$ to $Q_4$ are represented by substituents R, then the difference of the number of carbon atoms of the two substituents R is 0, 1, 3 or more than 3.

In the ionic compounds of the present invention at least one of substituents $Q_1$ to $Q_4$ is represented by a group X represented by formula (II) above.

In group X preferably at least one, more preferably at least two and most preferably all three of substituents $Z_1$, $Z_2$ and $Z_3$ are oxygen. Compounds in which all three substituents $Z_1$, $Z_2$ and $Z_3$ are oxygen are esters (n+n' is 1) or carbonate (n+n' is 2) derivatives.

n and n' can be 0 or 1 and the sum of n and n' is at least 1, preferably 1 or 2.

R', R" and R'", which may be the same or different, are preferably hydrogen or a $C_1$ to $C_4$ alkyl group, preferably methyl or ethyl, more preferably methyl. Preferably at least one, more preferably at least two, more preferably all three of R', R" and R'" are a $C_1$ to $C_4$ alkyl group, preferably methyl or ethyl, most preferably methyl.

Y is preferably an acyclic divalent aliphatic group, more preferably a linear divalent aliphatic group, still more preferably a linear alkanediyl (alkylene) group and preferably has 1 to 6, even more preferably 1 to 4 carbon atoms. In compounds where n' is 1, aliphatic group Y preferably has at least two carbon atoms, in particular 2 to 6 carbon atoms.

In accordance with another preferred embodiment, the compound of the present invention comprises one or two groups X and two and only two groups R.

In a first group of preferred compounds of the present invention, A is represented by A-6, m, m', m" and m'" are 0, $Z_1$ to $Z_3$ are O and the compounds comprise two groups R and one group X. In a preferred subgroup of this embodiment, n is 0 and n' is 1 or n is 1.

In a second group of preferred compounds, A is represented by A-3 or A-4, m, m', m", m''' and k''' are 0 and two of substituents $Q_1$ to $Q_4$ are represented by groups X with both X attached to the same carbon atom of linker A and two groups R attached to the same or to different carbon atoms of linker A.

In a third group of preferred compounds, A is represented by A-1, m and m' are 1, m" and m''' are 0, k is 0 and two substituents $Q_1$ to $Q_4$ are represented by groups X with both groups X being attached to the —(CH$_2$)$_m$— and —(CH$_2$)$_{m'}$— groups directly attached to the nitrogen atom of linker A.

In a fourth group of preferred compounds, A is represented by A-2, k' is 0, k" is 1, m is 1, m', m" and m''' are 0 and two of substituents $Q_1$ to $Q_4$ are represented by groups X attached to two adjacent carbon atoms of linker A; in other words, one first group X is attached to one first carbon atom of linker A and one other group X is attached to one other carbon of linker A, said first carbon atom of linker A and said other carbon atom of linker A being adjacent to each other.

In a fifth group of preferred compounds, A is represented by A-5, m, m', m", m''' and k"" are 0, two of substituents $Q_1$ to $Q_4$ are X with each methine group of linker A carrying one group X and one group R wherein X and R might be the same or different at each occurrence. In a preferred subgroup of this embodiment, n is 1, n' is 0, $Z_2$ is O and Y is CH$_2$. In a much preferred subgroup of this embodiment, n is 1, n' is 0, Z, and $Z_2$ are O and Y is CH$_2$.

The following compounds of formulae (IV) to (IX) represent particularly preferred groups of compounds in accordance with the present invention

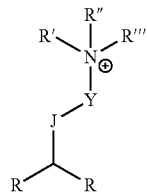
(IV)

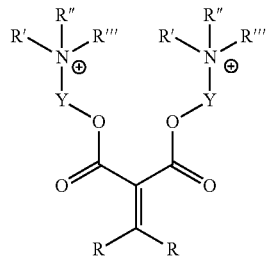
(V)

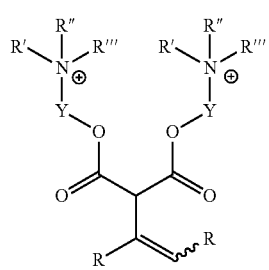
(VI)

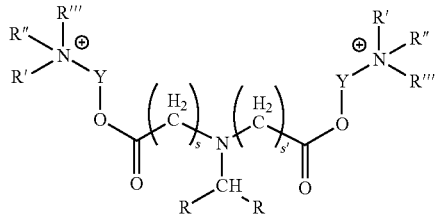
(VII)

with J being one of $J_1$, $J_2$ or $J_3$

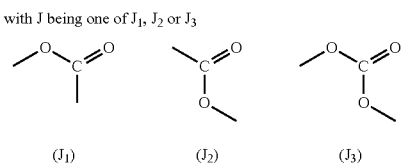

($J_1$)　　　　($J_2$)　　　　($J_3$)

wherein s and s', which may be the same or different, are 0, 1, 2 or 3,

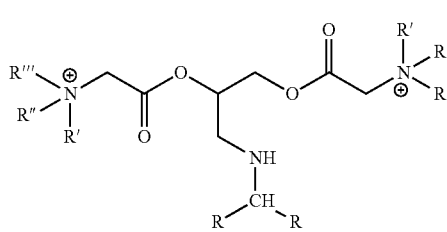
(VIII)

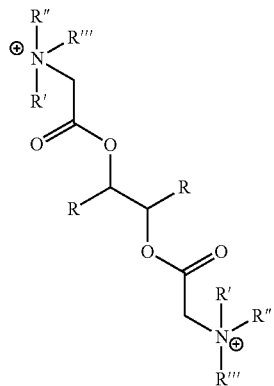
(IX)

R, R', R", R''' and Y in formulae (IV) to (IX) have the meaning as defined for formula (I) as described hereinbefore.

Compounds of formulae (X) and (XI), of which compounds of formulae (VIII) and (IX) respectively represent subsets, are also much preferred:

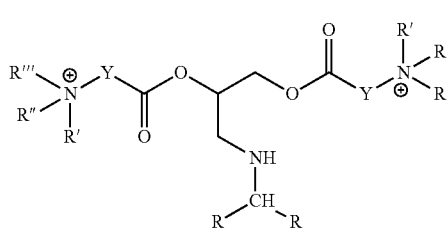
(X)

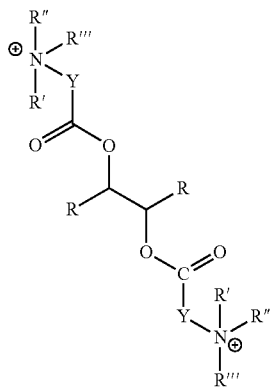
(XI)

R, R', R", R'" and Y in formulae (X) and (XI) have the meaning as defined for formula (I) as described hereinbefore.

Another embodiment of the present invention is directed to electroneutral compounds of formula (III)

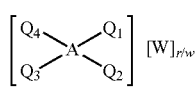
(III)

wherein A, $Q_1$ to $Q_4$ are as defined and described hereinbefore, W is an anion or an anionic group bearing w negative charges and r is the number of substituents $Q_1$ to $Q_4$ which are represented by a group X. Suitable anions or anionic groups W are e.g. halides such as chloride, fluoride, bromide or iodide, methyl sulfate or methosulfate anion ($CH_3$—$OSO_3$—), sulfate anion, hydrogensulfate anion ($HSO_4$) or an organic carboxylate anion such as acetate, propionate, benzoate, tartrate, citrate, lactate, maleate or succinate.

The compounds in accordance with the present invention can be obtained by a variety of different methods. Preferred processes for the manufacture of the compounds of the present invention include the reaction of an internal ketone of formula R—C(=O)—R, which internal ketone may preferably be obtained by decarboxylative ketonization of a fatty acid, a fatty acid derivative or a mixture thereof. A suitable process for the manufacture of internal ketones following this route is disclosed in US 2018/0093936 to which reference is made for further details.

The synthesis of various compounds of the present invention using internal ketones obtainable as indicated above as starting materials is now described. The process variants described hereinafter show the synthesis of specific compounds and the skilled person will modify the reactants and reaction conditions based on his professional knowledge and taking into account the specific target product of the respective synthesis to manufacture other compounds in accordance with the present invention.

Synthesis of Compounds Wherein a is A-6, Exemplary Shown for Compounds of Formula (IV) Wherein J is J1.

In a first exemplary process, an internal ketone R—C(=O)—R is first reacted with hydrogen (hydrogenation reaction) to afford a secondary alcohol. This alcohol is then reacted with carbon monoxide through a carbonylation reaction. The carbonylated product which is a carboxylic acid is then subjected to an esterification reaction with a quaternary ammonium salt (for example choline chloride) whereby water is split off and the desired compound of formula (IV) is obtained. Alternatively the carboxylic acid can be first condensed with an aminoalcohol (for example dimethylaminoethanol) through an esterification reaction (with water release) and the obtained aminoester can be quaternized with an alkylating agent.

The reaction scheme for the foregoing sequence of steps is as follows:

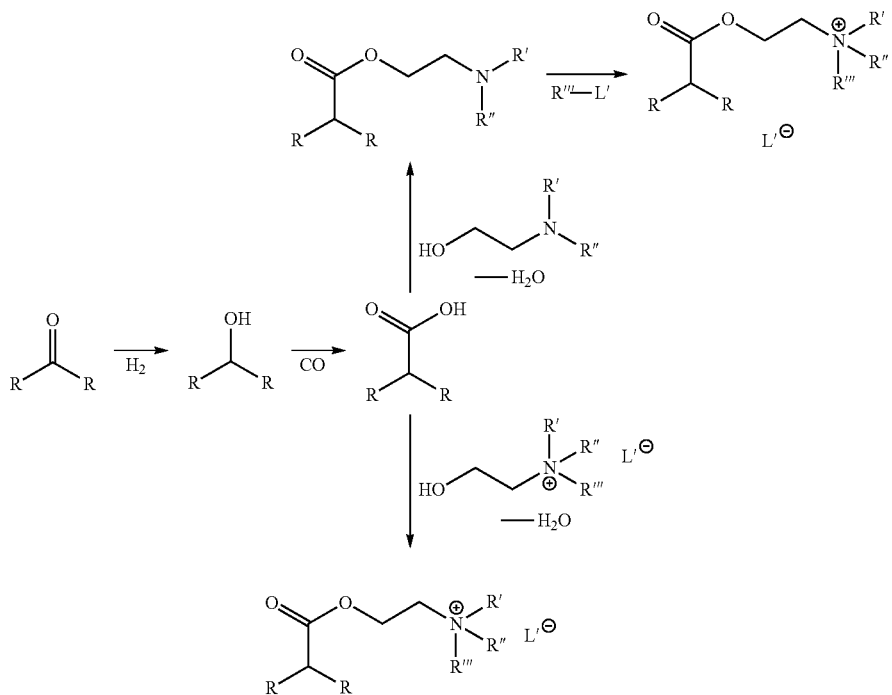

wherein L' is a monovalent leaving group such as e.g. a halide anion (in particular a chloride anion) or a methosulfate group.

The first step in the reaction scheme above comprises a reduction of the internal ketone to the secondary alcohol. This step is followed by a second transformation consisting of the insertion of carbon monoxide (the carbonyl group) to yield the carboxylic acid. Hydrogenation and carbonylation reactions of this general reaction sequence with active hydrogen and carbon monoxide respectively in the presence of suitable catalysts are known to the skilled person and have been described in the literature. The skilled person will select suitable catalysts and reaction conditions based on his professional knowledge taking into account the desired target compound so that no further details need to be given here.

An alternative route to compounds of formula (IV) comprises a hydrocyanation step and consists of the sequence: addition of HCN to the ketone to afford a hydroxynitrile intermediate. This hydroxynitrile is then dehydrated and hydrogenated in one step to afford a nitrile intermediate. This nitrile is then hydrated to afford a carboxylic acid intermediate. This carboxylic acid can be converted to the desired quaternary compound following the same way as described above. The reaction scheme for the foregoing sequence of steps is as follows:

to a secondary alcohol, followed by a carbonate interchange reaction involving dimethyl carbonate and the thus obtained secondary alcohol. Then a second carbonate interchange reaction with dimethylaminoethanol followed by quaternization yields the desired product.

In the first step, the hydrogenation of the internal ketone to the secondary alcohol can be carried out in an autoclave, preferably equipped with a stirring device (such as e.g. a Rushton turbine) without any added solvent. The internal ketone and a suitable catalyst (e.g. palladium or ruthenium metal on carbon) are introduced into the reactor which is thereafter sealed. Then the reactor is preferably purged with hydrogen. Then the temperature is increased above the melting point of the ketone (temperature usually in the range from 80 to 120° C.) and the mixture is stirred. The temperature is then increased to appr. 120 to 180° C. (preferably appr. 150° C.). and the mixture is stirred at such elevated temperature maintaining superatmospheric hydrogen pressure (10 to 80 bar) until completion of the reaction.

At the end of the reaction, the mixture is allowed to cool down to a temperature slightly above the melting point of the alcohol, the pressure is released and the catalyst can be filtered to obtain the secondary alcohol:

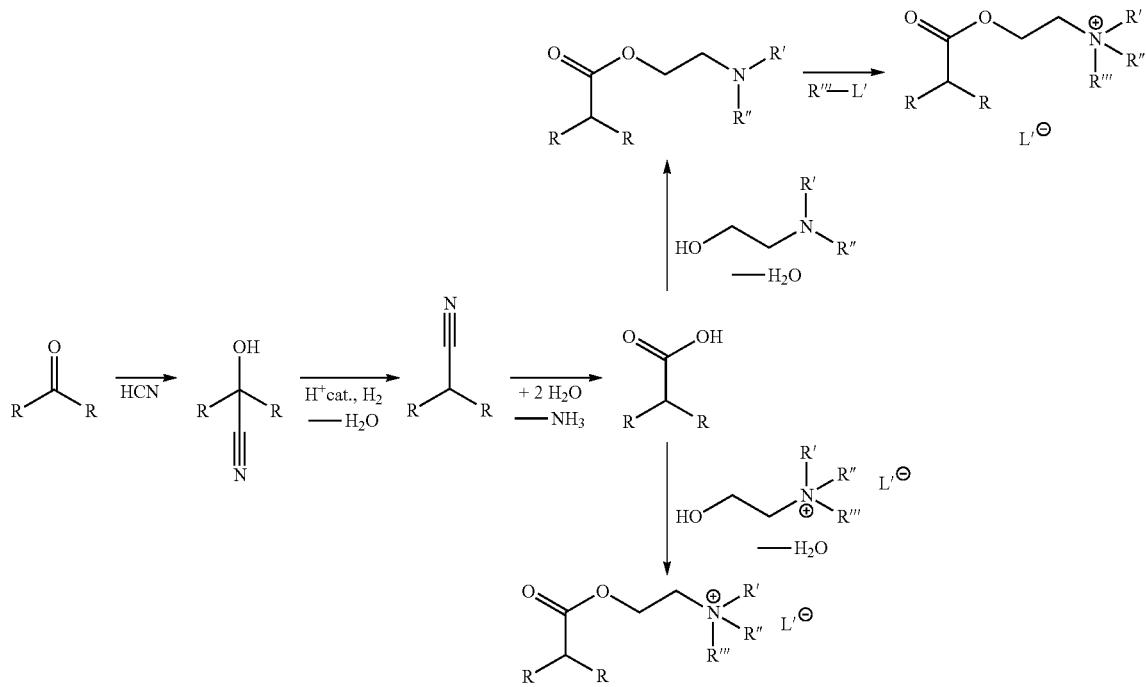

wherein L' is as defined hereinbefore.

As for the foregoing sequence of reactions, the individual reaction steps of this sequence have been described in the literature and are known to the skilled person. The skilled person will select suitable catalysts and reaction conditions based on his professional knowledge taking into account the desired target compound so that no further details need to be given here.

Synthesis of Compounds Wherein A is A-6 and J is J3

Compounds of this type may be obtained by a sequence of steps comprising the hydrogenation of an internal ketone

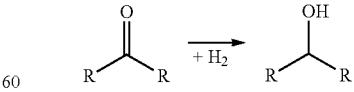

In the subsequent step, the secondary alcohol is carbonated to obtain a carbonate derivative. This step may be carried out e.g. in excess of a dialkylcarbonate $Alk^1$-O—C(=O)—O-$Alk^2$ wherein $Alk^1$ and $Alk^2$, which may the same or different, are an alkyl group having 1 to 8 carbon atoms, preferably an alkyl group having 1 to 4 carbon atoms which can act as the solvent with sodium methoxide (NaOMe) as the catalyst (generally used in amounts from 3 to 10 mol %, based on the amount of secondary alcohol). A preferred dialkylcarbonate is dimethylcarbonate (DMC) in which $Alk^1$ and $Alk^2$ are both methyl. Instead of above described dialkylcarbonate, the carbonation may be achieved with a carbonate bearing one or more aromatic groups (hereinafter, the "aromatic carbonate"); such a carbonate complies generally with the formula $Hyd^1$-O—C(=O)—O—$Hyd^2$ wherein $Hyd^1$ and $Hyd^2$, independently from each other, represent a $C_1$-$C_{18}$ hydrocarbyl group with the proviso that at least one of $Hyd^1$ and $Hyd^2$, possibly both, is an aromatic group; $Hyd^1$ and $Hyd^2$ may be notably chosen from alkyl groups having 1 to 8 carbon atoms, phenyl and phenyl groups substituted by at least one alkyl group having 1 to 4 carbon atoms, still with the proviso that at least one of $Hyd^1$ and $Hyd^2$ is an optionally substituted phenyl group. A carbonate complying with the formula $Hyd^1$-O—C(=O)—O—$Hyd^2$ of particular interest is diphenylcarbonate.

The reaction can be carried out by heating a mixture of the secondary alcohol in dialkylcarbonate or aromatic hydrocarbyl in the presence of the catalyst at a temperature preferably between 50° C. and 250° C. The aliphatic or aromatic alcohol which is generated as the by-product during the reaction can be distilled out during the reaction.

At the end of the reaction the dialkyl or aromatic dihydrocarbyl carbonate can be evaporated and the residue can be engaged as such in a second trans-carbonation reaction with dialkylaminoethanol.

This reaction step is shown in the reaction scheme below:

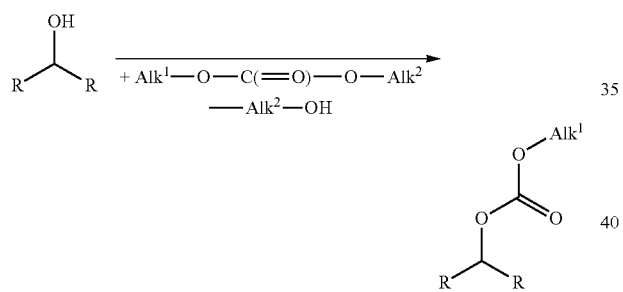

In the next step of the exemplary process, the secondary alcohol derived carbonate obtained as described above is reacted with a dialkylaminoethanol of formula HO—$CH_2$—$CH_2$—NR'R" (e.g. preferably dimethylaminoethanol, DMAE) according to the following reaction:

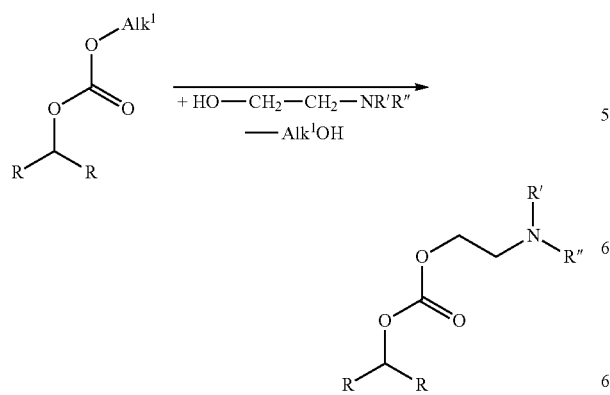

This second trans-carbonation can be conducted in a suitable solvent (e.g. toluene) using e.g. NaOMe as the catalyst (e.g. from previous step). The mixture of the starting asymmetrical alkyl or aromatic hydrocarbyl sec-alkyl carbonate, dialkylaminoethanol and catalyst in toluene is generally heated to appr. 120° C. During the reaction, the formed aliphatic or aromatic alcohol should be removed (e.g. through distillation). At the end of the reaction, the organic phase is usually washed with water to remove the catalyst and unreacted dialkylaminoethanol and the solvent is evaporated. The residue is re-dissolved in a suitable solvent (e.g. ethanol) in order to precipitate out the possibly formed fatty dialkyl carbonate. After filtration the product is obtained after solvent evaporation.

In the final step, the product obtained in the step described above is subjected to alkylation with e.g. an alkylating agent of general formula R'''-L" wherein L" is a monovalent anion or anionic group (such as e.g. methosulfate), preferably a dialkylsulfate, even more preferably dimethylsulfate (DMS), to obtain the desired quaternary ammonium derivative in accordance with the present invention:

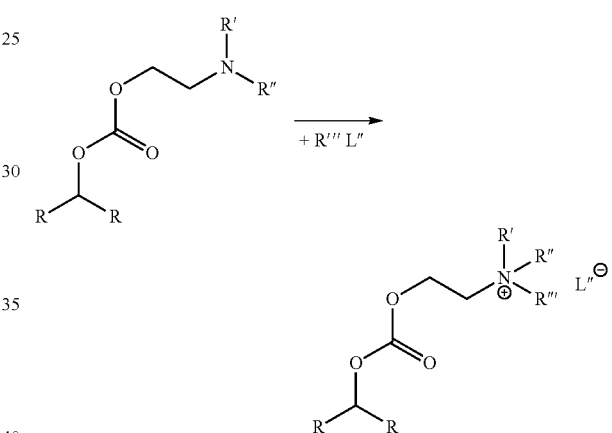

To 1 equivalent of dialkylsulfate (e.g. DMS) in a suitable solvent (e.g. methanol), a concentrated solution of carbonate-amine in the same solvent is progressively added under stirring at room temperature at a rate avoiding significant temperature increase due to reaction exothermy. After the end of addition, the mixture is allowed to stir at room temperature (e.g. for one hour) and the volatiles (solvent) are removed under vacuum to afford the final product usually as a white wax.

The skilled person will select the appropriate reaction conditions and reactants for the process steps described hereinbefore based on his professional knowledge and taking into account the desired final product so that no details need to be given here.

Synthesis of Compounds Wherein A is A-3 or A-4, Exemplary Shown for Compounds of Formulae (V) or (VI):

In a first step, an internal ketone is subjected to a condensation reaction with a dialkylmalonate (e.g. dimethyl malonate) in the presence of a catalyst in an organic solvent at a temperature in the range of from 110 to 250° C., preferably from 125 to 175° C., even more preferably about 140° C. A suitable and preferred solvent for such reaction is xylene and a preferred catalyst is potassium tert-butoxide, the amount of which is usually in the range of from 2 to 10 mol %, preferably from 3 to 8 mol %, based on the molar quantity of the internal ketone.

The internal ketone (obtained e.g. as described in US 2018/093936), the dialkyl malonate (e.g. dimethyl malonate) and the catalyst are dissolved in the solvent (e.g. xylene) and reacted at elevated temperature (e.g. appr. 140° C.) for a period of time of usually from 1 to 72 hours. Water produced as by-product can be removed by azeotropic distillation. At the end of the reaction, the reaction medium is then usually cooled down to room temperature and the organic phase is washed with water in order to remove the catalyst.

The volatiles are then distilled out and the crude product is purified by re-dissolving the resulting oil in a suitable solvent (e.g. ethanol) allowing heavier by-products such as the ketone aldolisation/crotonisation adduct as well as the remaining starting ketone to precipitate. After filtration the filtrate can be evaporated (solvent removal) to afford the desired adduct.

The reaction scheme for this first step is given below:

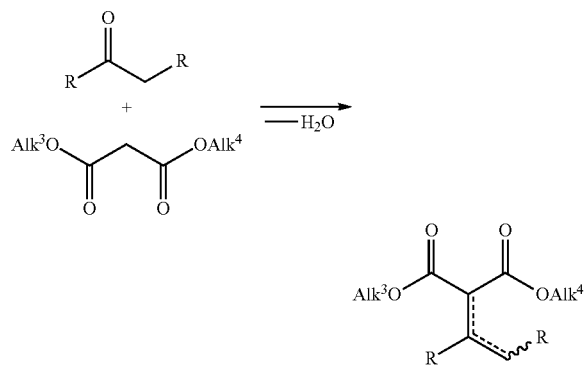

wherein $Alk^3$ and $Alk^4$, which may be the same or different, represent an alkyl group having 1 to 6 carbon atoms.

The product obtained in the first step can then be subjected to a transesterification with dialkylaminoethanol (e.g. dimethylaminoethanol). A suitable catalyst for this reaction step is dibutyltin oxide (usually in the amount of 2 to 10, preferably 3 to 8 mol % with respect to the malonate adduct obtained in the first step) and a suitable solvent is, as for the first step, xylene. The reaction temperature again is preferably in the range from 110 to 170° C. and even more preferably approximately 140° C.

The malonate adduct obtained in the first step is solubilized in the solvent (e.g. xylene), an excess of dialkylethanolamine (from 100% to 500% excess based on stoichiometry) is added to the solution, followed by the addition of the catalyst. The mixture is then allowed to stir at a temperature which is preferably in the range form 110° C. to 170° C., preferably appr. 140° C. and the formed alcohol is distilled out from the reaction medium. After completion of the reaction, the organic phase is washed with water in order to remove excess of dialkylaminoethanol and xylene is distilled out to afford the crude esteramine.

This second step can be represented by the following reaction scheme:

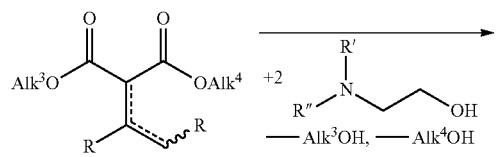

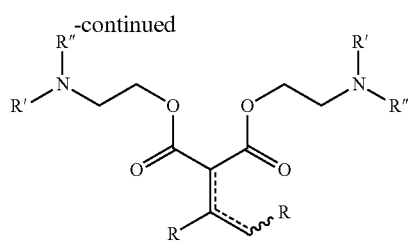

In a third step, the esteramine obtained in the second step can be alkylated with an alkylating agent of general formula R'''-L'' wherein L'' is a monovalent anion or anionic group (such as e.g. methosulfate), preferably a dialkylsulfate, even more preferably dimethylsulfate (DMS), to obtain the target quaternary ammonium compound of the present invention.

To a suitable amount of alkylating agent in a suitable solvent, a concentrated solution of esteramine in the same solvent is progressively added under stirring (usually at room temperature) at a rate avoiding significant temperature increase due to reaction exothermy.

After the end of the addition, the mixture is allowed to stir at room temperature (typically 15-30° C.) and the volatiles (mainly solvent and traces of alkylating agent (e.g. DMS)) are removed under vacuum to afford the final product as a white wax.

The reaction scheme for step 3 can be depicted as follows (with methanol as the solvent):

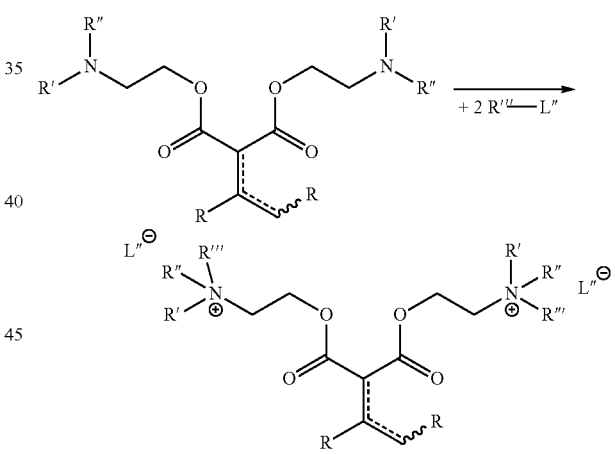

The wedged bond shown to the right is a representation of the fact that the reaction product is a mixture of three isomers derived from the structures in the reaction scheme of the first step.

The foregoing exemplary process will be suitably modified by the skilled person based on his professional knowledge to obtain other compounds of formula (V) and (VI). He will select the suitable reactants for reaction with the internal ketone and will modify the reaction conditions as necessary for other reactant/internal ketone combinations.

The skilled person will adopt the reaction conditions based on his professional knowledge and taking into account the desired target compound. The reaction steps as such have been described in the literature so that no further details need to be given here.

Synthesis of Compounds Wherein A is A-1 as Represented by Formula (VII).

In a first step of this exemplary process, an internal ketone is subjected to a reductive amination, e.g. with hydrogen and ammonia in accordance with the following reaction scheme:

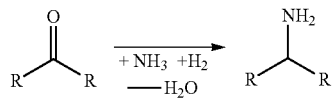

The reductive amination can be conducted in an autoclave using an excess of ammonia. The reactor is loaded with internal ketone, ethanol as the solvent (or another suitable solvent) and a suitable catalyst (e.g. Pt/C at a concentration of e.g. appr. 2 wt % with respect to the ketone substrate). The reactor atmosphere is purged several times with elevated pressure of nitrogen. Ammonia is then added into the reactor and then hydrogen and the temperature is increased to e.g. 120° C. while maintaining elevated pressure (e.g. 4 MPa) in the reactor. The reaction medium is stirred under those conditions until completion of the reaction.

Subsequently, the reaction product thus obtained is subjected to an alkylation in accordance with the following general scheme, shown for an alkyl chloroacetate as the alkylating agent:

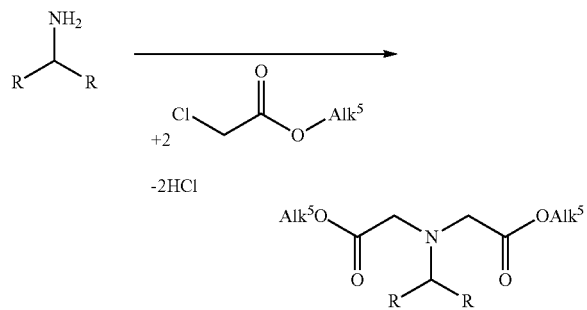

wherein $Alk^5$ is an alkyl group having 1 to 6 carbon atoms.

The reaction can be conducted using preferably an alkyl chloroacetate (particularly preferred methyl chloroacetate) as the alkylating agent either in a suitable solvent or using directly the alkyl chloroacetate as the solvent (meaning excess of reactant in comparison to sec-alkyl amine). A suitable base should be used during the reaction (e.g sodium carbonate) to neutralize formed HCl and a catalyst can be optionally employed (e.g. potassium iodide, KI) to speed up the reaction. The mixture is then allowed to stir at a temperature ranging from 50° C. to 250° C. until reaction completion. At the end of the reaction, the salts are filtered out and the organic phase can be washed with water. Then the volatiles can be removed under vacuum and the crude product is then engaged in the next steps.

The crude product thus obtained can then be subjected to a transesterification reaction with dialkylaminoethanol (e.g. dimethylaminoethanol (DMAE)), optionally in the presence of a suitable catalyst as described hereinbefore, according to the following reaction scheme:

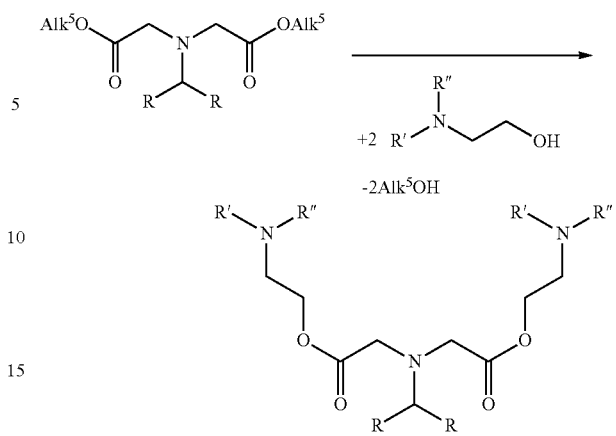

The reaction conditions can be chosen as described hereinbefore in the exemplary process for the synthesis of compounds wherein A is A-3 or A-4.

In the final step, the amine compound thus obtained is alkylated to obtain the desired compound in accordance with the present invention as shown for an alkylating agent R'''-L'' in the following reaction scheme:

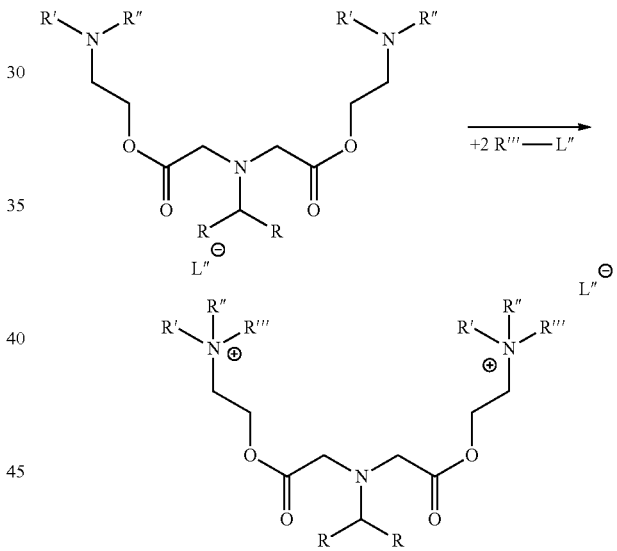

The same conditions as described hereinbefore for the methylation stage of compounds of formula (V) and (VI) can be employed.

Synthesis of Compounds Wherein A is Represented by A-5 as Exemplified by Formulae (IX) and (XI)

The respective compounds can preferably be obtained by two processes. The first process starts with a Piria ketonization followed by hydrogenation, dehydration, epoxydation (to obtain an epoxide), hydration (to obtain a diol) and esterification (to obtain a certain diester). This is a multi-step process plugged on Piria technology. It has the advantage of being salt-free and relying on chemical transformations which can be easily performed.

As an alternative to the above sequence of reactions, it is possible to bypass the hydration step (i.e. the formation of the diol) by converting straightforward the epoxide into the diester provided an appropriate esterification agent is used, as will be detailed later on.

The esterification step may be followed by an amine condensation step (as the final step) to convert the diester into a compound complying with formula (IX) or (XI).

Finally, starting from the diol, it also possible to obtain in one reaction step a compound which complies with formula (IX) or (XI), i.e. to achieve in one step said esterification and amine condensation, provided another appropriate esterification is used, as will be detailed later on.

First Process for Synthesis of Compounds Wherein a is Represented by A-5 as Exemplified by Formulae (IX) and (XI)

Piria Ketonization

The basic reaction in the first step is:

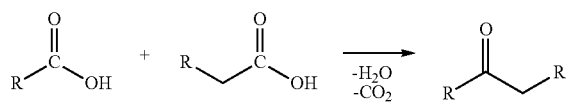

This reaction has been thoroughly described in U.S. Pat. No. 10,035,746, WO 2018/087179 and WO 2018/033607 to which reference is made for further details.

Hydrogenation

The internal ketone is then subjected to hydrogenation which can be carried out under standard conditions known to the skilled person for hydrogenation reactions:

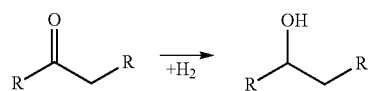

The hydrogenation reaction is conducted by contacting the internal ketone with hydrogen in an autoclave reactor at a temperature ranging from 15° C. to 300° C. and at a hydrogen pressure ranging from 1 bar to 100 bars. The reaction can be conducted in the presence of an optional solvent but the use of such solvent is not mandatory and the reaction can also be conducted without any added solvent. As examples of suitable solvents one can mention: methanol, ethanol, isopropanol, butanol, THF, methyl-THF, hydrocarbons, water or mixtures thereof. A suitable catalyst based on a transition metal should be employed for this reaction. As examples of suitable catalysts, one can mention heterogeneous transition metal based catalysts such as for example supported dispersed transition metal based catalysts or homogeneous organometallic complexes of transition metals. Examples of suitable transition metals are: Ni, Cu, Co, Fe, Pd, Rh, Ru, Pt, Ir. As examples of suitable catalysts one can mention Pd/C, Ru/C, Pd/Al$_2$O$_3$, Pt/C, Pt/Al$_2$O$_3$, Raney Nickel, Raney Cobalt etc. At the end of the reaction, the desired alcohol can be recovered after appropriate work-up. The skilled person is aware of representative techniques so no further details need to be given here. Details of this process step can e.g. be found in U.S. Pat. No. 10,035,746 to which reference is made here.

The skilled person will select suitable reaction conditions based on his professional experience and taking into account the specific target compound to be synthesized. Accordingly, no further details need to be given here.

Dehydration

In the next step, the alcohol thus obtained is subjected to dehydration to obtain an internal olefin. This reaction can also be carried out under standard conditions known to the skilled person for respective dehydration reactions (e.g. U.S. Pat. No. 10,035,746, example 4) so that no further details need to be given here:

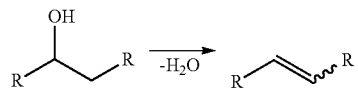

The dehydration reaction is conducted by heating the secondary alcohol in a reaction zone in the presence of a suitable catalyst at a temperature ranging between 100° C. and 400° C. The reaction can be conducted in the presence of an optional solvent but the use of such solvent is not mandatory and the reaction can also be conducted without any added solvent. As examples of solvents one can mention: hydrocarbons, toluene, xylene or their mixture. A catalyst must be employed for this reaction. Suitable examples of catalysts are acidic (Lewis or Bronsted) catalysts either heterogeneous solid acid catalysts or homogeneous catalysts. As examples of heterogeneous catalysts one can mention alumina (Al$_2$O$_3$), silica (SiO$_2$), aluminosilicates (Al$_2$O$_3$—SiO$_2$) such as zeolites, phosphoric acid supported on silica or alumina, acidic resins such as Amberlite® etc. Homogeneous catalysts can also be employed and one can mention the following suitable acids: H$_2$SO$_4$, HCl, trifluoromethanesulfonic acid, para-toluenesulfonic acid, AlCl$_3$, FeCl$_3$ etc. Water that is generated during the reaction can be distilled out from the reaction medium in the course of the reaction. At the end of the reaction, the desired olefin can be recovered after appropriate work-up. The skilled person is aware of representative techniques and same are e.g. described in U.S. Pat. No. 10,035,746 so that no further details need to be given here.

Epoxidation

This internal olefin can thereafter be oxidized to the respective epoxide wherein the double bond is substituted by an epoxide group in accordance with the following scheme (where the reactants are just exemplary for respective groups of compounds serving the respective function):

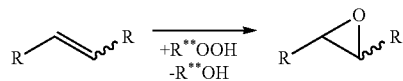

wherein R can be hydrogen or a hydrocarbon group that can be substituted and/or interrupted by a heteroatom or heteroatom containing group, or R can be an acyl group of general formula R*—C(=O)— wherein R* can have the same meaning as R**.

The epoxidation reaction is advantageously conducted by contacting the internal olefin with an appropriate oxidizing agent in a reaction zone at a temperature ranging usually from 15° C. to 250° C.

As suitable oxidizing agents one can mention peroxide compounds such as hydrogen peroxide (H$_2$O$_2$) that can be employed in the form of an aqueous solution, organic peroxides such as peracids of general formula R**—CO$_3$H (for example meta-chloroperoxybenzoic acid, peracetic acid, etc.), hydrocarbyl (e.g. alkyl) hydroperoxides of general formula R'—O$_2$H (for example cyclohexyl hydroperoxide, cumene hydroperoxide, tert-butyl hydroperoxide) where R in the peracid or R**' in the hydrocarbyl (e.g. alkyl) hydroperoxide is a hydrocarbon group (e.g. an alkyl group) that can be substituted and/or interrupted by a heteroatom or heteroatoms-containing group.

The reaction can be conducted in the presence of an optional solvent but the use of such solvent is not mandatory and the reaction can also be conducted without any added solvent. As example of suitable solvents one can mention: $CHCl_3$, $CH_2Cl_2$, tert-butanol or their mixtures.

When $H_2O_2$ is used as the oxidizing agent, the presence of an organic carboxylic acid during the reaction can be beneficial as it will generate in-situ a peracid compound by reaction with $H_2O_2$. As examples of suitable carboxylic acids one can mention: formic acid, acetic acid, propionic acid, butanoic acid, benzoic acid etc.

A catalyst can also be used to promote the reaction. Suitable catalysts are Lewis or Bronsted acids and one can mention for example: perchloric acid ($HClO_4$), trifluoromethanesulfonic acid, heterogeneous titanium silicalite ($TiO_2$—$SiO_2$), heterogeneous acidic resins such as Amberlite© resins, homogeneous organometallic complexes of manganese, titanium, vanadium, rhenium, tungsten, polyoxometellates etc.

At the end of the reaction, the desired epoxide can be recovered after appropriate work-up and the skilled person is aware of representative techniques so that no further details need to be given here.

Amongst the epoxides of formula

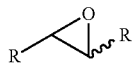

wherein R, which may be the same or different at each occurrence, represents in general a $C_5$-$C_{27}$ aliphatic group, those wherein R has at least 10 carbon atoms, especially those wherein R has from 10 to 20 carbon atoms, have been found particularly advantageous for the preparation of compounds of formulae (IX) and (XI) useful as surfactants demonstrating an outstanding balance of properties. Yet, such epoxides, which can be represented by formula (XII)

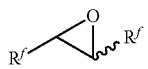 (XII)

wherein $R^f$, which may be the same or different at each occurrence, represents a $C_{10}$-$C_{27}$ aliphatic group, have been rarely disclosed in the literature and such rare disclosures— two, insofar as the Applicant is aware of—were totally unrelated to the technical field of the present invention, i.e. the synthesis of surfactants.

In U.S. Pat. No. 3,974,224 (to BAYER), oxirane compounds of general formula

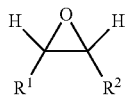

were taught to be useful for the preparation of aldehyde compounds by reacting them with hydrogen peroxide in the presence of a boron compound. In the above formula, $R^1$ and $R^2$ are chosen independently from one another (emphasis added) among a broad list of chemical moeities, as recited in col. 1, l. 52-61; some possible moieties are alkyl moieties but, but the case being, $C_2$-$C_6$ alkyls are preferred over other higher alkyls. In the huge list of oxirane compounds which are specifically proposed, only 3 oxiranes, namely 2,3-diundecyloxirane, 2,3-didodecyloxirane and 2-hexadecyl-3-octadecyloxirane are in accordance with formula (XII). US'224 remains totally silent about how to synthesize any of the listed oxiranes, including the 3 oxiranes complying with formula (XII). Beyond the fact that the disclosure of the above 3 oxiranes in US'224 has no connection with the present invention and appears as such to be accidental, it is just not enabling because US'223 does not provide any indication on how to make these oxiranes.

Mori and Argade in *European Journal of Organic Chemistry*, 1994, vol. 7, p. 695-700, describe the synthesis of (9Z,25S,26R,43Z)-25,26-epoxy-9,43-henpentacontadiene and its antipode, components of the nymph recognition pheromone produced by the nymphs of the cockroach *Nauphoeta cinerea*, by extending the carbon chain of (2S,3R)-4-Acetoxy-2,3-epoxy-1-butanol. In this paper, four $C_{51}$ epoxides complying with general formula (XII) are disclosed; all of them qualify as 2-tetracosenyl-3-pentacosenyloxiranes or 25,26-epoxy-henpentacontadienes. This other disclosure of oxiranes complying with formula (XII) has likewise no connection with the present invention and appears also as such to be accidental.

It was thus another object of the present invention to provide new epoxide compounds useful for the manufacture of quaternary ammonium compounds with good surfactant properties and a good biodegradability.

This other object is achieved with the epoxide compounds ("invention A") which are described hereinafter under item A.1:

item A.1: an epoxide compound of formula (XII)

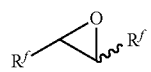 (XII)

wherein $R^f$, which may be the same or different at each occurrence, represents a $C_{10}$-$C_{27}$ aliphatic group,
with the exception of a 2-tetracosenyl-3-pentacosenyloxirane.

Preferred and/or particular embodiments of invention A are set hereinafter:

item A.2: the epoxide compound as described in item A.1 with the further exception of 2,3-diundecyloxirane, 2,3-didodecyloxirane and 2-hexadecyl-3-octadecyloxirane;

item A.3: the epoxide compound as described in item A.1 or A.2 wherein each $R^f$ comprises at least 12 carbon atoms and at least one $R^f$ comprises at least 13 carbon atoms;

item A.4: the epoxide compound as described in item A.3 wherein $R^f$ (i.e. each $R^f$) comprises at least 14 carbon atoms;

item A.5: the epoxide compound as described in item A.1, A.2, A.3 or A.4 wherein $R^f$ (i.e. each $R^f$) comprises at most 24 carbon atoms;

item A.6: the epoxide compound as described in item A.5 wherein $R^f$ comprises at most 20 carbon atoms;

item A.7: the epoxide compound as described in item A.6 wherein $R^f$ comprises at most 17 carbon atoms;

item A.8: the epoxide compound as described in item A.1 or A.2 wherein $R^f$ comprises from 10 to 20 carbon atoms;

item A.9: the epoxide compound as described in item A.1 or A.2 wherein $R^f$ comprises from 11 to 17 carbon atoms;

item A.10: the epoxide compound as described in any one of items A.1 to A.9 wherein the total number of carbon atoms of the two $R^f$ groups is of at least 30;

item A.11: the epoxide compound as described in any one of items A.1 to A.10 wherein $R^f$ (i.e. each $R^f$) is free of any double bond and of any triple bond;

item A.12: the epoxide compound as described in any one of items A.1 to A.10 wherein $R^f$ is chosen from alkyl and alkenyl groups;

item A.13: the epoxide compound as described in item A.12 wherein $R^f$ is an alkyl group;

item A.14: the epoxide compound as described in any one of items A.1 to A.13 wherein $R^f$ is linear;

item A.15: the epoxide compound as described in item A.1 or A.2 wherein $R^f$ is a linear alkyl group having from 14 to 17 carbon atoms;

item A.16: the epoxide compound as described in any one of items A.1 to A.15 wherein one and only one $R^f$ has an odd number of carbon atoms and one and only one $R^f$ has an even number of carbon atoms;

this can happen when both $R^f$ originate from a carboxylic acid having an even number of carbon atoms and can be advantageous from an economic standpoint because fatty carboxylic acids of natural origin—which have typically such an even number of carbon atoms—are broadly available;

this can also happen when both $R^f$ originate from a carboxylic acid having an odd number of carbon atoms;

on the other hand, when one and only one $R^f$ originates from a carboxylic acid having an even number of carbon atoms and one and only one $R^f$ originates from a carboxylic acid having an odd number of carbon atoms, an epoxide compound as described in any one of items A.1 to A.15 wherein either both $R^f$ have an even number of carbon atoms or both $R^f$ have an odd number of carbon atoms is obtained; in practice, since carboxylic acids of different chain lengths have nonetheless generally close reactivities, a mixture of a first epoxide wherein both $R^f$ have an even number of carbon atoms and of a second epoxide wherein both $R^f$ have an odd number of carbon atoms is generally obtained;

item A.17: the epoxide compound as described in any one of items A.1 to A.15 wherein one and only one $R^f$ has an odd number of carbon atoms $n_O$ while the other $R^f$ has an even number of carbon atoms $n_E$, wherein $n_E$ is equal to $n_O-1$; this can happen when the epoxide is obtained from one and only one carboxylic acid having an even number of carbon atoms and can also be advantageous from an economic standpoint for the same reason as above stated;

item A.18: the epoxide compound as described in any one of items A.1 to A.15 wherein the number of carbon atoms of the two $R^f$ groups is represented by couple $(n_1, n_2)$, $n_1$ being the number of carbon atoms of the first $R^f$ group and $n_2$ being the number of carbon atoms of the second $R^f$ group, said couple $(n_1, n_2)$ being chosen from the following couples: (10,11), (12,13), (14,15), (16,17), (10,13), (10,15), (10,17), (11,12), (11,14), (11,16), (12,15), (12,17), (13,14), (13,16), (14,17) and (15,16).

item A.19: the epoxide compound as described in item A.18 wherein the couple $(n_1, n_2)$ representing the number of carbon atoms of the two $R^f$ groups is chosen from the following couples: (14,15), (16,17), (14,17) and (15,16);

to obtain an epoxide in accordance with item A.19, it can be notably started from the following carboxylic acids or mixtures of carboxylic acids: palmitic acid alone, stearic acid alone, oleic acid alone, palmitic acid in admixture either with stearic acid or with oleic acid or with stearic acid and oleic acid, and stearic acid in admixture with oleic acid;

item A.20: the epoxide as described in any one of items A.1 to A.19 which is a mixture of cis-epoxide of formula (XIIa)

(XIIa)

and of trans-epoxide of formula (XIIb)

(XIIb)

such a mixture can notably result from the epoxidation of a mixture of a cis-olefin and a trans-olefin;

item A.21: the epoxide as described in any one of items A.1 to A.19 which is a cis-epoxide of formula (XIa)

(XIIa)

item A.22: the epoxide as described in any one of items A.1 to A.19 which is a trans-epoxide of formula (XIIb)

(XIIb)

the cis-epoxide of item A.21 and the trans-epoxide of item A.22 can notably be obtained by isolating them from the mixture of cis-epoxide and trans-epoxide of item A.20 through any conventional separation mean;

item A.23: a method for obtaining the epoxide as described in any one of items A.1 to A.22 which comprises reacting an olefin of formula

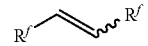

wherein $R^f$, which may be the same or different at each occurrence, is as described here before, with an oxidizing agent of formula ROOH wherein R is hydrogen or a hydrocarbon group that can be substituted and/or interrupted by a heteroatom or heteroatom containing group, or R** is an acyl group of general formula R\*\*\*—C(=O)— wherein R\*\*\* has the same meaning as R\*\*, so as to form the epoxide and a compound of formula R\*\*OH;

item A.24: the method as described in item A.23 wherein the oxidizing agent is a peracid of general formula R\*\*\*\*—CO$_3$H where R\*\*\*\* is a hydrocarbon group that can be substituted and/or interrupted by a heteroatom or a heteroatoms-containing group, such as peracetic acid;

item A.25: the method as described in item A.23 wherein the oxidizing agent is hydrogen peroxide;

item A.26: the method as described in item A.25 wherein the olefin is reacted with hydrogen peroxide in the presence of an organic carboxylic acid, such as acetic acid;

item A.27: the method as described in any one of items A.23 to A.26 which comprises:

causing a first carboxylic acid of formula

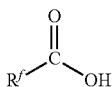

to undergo a Piria ketonization reaction with another carboxylic acid of formula

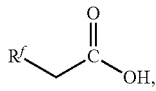

wherein R$^f$, which may be the same or different in each carboxylic acid, is as described here before, wherein the first carboxylic acid and the other carboxylic acid may be consequently identical to or different from each other (they are identical to each other when R$^f$ in in the formula of the first carboxylic acid is identical to R$^f$—CH$_2$— in the formula of the other carboxylic acid), so as to obtain an internal ketone of formula

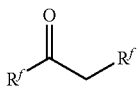

wherein R$^f$, which may be the same or different at each occurrence, is as described here before;

hydrogenating the internal ketone with hydrogen, so as to obtain a carbinol of formula

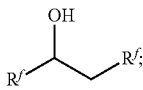

and dehydrating the carbinol, so as to obtain the olefin of formula

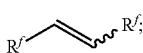

item A.28: use of the epoxide as described in any one of items A.1 to A.22 for the manufacture of a surfactant;

item A.29: use of the epoxide as described in any one of items A.1 to A.22 or use as described in item A.28 for the manufacture of a compound of formula (XI)

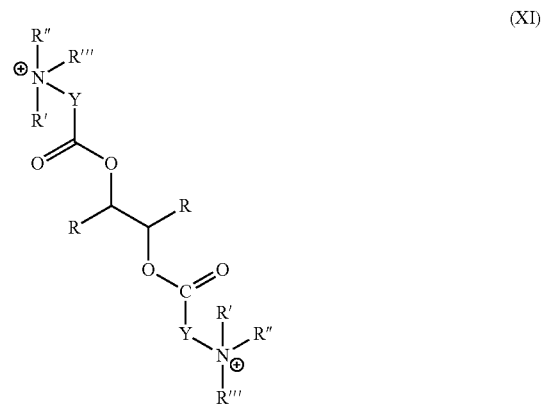

wherein, in formula (XI), R, which may be the same or different at each occurrence, is equal to R$^f$, R$^f$ has the meaning as described hereinbefore, and R', R", R''' and Y have the meaning as described hereinbefore for formula (I);

item A.30: use of the epoxide as described in any one of items A.1 to A.22 for the manufacture of a compound other than a compound of formula (XI) as described hereinbefore, e.g. for the manufacture of a polymer (possibly an oligomer) such as a polyether, or for the manufacture of a cyclic carbonate.

The epoxide can be directly engaged in next step without further purification. This next step can be a hydration step (so as to form a diol, to be the followed by an esterification step) or a direct esterification step.

Epoxide Hydration (Diol Formation)

The epoxide can thereafter be hydrated to the respective diol in accordance with the following scheme:

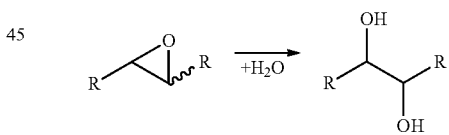

The ring opening reaction can be performed by contacting the epoxide with water, generally in the presence of a suitable catalyst and at a temperature ranging generally from 15° C. to 150° C. As examples of catalysts one can mention Bronsted or Lewis acid catalysts such as: H$_2$SO$_4$, HCl, perchloric acid (HClO$_4$), trifluoromethanesulfonic acid, para-toluenesulfonic acid, heterogeneous acidic resins such as Amberlite® resins etc.

The reaction can be conducted in the presence of an optional solvent to facilitate reagent contact and one can mention: Me-THF, THF, DMSO, tert-butanol, methanol, ethanol, isopropanol, acetonitrile, or their mixture. The reaction can also be conducted without any added solvent.

At the end of the reaction, the desired diol can be recovered after appropriate work-up and the skilled person is aware of representative techniques so that no further details need to be given here.

Amongst the diols of formula

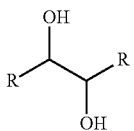

wherein R, which may be the same or different at each occurrence, represents in general a $C_5$-$C_{27}$ aliphatic group, those wherein R has at least 10 carbon atoms, especially those wherein R has from 10 to 20 carbon atoms, have likewise been found particularly advantageous for the preparation of compounds of formulae (IX) and (XI) useful as surfactants demonstrating an outstanding balance of properties. Yet, such diols, which can be represented by formula (XIII)

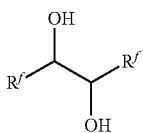

(XIII)

wherein $R^f$, which may be the same or different at each occurrence, represents a $C_{10}$-$C_{27}$ aliphatic group, have been rarely disclosed in the literature and such rare disclosures were totally unrelated to the technical field of the present invention, i.e. the synthesis of surfactants.

The website of PubChem discloses several alkanediols complying with formula (XIII). Except a few alkanediols which will be cited and commented thereafter, the alkanediols of PubChem appear to be pure theoretical constructions their properties of which were estimated by predictive models. As such alkanediols, it can be listed the following alkanediols: docosane-11,12-diol, tricosane-11,12-diol, tetracosane-12,13-diol, pentacosane-12,13-diol, hexacosane-12,13-diol, heptacosane-11,12-diol, octacosane-12,13-diol, octacosane-14,15-diol, nonacosane-14,15-diol, triacontane-15,16-diol, hentriacontane-15,16-diol, dotriacontane-14,15-diol, dotriacontane-15,16-diol, dotriacontane-16,17-diol, tetratriacontane-16,17-diol, tetratriacontane-17,18-diol, pentatriacontane-17,18-diol, hexatriacontane-15,16-diol, heptatriacontane-12,13-diol, octatriacontane-18,19-diol, octatriacontane-19,20-diol, nonatriacontane-19,20-diol, tetracontane-18,19-diol, tetracontane-19,20-diol, dotetracontane-20,21-diol and tetratetracontane-22,23-diol ("Pubchem" list). Beyond the fact that the disclosure of the diols forming part of "Pubchem" list has obviously no connection with the present invention and appears as such to be accidental, it is just not enabling because Pubchem does not provide any indication on how to make these diols.

Tornabene et al., in *Lipids*, Vol. 6, No. 3, pp. 190-195 (1971), proceeded with the characterization of branched monounsaturated hydrocarbons of *Sarcina lutea* and *Sarcina flava*. Within the frame of this characterization, olefinic hydrocarbons were converted into trimethylsilyl ether (TMSE) derivatives; obtaining such TMSE derivatives went through the formation of diol intermediates by oxidizing the olefinic hydrocarbons with osmium tetroxide. These characterization efforts resulted in the identification of some $C_{23}$-$C_{30}$ branched olefins: branched 11-tricosene, branched 11-tetracosene, branched 12-tetracosene, branched 12-pentacosene, branched 12-hexacosene, branched 13-hexacosene, branched 12-heptacosene, branched 13-heptacosene, branched 13-octacosene, branched 14-octacosene, branched 14-nonacosene and branched 15-triacontene. While this should not be construed as an admission from the Applicant, it could perhaps be presumed that diol intermediates corresponding to the previously cited olefins were obtained when forming the TMSE derivatives useful for the characterization. Besides, two GC peaks (named peaks "a" and "b" in Table 1) were tentatively (emphasis added) attributed to linear 13-heptacosene and linear 14-nonacosene. Tornabene's disclosure has no connection with the present invention and, should it be considered relevant for the assessment of the novelty of the invention, it would be held accidental.

Subramanian et al., in *Tetrahedron*, Vol. 42, No. 14, pp. 3967-3972 (1986) describes a multi-step process for the synthesis of 13-heptacosene. Heptacosane-13,14-diol, which served as an intermediate in this synthesis, was obtained by firstly reducing the isopropylidene derivative of dimethyl-13,14-dihydroxyheptacosa-1,27-dioate with lithium aluminium hydride to give 1,13,14,27-tetrahydroxyheptacosane, then tosylating the acetonide of above tetrol, reducing with Zn—NaI and hydrolysing with an acid. This disclosure of diols complying with formula (XIII) has no connection with the present invention and appears as such to be accidental.

KR20060060776 (to Eung Ju Oh) describes the synthesis of poly[3,4-alkoxythiophenes] and poly[3,4-ethylenedioxythiophenes] useful in organic electronic applications. Docosane-11,12-diol is involved in a synthesis of such polymers. This other disclosure of a diol complying with formula (XIII) has obviously no connection with the present invention and appears also as such to be accidental.

It was thus another object of the present invention to provide new diols useful for the manufacture of quaternary ammonium compounds with good surfactant properties and a good biodegradability.

This other object is achieved with the diols ("invention B") which are described hereinafter under item B.1:

item B.1: a diol of formula (XIII)

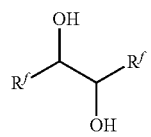

(XIII)

wherein $R^f$, which may be the same or different at each occurrence, represents a $C_{10}$-$C_{27}$ aliphatic group, with the exception of docosane-11,12-diol and heptacosane-13,14-diol.

Preferred and/or particular embodiments of invention B are set hereinafter:

item B.2: the diol as described in item B.1 with the further exception of branched tricosane-11,12-diol, branched tetracosane-11,12-diol, branched tetracosane-12,13-diol, branched pentacosane-12,13-diol, branched hexacosane-12,13-diol, branched hexacosane-13,14-diol, branched heptacosane-12,13-diol, branched heptacosane-13,14-diol, branched octacosane-13,14-diol, branched octacosane-14,15-diol, branched nonacosane-14,15-diol and branched triacontane-15,16-diol.

item B.3: the diol as described in item B.2 with the further exception of linear heptacosane-13,14-diol and linear nonacosane-14,15-diol.

item B.4: the diol as described in item B.1 or B.2 or B.3 with the further exception of the alkanediols of "Pubchem" list as above detailed;

item B.5: the diol as described in any one of items B.1 to B.4 wherein $R^f$ (i.e. each $R^f$) is free of any double bond and of any triple bond;

item B.6: the diol as described in any one of items B.1 to B.4 wherein $R^f$ is an alkyl group;

item B.7: the diol as described in any one of items B.1 to B.6 wherein $R^f$ is linear;

item B.8: the diol as described in any one of items B.1 to B.7 wherein each $R^f$ comprises at least 12 carbon atoms and at least one $R^f$ comprises at least 13 carbon atoms;

item B.9: the diol as described in item B.8 wherein $R^f$ (i.e. each $R^f$) comprises at least 14 carbon atoms;

item B.10: the diol as described in any one of items B.1 to B.9 wherein $R^f$ comprises at most 24 carbon atoms;

item B.11: the diol as described in item B.10 wherein $R^f$ comprises at most 20 carbon atoms;

item B.12: the diol as described in item B.11 wherein $R^f$ comprises at most 17 carbon atoms;

item B.13: the diol as described in any one of items B.1 to B.7 wherein $R^f$ comprises from 10 to 20 carbon atoms;

item B.14: the diol as described in item B.13 wherein $R^f$ comprises from 11 to 17 carbon atoms;

item B.15: the diol as described in any one of items B.1 to B.14 wherein the total number of carbon atoms of the two $R^f$ groups is of at least 30;

item B.16: the diol as described in any one of items B.1 to B.7 wherein $R^f$ is a linear alkyl group having from 14 to 17 carbon atoms;

item B.17: the diol as described in any one of items B.1 to B.16 wherein one and only one $R^f$ has an odd number of carbon atoms and one and only one $R^f$ has an even number of carbon atoms, possibly a $C_{33}$ diol, a $C_{41}$ diol, a $C_{45}$ diol, a $C_{47}$ diol, a $C_{49}$ diol, a $C_{51}$ diol, a $C_{53}$ diol or a $C_{55}$ diol;

item B.18: the diol as described in any one of items B.1 to B.16 either both $R^f$ have an odd number of carbon atoms or both $R^f$ have an even number of carbon atoms, possibly a $C_{44}$ diol, a $C_{46}$ diol, a $C_{48}$ diol, a $C_{50}$ diol, a $C_{52}$ diol, a $C_{54}$ diol or a $C_{56}$ diol;

item B.19: the diol as described in any one of items B.1 to B.16 wherein one and only one $R^f$ has an odd number of carbon atoms $n_O$ while the other $R^f$ has an even number of carbon atoms $n_E$, wherein $n_E$ is equal to $n_O - 1$;

item B.20: the diol as described in any one of items B.1 to B.19 but B.18 wherein the number of carbon atoms of the two groups $R^f$ is represented by couple $(n_1, n_2)$, $n_1$ being the number of carbon atoms of the first $R^f$ group and $n_2$ being the number of carbon atoms of the second $R^f$ group, said couple $(n_1, n_2)$ being chosen from the following couples: (10,11), (12,13), (14,15), (16, 17), (10,13), (10,15), (10,17), (11,12), (11,14), (11,16), (12,15), (12,17), (13,14), (13,16), (14,17) and (15,16).

item B.21: the diol as described in item B.20 wherein the couple $(n_1, n_2)$ representing the number of carbon atoms of the two groups $R^f$ is chosen from the following couples: (14,15), (16,17), (14,17) and (15,16);

item B.22: a pack of at least one kilogram comprising the diol as described in any one of items B.1 to B.21;

item B.23: a diol mixture comprising a first diol characterized by $R^f$ groups having respectively $n_3$ and $(n_3-1)$ carbon atoms, a second diol characterized by $R^f$ groups having respectively $n_4$ and $(n_4-1)$ carbon atoms, a third diol characterized by $R^f$ groups having respectively $n_3$ and $(n_4-1)$ carbon atoms and a fourth diol characterized by $R^f$ groups having respectively $n_4$ and $(n_3-1)$ carbon atoms, wherein $n_3 \leq n_4+2$ and wherein the first diol, the second diol, the third diol and the fourth diol are as described in any one of items B.1 to B.17 or in item B.21;

item B.24: a method for obtaining the diol as described in any one of items B.1 to B.21 which comprises reacting an epoxide compound of formula

(XII)

wherein $R^f$, which may be the same or different at each occurrence, is as described here before within the frame of present invention B, with water;

item B. 25: the method as described in item B.24 wherein the reaction is conducted in the presence of a Bronsted or Lewis catalyst;

item B.26: the method described in item B.24 or B.25 which comprises reacting an olefin of formula

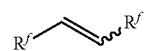

wherein $R^f$, which may be the same or different at each occurrence, is as described here before within the frame of present invention B, with an oxidizing agent of formula ROOH wherein R is hydrogen or a hydrocarbon group that can be substituted and/or interrupted by a heteroatom or heteroatom containing group, or R is an acyl group of general formula R*—C(=O)— wherein R* has the same meaning as R, so as to form a compound of formula R**OH and the epoxide compound of formula (XII) to be reacted with water;

item B.27: the method as described in item B.26 wherein the oxidizing agent is a peracid of general formula R**—CO₃H where R** is a hydrocarbon group that can be substituted and/or interrupted by a heteroatom or a heteroatoms-containing group, such as peracetic acid;

item B.28: the method as described in item B.26 wherein the oxidizing agent is hydrogen peroxide;

item B.29: the method as described in item B.28 wherein the olefin is reacted with hydrogen peroxide in the presence of an organic carboxylic acid, such as acetic acid item B.30: the method as described in any one of items B.26 to B.29 which comprises:

causing a first carboxylic acid of formula

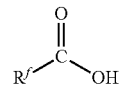

to undergo a Piria ketonization reaction with another carboxylic acid of formula

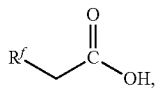

wherein $R^f$, which may be the same or different in each carboxylic acid, is as described here before,
wherein the first carboxylic acid and the other carboxylic acid may be consequently identical to or different from each other (they are identical to each other when $R^f$ in the formula of the first carboxylic acid is identical to $R^f$—CH$_2$— in the formula of the other carboxylic acid), so as to obtain an internal ketone of formula

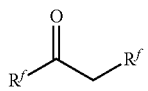

wherein $R^f$, which may be the same or different at each occurrence, is as described here before;
hydrogenating the internal ketone with hydrogen, so as to obtain a carbinol of formula

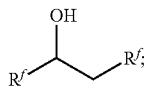

and
dehydrating the carbinol, so as to obtain the olefin of formula

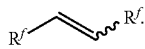

item B.31: use of the diol as described in any one of items B.1 to B.21 or of the diol mixture as described in item B.23 for the manufacture of a surfactant;
item B.32: use of the diol as described in any one of items B.1 to B.21 for the manufacture of a compound of formula (XI)

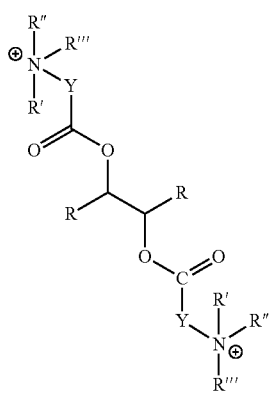

(XI)

wherein, in formula (XI), R, which may be the same or different at each occurrence, is equal to $R^f$, $R^f$ has the meaning as described hereinbefore, and R', R", R'" and Y have the meaning as described hereinbefore for formula (I);
item B.33: use of the diol as described in any one of items B.1 to B.21 for the manufacture of a compound other than a compound of formula (XI) as described hereinbefore, e.g. for the manufacture of a polymer (possibly an oligomer) such as a polyether or a polyester.

Esterification (Starting from the Diol)

The diol can be esterified according to the following reaction scheme:

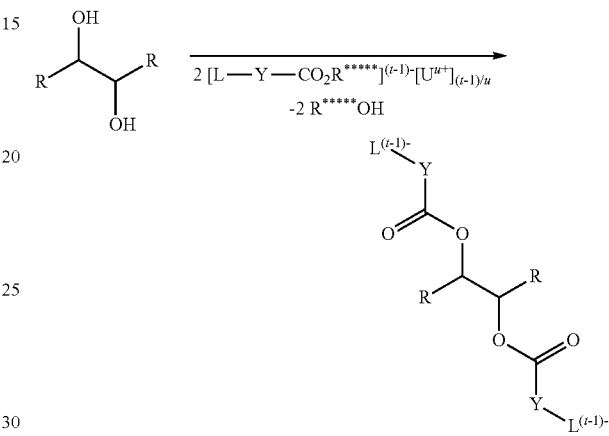

wherein
wherein R, which may be the same or different at each occurrence, is a $C_5$-$C_{27}$ aliphatic group, preferably a C to $C_{24}$ aliphatic group,
L is a leaving group,
Y is a divalent $C_1$-$C_6$ aliphatic radical,
R***** is hydrogen or a $C_1$-$C_6$ alkyl group,
t is an integer which is equal to 1 or which is equal or superior to 2,
$U^{u+}$ is a cation, and
u is an integer fixing the positive charge of the cation.

The esterification is first performed by contacting the diol with an esterification agent which is a carboxylic acid or an ester of a carboxylic acid of general formula:

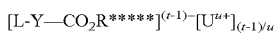

wherein Y is a divalent hydrocarbon radical containing between 1 and 6 carbon atoms, more precisely a divalent $C_1$-$C_6$ aliphatic radical, and wherein L is a leaving group.

Y is preferably an acyclic divalent aliphatic group, more preferably a linear divalent aliphatic group, still more preferably a linear alkanediyl (alkylene) group. Y has preferably from 1 to 6, more preferably from 1 to 4 carbon atom(s), still more preferably 1 or 2 carbon atom(s). The most preferred Y is —CH$_2$—.

When t is equal to 1, no cation is present. Otherwise said, the esterification is performed by contacting the diol with a carboxylic acid or an ester of a carboxylic acid of formula:

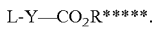

In the case the leaving group L already carries a negative charge in the carboxylic acid or ester reactant (this is the case when (t−1) is equal or superior to 1 or when t is equal or superior to 2), a cation noted $U^{u+}$ (with u preferably being 1, 2 or 3, even more preferably 1) must be present in the reactant to ensure the electroneutrality (in this case the cation possesses a u⁺ charge). This cation may e.g. be selected from H⁺, alkaline metal cations, alkaline earth metal cations (e.g. Na⁺, K⁺, Ca²⁺), Al⁺ and ammonium, to mention only a few examples.

The nature of the leaving group L is not particularly limited provided next reaction step (i.e. amine condensation, as will be detailed later on) can occur. The leaving group L is advantageously a nucleophilic group. It can be notably chosen from a halogen, a (hydrocarbyloxysulfonyl)oxy group of formula $R^a$—O—SO$_2$—O— wherein $R^a$ denotes a C$_1$-C$_{20}$ hydrocarbyl group which can be optionally halogenated, a (hydrocarbylsulfonyl)oxy group of formula $R^a$—SO$_2$—O— wherein $R^a$ denotes a C$_1$-C$_{20}$ hydrocarbyl group which can be optionally halogenated (such as in CF$_3$—SO$_2$—O—), and an oxysulfonyloxy group of formula —O—SO$_2$—O— (which is a leaving group L already carrying one negative charge on a terminal oxygen atom).

The hydrocarbyl group $R^a$, wherever present in here before formulae, can be notably an aliphatic group or an aromatic group such as phenyl or p-tolyl. The aliphatic group $R^a$ is usually a C$_1$-C$_6$ alkyl group, which can be linear or ramified; it is often a linear C$_1$-C$_4$ alkyl, such as methyl, ethyl or n-propyl.

The leaving group L is preferably chosen from:

a halogen, such as fluorine, chlorine, bromine or iodine, a (hydrocarbyloxysulfonyl)oxy group of formula $R^a$—O—SO$_2$—O— wherein $R^a$ denotes a C$_1$-C$_{20}$ hydrocarbyl group, such as CH$_3$—O—SO$_2$—O—, and an oxysulfonyloxy group of formula —O—SO$_2$—O—.

An example for a compound with t equal to 1 is the compound CH$_3$—O—SO$_3$—CH$_2$—COOR*** which, for R*** being H, yields the compound CH$_3$—O—SO$_3$—CH$_2$—COOH which can be designated as 2-((methoxysulfonyl)oxy)acetic acid.

As further examples of compounds in which t is equal to 1 and thus no cation is present, one can mention: chloroacetic acid, bromoacetic acid and 2-chloropropionic acid.

An example for t being equal to 2 is sodium carboxymethylsulfate acid in which [L-Y—COOR***]$^{(t-1)-}$ [U$^{u+}$]$_{(t-1)/u}$ is [Na⁺][O—SO$_2$—O—CH$_2$—COOR*]— with R*** being H, U being Na and thus [U$^{u+}$]$_{t/u}$[L$^{t-}$] being Na$_2$SO$_4$. The esterification can preferably be conducted at a temperature ranging from 50° C. to 250° C. in the presence of an optional solvent. However the presence of such solvent is not mandatory and the reaction can be also conducted without any added solvent. As example of suitable solvents one can mention: toluene, xylene, hydrocarbons, DMSO, Me-THF, THF or mixtures thereof.

Water that is formed as a by-product during the reaction can be removed from the reaction medium by distillation over the course of the reaction.

A catalyst can also be employed during the reaction and suitable catalysts are Bronsted or Lewis acid catalysts. As preferred examples of catalysts one can mention: H$_2$SO$_4$, para-toluenesulfonic acid, trifluoromethanesulfonic acid, HCl, or heterogeneous acidic resins such as Amberlite® resins, AlCl$_3$ etc. At the end of the reaction, the desired diester can be recovered after appropriate work-up and the skilled person is aware of representative techniques so that no further details need to be given here.

As will be seen later on, the diester of formula (XIV)

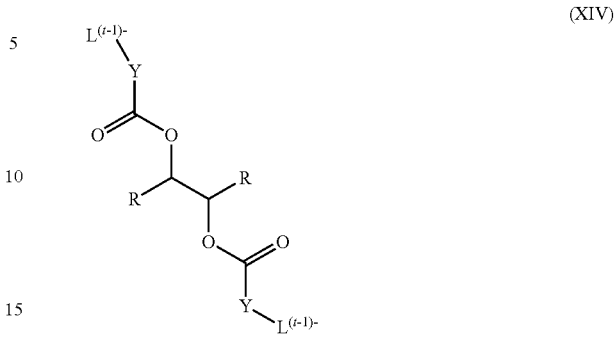

(XIV)

can be easily converted into a compound of formula (XI) as previously represented, which exhibits outstanding surfactant properties.

To the Applicant's knowledge, diesters of formula (XIV) are new. A web publication on Mol-instincts (https://www.molinstincts.com/structure/Coixenolide-cstr-CT1013031379.html) proposed a structural formula for coixenolide, an alkaloid drug component extractable from Job's tears which is notably capable of inhibiting cancer cell growth. From a purely structural point of view, the proposed formula for coixenolide might be the closest art with regard to the diester of formula (XIV). However, coixenolide does not contain any leaving group, making it quite difficult or even impossible to convert it into a compound that would exhibit outstanding surfactant properties, similar to those of the compound of formula (XI). Besides, coixenolide is poorly available and at high cost, which would make it meaningless from an industrial and economic standpoint to modify it or even to try to modify it to get surfactant properties which might be similar to those of the compound of formula (XI).

It was thus another object of the present invention to provide new diester compounds useful for the manufacture of quaternary ammonium compounds with good surfactant properties and a good biodegradability.

This other object is achieved with the diester compounds ("invention C") which are described hereinafter under item C.1:

item C.1: a diester compound of formula (XIV)

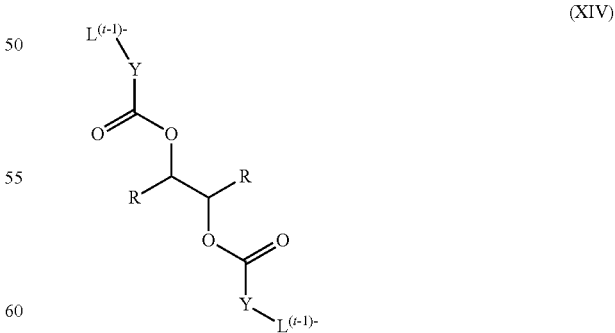

(XIV)

wherein

R, which may be the same or different at each occurrence, represents a C$_5$-C$_{27}$ aliphatic group;

Y is a divalent C$_1$-C$_6$ aliphatic radical;

L is a leaving group; and t is an integer which is equal to 1 or which is equal or superior to 2.

It is understood that in formula (XIV), Y and $L^{(t-1)-}$ may be the same or different at each occurrence, as it is the case for R.

Preferred and/or particular embodiments of invention C are set hereinafter:

item C.2: the diester compound as described in item C.1 wherein Y (i.e. each Y) is an acyclic divalent aliphatic group;

item C.3: the diester compound as described in item C.2 wherein Y is a linear divalent aliphatic group;

item C.4: the diester compound as described in item C.3 wherein Y is a linear alkanediyl group;

item C.5: the diester compound as described in any one of items C.1 to C.4 wherein Y has from 1 to 6 carbon atom(s);

item C.6: the diester compound as described in item C.5 wherein Y has from 1 to 4 carbon atom(s);

item C.7: the diester compound as described in item C.6 wherein Y has 1 or 2 carbon atom(s);

item C.8: the diester compound as described in item C.7 wherein Y is $CH_2$;

item C.9: the diester compound as described in any one of items C.1 to C.8 wherein the leaving group L is a nucleophilic group;

item C.10: the diester compound as described in any one of items C.1 to C.9 wherein the leaving group L is chosen from halogens, (hydrocarbyloxysulfonyl)oxy groups of formula $R^a$—O—$SO_2$—O—, (hydrocarbylsulfonyl)oxy groups of formula $R^a$—$SO_2$—O— and oxysulfonyloxy group of formula —O—$SO_2$—O—, wherein $R^a$, wherever present in here before formulae, denotes a $C_1$-$C_{20}$ hydrocarbyl group which can be optionally halogenated;

item C.11: the diester compound as described in item C.10 wherein the leaving group L is chosen from halogens and (hydrocarbyloxysulfonyl)oxy groups of formula $R^a$—O—$SO_2$—O— wherein $R^a$ denotes a $C_1$-$C_{20}$ hydrocarbyl group;

item C.12: the diester compound as described in item C.11 wherein the leaving group L is a halogen chosen from fluorine, chlorine, bromine and iodine;

item C.13: the diester compound as described in item C.12 wherein the leaving group L is chlorine;

item C.14: the diester compound as described in item C.10 or C.11 wherein the hydrocarbyl group $R^a$ is an aliphatic group;

item C.15: the diester compound as described in item C.14 wherein the hydrocarbyl group $R^a$ is a $C_1$-$C_6$ alkyl group, which can be linear or ramified;

item C.16: the diester compound as described in item C.15 wherein the hydrocarbyl group $R^a$ is a linear $C_1$-$C_4$ alkyl group, preferably methyl;

item C.17: the diester compound as described in any one of items C.1 to C.16 wherein R (i.e. each R) is a $C_6$ to $C_{24}$ aliphatic group;

item C.18: the diester compound as described in item C.17 wherein R comprises from 10 to 20 carbon atoms;

item C.19: the diester compound as described in item C.18 wherein R comprises from 11 to 17 carbon atoms;

item C.20: the diester compound as described in any one of items C.1 to C.19 wherein the total number of carbon atoms of the two R groups is of at least 30;

item C.21: the diester compound as described in any one of items C.1 to C.20 wherein R is free of any double bond and of any triple bond;

item C.22: the diester compound as described in item C.21 wherein R is an alkyl group;

item C.23: the diester compound as described in any one of items C.1 to C.22 wherein R is linear;

item C.24: the diester compound as described in any one of items C.1 to C.16 wherein R is a linear alkyl group having from 14 to 17 carbon atoms;

item C.25: the diester compound as described in any one of items C.1 to C.24 wherein one and only one R has an odd number of carbon atoms and one and only one R has an even number of carbon atoms;

item C.26: the diester compound as described in any one of items C.1 to C.24 wherein either both R have an even number of carbon atoms or both R have an odd number of carbon atoms;

item C.27: the diester compound as described in any one of items C.1 to C.24 wherein one and only one R has an odd number of carbon atoms $n_O$ while the other R has an even number of carbon atoms $n_E$, wherein $n_E$ is equal to $n_O$-1;

item C.28: the diester compound as described in any one of items C.1 to C.27 wherein the number of carbon atoms of the two R groups is represented by couple ($n_1$, $n_2$), $n_1$ being the number of carbon atoms of the first R group and $n_2$ being the number of carbon atoms of the second R group, said couple ($n_1$, $n_2$) being chosen from the following couples: (10,11), (12,13), (14,15), (16,17), (10,13), (10,15), (10,17), (11,12), (11,14), (11,16), (12,15), (12,17), (13,14), (13,16), (14,17) and (15,16).

item C.29: a method for obtaining the diester compound as described in any one of items C.1 to C.28 which comprises contacting a diol of formula

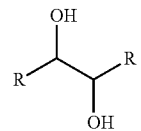

with a carboxylic acid or an ester of a carboxylic acid of general formula:

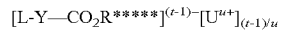

wherein

R, Y, L and t are as described here before within the frame of present invention C;

R***** is hydrogen or a $C_1$-$C_6$ alkyl group, $U^{u+}$ is a cation, and u is an integer fixing the positive charge of the cation (e.g. 1 for $H^+$, $NH_4^+$ or an alkaline metal cation or 2 for an alkaline earth metal cation);

item C.30: the method for synthesizing the diester as described in item C.29 which comprises reacting an epoxide compound of formula

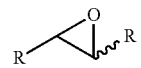

wherein R is as described here before, with water, so as to obtain the diol of formula

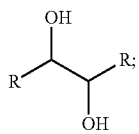

item C.31: the method described in item C.30 which comprises reacting an olefin of formula

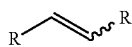

wherein R is as described here before, with an oxidizing agent of formula ROOH wherein R is hydrogen or a hydrocarbon group that can be substituted and/or interrupted by a heteroatom or heteroatom containing group, or R is an acyl group of general formula R*—C(=O)— wherein R* has the same meaning as R, so as to form a compound of formula R**OH and the epoxide compound of formula

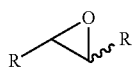

to be reacted with water;

item C.32: the method as described in item C.31 which comprises:

causing a first carboxylic acid of formula

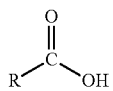

to undergo a Piria ketonization reaction with another carboxylic acid of formula

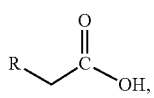

wherein R, which may be the same or different in each carboxylic acid, is as described here before, wherein the first carboxylic acid and the other carboxylic acid may be consequently identical to or different from each other, so as to obtain an internal ketone of formula

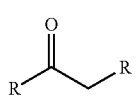

wherein R, which may be the same or different at each occurrence, is as described here before;

hydrogenating the internal ketone with hydrogen, so as to obtain a carbinol of formula

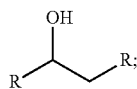

and dehydrating the carbinol, so as to obtain the olefin of formula

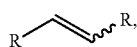

to be reacted with the oxidizing agent.

item C.33: use of the diester compound as described in any one of items C.1 to C.28 for the manufacture of a surfactant;

item C.34: use of the diester compound as described in any one of items C.1 to C.28 or use as described in item C.33 for the manufacture of a compound of formula (XI)

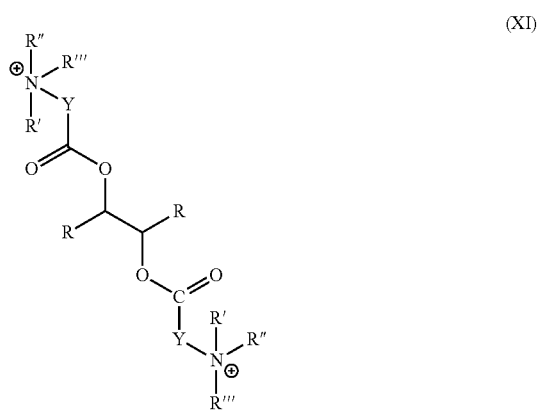

(XI)

wherein R and Y are as described hereinbefore within the frame of present invention C, and R', R" and R'" have the meaning as described hereinbefore for formula (I);

item C.35: use of the diester compound as described in any one of items C.1 to C.28 for the manufacture of a compound other than a compound of formula (XI) as described hereinbefore, e.g. for the manufacture of a compound differing from formula (XI) as described in item C.34 in that both —N⁺R'R"R'" are replaced by —SO₃ groups; this can be achieved by reacting the diester with a sulfite or bisulfite, such as sodium sulfite or bisulfite.

Direct Esterification (Starting from the Epoxide, Including the Epoxide Ring-Opening)

The Applicant has surprisingly found that the epoxide can be directly esterified into the diester when and only when a carboxylic acid is used as the esterification agent [L-Y—CO₂R***]$^{(t-1)}$—[U$^{u+}$]$_{(t-1)/u}$, that is to say when the esterification agent [L-Y—CO₂R***]$^{(t-1)}$—[U$^{u+}$]$_{(t-1)/u}$ is of the formula [L-Y—CO₂H]$^{(t-1)}$—[U$^{u+}$]$_{(t-1)/u}$, wherein L, Y, t, U$^{u+}$ and u are as described here before in connection with the esterification of the diol.

The epoxide ring-opening and esterification take then place according to the following reaction scheme:

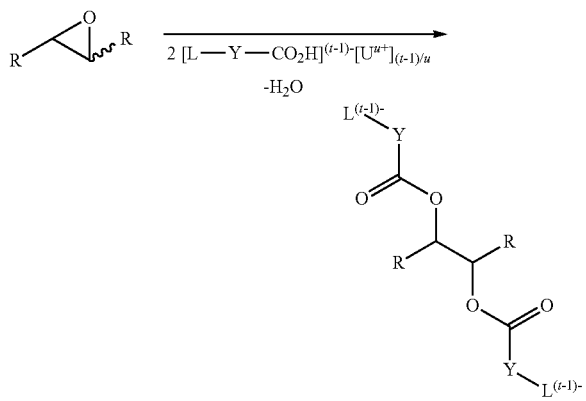

wherein
R, which may be the same or different at each occurrence, is a $C_5$-$C_{27}$ aliphatic group, preferably a $C_6$ to $C_{24}$ aliphatic group,
L is a leaving group,
Y is a divalent $C_1$-$C_6$ aliphatic radical,
t is an integer which is equal to 1 or which is equal or superior to 2,
$U^{u+}$ is a cation, and
u is an integer fixing the positive charge of the cation.

The epoxide ring-opening and esterification are performed by reacting the epoxide with a carboxylic acid of general formula:

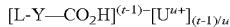

wherein L is a leaving group, Y is a divalent $C_1$-$C_6$ aliphatic radical, t is an integer which is equal to 1 or which is equal or superior to 2, $U^{u+}$ is a cation, and u is an integer fixing the positive charge of the cation.

All the details which have been provided here before concerning L, Y, t, $U^{u+}$ and U in connection with the esterification of the diol are also valid and can apply here in connection with the direct esterification of the epoxide, so that such details need not to be repeated.

In particular, when t is equal to 1, no cation is present. Otherwise said, the esterification is performed by contacting the epoxide with a carboxylic acid of formula:

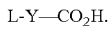

To the Applicant's knowledge, the direct esterification of an epoxide bearing 2 long aliphatic chains, such as the epoxide of formula

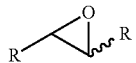

wherein each R, which may be the same or different at each occurrence, is a $C_5$-$C_{27}$ aliphatic group, is new.

In *Ber. Bunsenges. Phys. Chem.*, 100, 1335-1340 (1996), No. 8, it can be found a thermokinetics study of the reaction of bromomethyloxirane with dichloroacetic acid. The moeities of bromomethyloxirane which "correspond" to the R of above formula are respectively H and $CH_2Br$, and the moeity of dichloroacetic acid which "corresponds" to Y in the formula of the esterifying agent is —CHCl—. None such "R-equivalent" and "Y-equivalent" moieties is an aliphatic group.

Garcia et al., in *Journal of Industrial Microbiology*, 28, 173-179 (2002), 173-179, realized the enzymatic esterification of 1,2-epoxy-5-hexene with 2-chlorobutyric acid in the presence of an immobilized lipase from *Mucor miehei* to obtain 2-chloroesters. The moeities of 1,2-epoxy-5-hexene which "correspond" to the R of above formula are H and —$(CH_2)_2$—$CH$=$CH_2$. Garcia did not consider the enzymatic esterification of an epoxide the "R-equivalent" moeities of which would be both aliphatic. A fortiori, Garcia did not consider the direct epoxidation of an epoxide the "R-equivalent" moieties of which would be both aliphatic in the absence of an enzyme as catalyst.

More generally, none of these background art citations, which all related to the esterification of an epoxide having one and only one aliphatic or halogenoaliphatic group, describes or suggests the esterification of an epoxide of formula

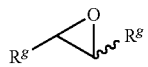

wherein each $R^g$, which may be the same or different at each occurrence, would be an aliphatic or halogenophatic group with a carboxylic acid of general formula $[L-Y-CO_2H]^{(t-1)-}[U^{u+}]_{(t-1)/u}$, wherein L, Y, t, $U^{u+}$ and u are as described here before.

It was thus another object of the present invention to provide a new, efficient and cost-effective method for the esterification of such optionally halogenated dialiphatic epoxides of formula

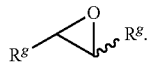

In particular, it was another object of the present invention to a new, efficient and cost-effective method for the obtention of diesters from long chain dialiphatic epoxides of formula

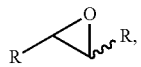

said diesters being useful for the manufacture of quaternary ammonium compounds with good surfactant properties and a good biodegradability.

This other object is achieved with a method ("invention D") which is described hereinafter under item D.1:

item D.1: a method for obtaining a diester having the general formula (XV)

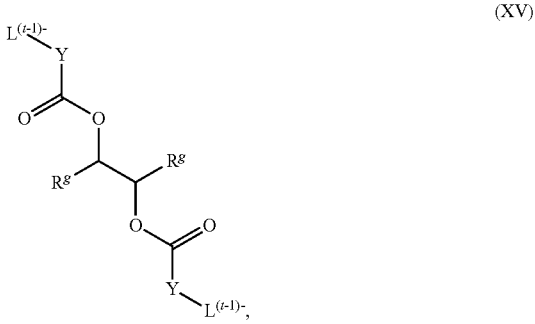

(XV)

said method comprising reacting an epoxide of formula (XVI)

(XVI)

with a carboxylic acid of general formula (XVII)

$$[L-Y-CO_2H]^{(t-1)-}[U^{u+}]_{(t-1)/u} \quad (XVII)$$

wherein, wherever used in above formulae:
  $R^g$, which may be the same or different at each occurrence, is an aliphatic or halogenophatic group;
  Y is a divalent $C_1$-$C_6$ aliphatic radical;
  L is a leaving group;
  t is an integer which is equal to 1 or which is equal or superior to 2;
  $U^{u+}$ is a cation, and
  u is an integer fixing the positive charge of the cation (e.g. 1 for $H^+$, $NH_4^+$ or an alkaline metal cation or 2 for an alkaline earth metal cation).

It is understood that, likewise $R^g$, Y and $L^{(t-1)-}$ may be the same or different at each occurrence.

Preferred and/or particular embodiments of invention D are set hereinafter:

item D.2: the method as described in item D.1 wherein the reaction proceeds with the elimination of one mole of water by one mole of epoxide, as can be represented by:

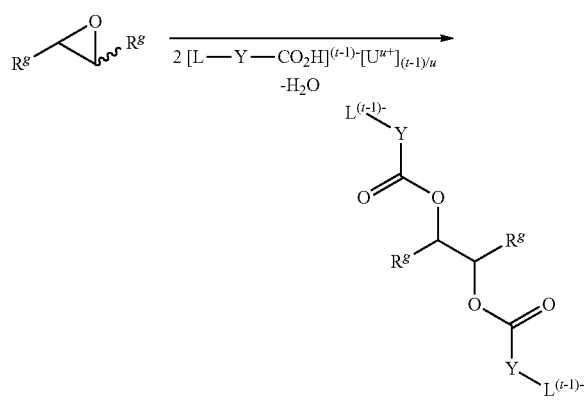

item D.3: the method as described in item D.1 or D.2 wherein the reaction takes place in a reaction medium from which water is removed by distillation over the course of the reaction;

item D.4: the method as described in item D.1, D.2 or D.3 wherein the reaction is conducted in the absence of enzyme;

item D.5: the method as described in any one of items D.1 to D.4 wherein the reaction is conducted under an inert atmosphere, such as a nitrogen or rare gas atmosphere;

item D.6: the method as described in item D.5 wherein the inert atmosphere is an argon atmosphere;

item D.7: the method as described in any one of items D.1 to D.6 wherein the total number of moles of carboxylic acid of formula (XVII) which is contacted with the epoxide during the whole course of the reaction exceeds the number of moles of epoxide;

item D.8: the method as described in item D.7 wherein the total number of moles of carboxylic acid of formula (XVII) which is contacted with the epoxide during the whole course of the reaction is at least twice higher than the number of moles of epoxide;

item D.9: the method as described in item D.8 wherein the total number of moles of carboxylic acid of formula (XVII) which is contacted with the epoxide during the whole course of the reaction is at least four times higher than the number of moles of epoxide;

item D.10: the method as described in any one of items D.1 to D.9 wherein the total number of moles of carboxylic acid of formula (XVII) which is contacted with the epoxide during the whole course of the reaction is at most ten times higher than the number of moles of epoxide;

item D.11: the method as described in item D.10 wherein the total number of moles of carboxylic acid of formula (XVII) which is contacted with the epoxide during the whole course of the reaction is at most eight times higher than the number of moles of epoxide;

item D.12: the method as described in any one of items D.1 to D.11 wherein the reaction takes place in a reactor where the epoxide is in molten state;

item D.13: the method as described in any one of items D.1 to D.12 wherein the reaction takes place in a reactor where the carboxylic acid of formula (XVII) is in molten state;

item D.14: the method as described in any one of items D.1 to D.13 wherein the epoxide is added progressively in a reactor containing the whole amount of the carboxylic acid of formula (XVII);

item D.15: the method as described in item D.14 wherein the epoxide is added continuously in a reactor containing the whole amount of the carboxylic acid of formula (XVII);

the Applicant has observed that contacting progressively, preferably continuously, the epoxide with the whole amount of the carboxylic acid made it possible to limit the self condensation of the epoxide;

item D.16: the method as described in any one of items D.1 to D.15 which comprises:
  a first step S, wherein the epoxide is reacted with the carboxylic acid of formula (XVII) at a temperature $T_1$ below 100° C. for a time $t_1$ which is sufficient to convert more than $f_1$=80 mol. % of the epoxide into a monohydroxyl-monoester of formula (XVIII):

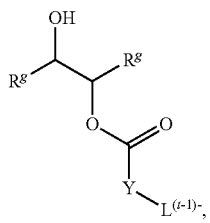
(XVIII)

a second step $S_2$ wherein the monohydroxyl-monoester and the epoxide which has not been converted at step S, into the monohydroxyl-monoester are reacted with the carboxylic acid of formula (XVII) at a temperature $T_2$ of at least 100° C. for a time $t_2$ which is sufficient to form the diester of formula (XV) in a molar amount greater than $f_2$=50 mol. % of the total amount of epoxide which is reacted with the carboxylic acid;

the Applicant has surprisingly found that reacting firstly the epoxide with the carboxylic acid at a temperature $T_1$ below 100° C. for a time $t_1$ sufficient to convert more than $f_1$=80 mol. % of the epoxide into a monohydroxyl-monoester (step $S_1$) before increasing the temperature to convert the monohydroxyl-monoester into the diester (step $S_2$) made it possible to limit the formation of ketone and dehydration by-products;

- item D.17: the method as described in item D.16 wherein the whole amount of the epoxide is added progressively during step $S_1$ in a reactor containing the whole amount of the carboxylic acid of formula (XVII);
- item D.18: the method as described in item D.17 wherein the whole amount of the epoxide is added continuously during step S, in a reactor containing the whole amount of the carboxylic acid of formula (XVII);
- item D.19: the method as described in any one of items D.16 to D.18 wherein $T_1$ is of at most 80° C.;
- item D.20: the method as described in item D.19 wherein $T_1$ is of at most 70° C.;
- item D.21: the method as described in any one of items D.16 to D.20 wherein $T_1$ is of at least 25° C.;
- item D.22: the method as described in item D.21 wherein $T_1$ is of at least 40° C., preferably at least 55° C., more preferably at least 60° C.;
- item D.23: the method as described in any one of items D.16 to D.22 wherein $f_1$=90 mol. %;
- item D.24: the method as described in item D.23 wherein $f_1$=95 mol. %;
- item D.25: the method as described in item D.24 wherein $f_1$=98 mol. %;
- item D.26: the method as described in any one of items D.16 to D.25 wherein $t_1$ ranges from 10 min to 10 h;
- item D.27: the method as described in item D.26 wherein $t_1$ is of at least 30 min, possibly at least 45 min;
- item D.28: the method as described in item D.26 or D.27 wherein $t_1$ is of at most 4 h, preferably from 30 min to 3 h;
- item D.29: the method as described in any one of items D.16 to D.28 wherein $T_2$ is of at least 120° C.;
- item D.30: the method as described in item D.29 wherein $T_2$ is of at least 130° C.;
- item D.31: the method as described in any one of items D.16 to D.30 wherein $T_2$ is of at most 250° C.,
- item D.32: the method as described in item D.31 wherein $T_2$ is of at most 200° C., preferably at most 170° C., more preferably at most 150° C.;
- item D.33: the method as described in any one of items D.16 to D.32 wherein the diester of formula (XV) is formed in a molar amount greater than $f_2$=65 mol. %;
- item D.34: the method as described in item D.33 wherein $f_2$=70 mol. %;
- item D.35: the method as described in item D.34 wherein $f_2$=75 mol. %; preferably, the diester of formula (XV) is formed in a molar $f_2$ of at least 80 mol. %;
- item D.36: the method as described in any one of items D.16 to D.35 wherein $t_2$ ranges from 1 h to 30 h;
- item D.37: the method as described in item D.36 wherein $t_2 \geq 3$ h;
- item D.38: the method as described in item D.37 wherein $t_2 \geq 4$ h;
- item D.39: the method as described in item D.36, D.37 or D.38 wherein $t_2$ is of at most 10 h;
- item D.40: the method as described in item D.39 wherein $t_2 \geq 7$ h;
- item D.41: the method as described in any one of items D.16 to D40 wherein step $S_2$ is conducted at a pressure $P_2$ of at most 90 kPa, preferably from 50 kPa to 90 kPa, more preferably from 70 kPa to 90 kPa, e.g. about 80 kPa;
- item D.42: the method as described in any one of items D.16 to D40 wherein step $S_2$ is conducted at a pressure $P_2$ from 95 kPa to 99 kPa, preferably from 96 kPa to 98 kPa, e.g. about 97.5 kPa;

the Applicant has observed that conducting step $S_2$ under a light vacuum made it easier to remove the water formed as by-product of the esterification;

- item D.43: the method as described in item D.41 or D.42 which comprises, upon completion of step $S_2$, reducing progressively the pressure $P_2$ to a pressure $P_3$ below 100 kPa, preferably of at most 50 kPa, more preferably of at most 20 kPa, e.g. about 10 kPa;

the Applicant has observed that this made it possible to distill the excess of the carboxylic acid and to boost the conversion from the monohydroxyl-monoester into the diester;

- item D.44: the method as described in any one of items D.1 to D.43 wherein the reaction is conducted in the presence of a Bronsted or Lewis acid catalyst;
- item D.45: the method as described in any one of items D.1 to D.43 wherein the reaction is conducted in the presence of a catalyst chosen from $H_2SO_4$, para-toluenesulfonic acid, trifluoromethanesulfonic acid, HCl, $AlCl_3$ and a heterogeneous acidic resin such as an Amberlite® resin;
- item D.46: the method as described in any one of items D.1 to D.43 wherein the reaction is conducted in the absence of any catalyst;
- item D.47: the method as described in any one of items D.1 to D.46 wherein the reaction is conducted in the absence of solvent;
- item D.48: the method as described in any one of items D.1 to D.46 wherein the reaction is conducted in the presence of a solvent, such as toluene, xylene, a hydrocarbon, DMSO, Me-THF or THF;
- item D.49: the method as described in any one of items D.1 to D.48 wherein $R^g$ (i.e. each $R^g$) is an aliphatic group;
- item D.50: the method as described in any one of items D.1 to D.49 wherein $R^g$ comprises at least 2, possibly at least 3 or at least 4 carbon atoms;
- item D.51: the method as described in any one of items D.1 to D.50 wherein $R^g$ comprises up to 4 carbon atoms;

item D.52: the method as described in any one of items D.1 to D.50 wherein $R^g$ comprises at least 5 carbon atoms;

item D.53: the method as described in any one of items D.1 to D.48 wherein $R^g$ (i.e. each $R^g$), which may be the same or different at each occurrence, represents a $C_5$-$C_{27}$ aliphatic group, i.e. $R^g$ has the same definition as R, as previously described, and the diester which is obtained by the present method is a diester as previously described in item C.1, in connection with invention C;

item D.54: the method as described in item D.53 wherein the obtained diester is a diester as described in any one of items C.2 to C.28;

item D.55: the method as described in item D.53 or D.54 which comprises reacting an olefin of formula

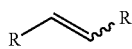

with an oxidizing agent of formula ROOH with R as described in item C.31;

item D.56: the method as described in item D.55 which comprises obtaining the olefin of formula

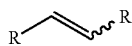

by applying the reaction scheme as described in item C.32;

item D.57: the method as described in any one of items D.1 to D.56 wherein $U^{u+}$ is chosen from $H^+$, $NH_4^+$, alkaline metal cations, alkaline earth metal cations and $Al^{+3}$;

item D.58: a monohydroxyl-monoester compound of formula (XVIII):

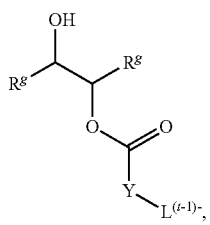

(XVIII)

wherein
$R^g$, which may be the same or different at each occurrence, is an aliphatic or halogenophatic group,
Y is a divalent $C_1$-$C_6$ aliphatic radical,
L is a leaving group, and
t is an integer which is equal to 1 or which is equal or superior to 2;

item D.59: the monohydroxyl-monoester compound as described in item D.58 wherein $R^g$ (i.e. each $R^g$), which may be the same or different at each occurrence, represents a $C_5$-$C_{27}$ aliphatic group, i.e. $R^g$ has the same definition as R, as previously described;

item D.60: the monohydroxyl-monoester compound as described in item D.59 wherein R, Y, L and t comply with one or more feature(s) as described in any one of items C.2 to C.28, in connection with the diester of invention C;

item D.61: use of the monohydroxyl-monoester compound as described in item D.58, D.59 or D.60 for the manufacture of a diester compound;

item D.62: use as described in item D.61 wherein the monohydroxyl-monoester compound is as described in item D.59 or D.60 and the diester compound is as described in any one of items C.1 to C.28.

Amine Condensation from the Diester

The diester compound of formula (XIV) can be converted into the ionic compound of formula (XI) (or its electroneutral homologue) through the following reaction scheme:

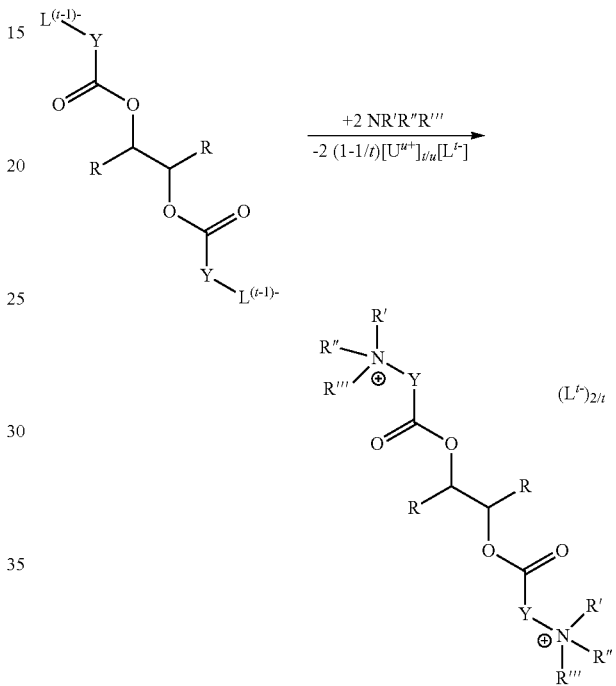

wherein
R, Y, L, t, $U^{u+}$ and U are as described here before, and
R', R" and R'" are $C_1$ to $C_4$ alkyl groups, preferably methyl or ethyl, most preferably methyl.

The amine condensation reaction is performed by contacting the intermediate diester obtained as described above with an amine of general formula NR'R"R'" where R', R" and R'" are $C_1$ to $C_4$ alkyl groups, preferably methyl or ethyl, most preferably methyl.

The reaction can be conducted at a temperature ranging from 15° C. to 250° C. in the presence of a suitable solvent. As example of a suitable solvent one can mention: THF, Me-THF, methanol, ethanol, isopropanol, DMSO, toluene, xylene or their mixture. Alternatively the reaction can be also conducted in the absence of any added solvent.

During this reaction, there is a nucleophilic attack of the amine that substitutes $L^{(t-1)-}$ in the diester, $L^{(t-1)-}$ plays the role of the leaving group. $L^{t-}$ becomes then the counteranion of the final quaternary ammonium compound. In the case the leaving group already carries a negative charge in the diester reactant (this is the case when (t−1) is equal or superior to 1 or when t is equal or superior to 2) there is also formation of a salt as the by-product of the reaction (with the general chemical formula $[U^{u+}]_{t/u}[L^{t-}]$ as shown in the equation scheme above).

Esterification and Amine Condensation/Direct Quaternization from the Diol
Starting from the diol of formula $$R\overset{OH}{\underset{OH}{-}}R$$

wherein R is as described here before, the Applicant has found that it is possible to obtain in one reaction step a compound which complies with formula (IX) or (XI), i.e. to achieve in one step said esterification and amine condensation, provided another appropriate esterification agent is used.

This appropriate esterification agent can be generally defined as an activated form of an amino-acid or an ester thereof of formula (XIXa)

R'R''R'''+N—Y—C(=O)—O−           (XIXa)

or their hydrohalogenide adducts of formula (XIXb)

R'R''R'''+N—Y—C(=O)—OHX−         (XIXb)

wherein
R', R'' and R''', which may be the same or different, are hydrogen or a $C_1$ to $C_4$ alkyl group,
Y is a divalent $C_1$-$C_6$ aliphatic radical, and
X denotes a halogen atom, such as chlorine or bromine.

The activated form of the amino-acid or ester thereof of formula (XIXa) or their hydrohalogenide adducts of formula (XIXb) is advantageously chosen from:
an acyl halogenide of formula (XX)

R'R''R'''+N—Y—C(=O)—XX−           (XX)

wherein R', R'', R''', Y and X are as described before in connection with formulae (XIXa) and (XIXb); in particular, it can be an acyl chloride of formula R'R''R'''+N—Y—C(=O)—ClC−.

Other suitable activated forms of the amino-acid or ester thereof of formula (XIXa) or their hydrohalogenide adducts of formula (XIXb) include an acyl azide of formula (XXI)

R'R''R'''+N—Y—C(=O)—N=N+=N−       (XXI)

and an acyl imidazole or acyl imidazolium.

Several publications describe the direct esterification of a polyol wherein the hydroxyl groups are primary (emphasis added) hydroxyl groups with an amino-acid or an ester thereof.

For example, Stakleff in *Acta Biomaterialia*, 9, 5132-5142 (2013), taught about the reaction of hexanediol with phenylalanine or leucine in the presence of p-toluene sulfonic acid.

Lele et al., in *Synthetic Communications*, 29:10, 1727-1739 (1999) achieved the mediated coupling of poly(ethylene glycol) and an amino-acid hydrochloride in the presence of dicyclohexylcarbodiimide.

Granö et al., in *Carbohydrate Polymers*, 41, 277-283 (2000), prepared starch betainate from starch and betainyl chloride in the presence of dioxane as solvent and pyridine as nucleophilic reagent and catalyst:

$$CH_3-\overset{CH_3}{\underset{CH_3}{\overset{|}{\underset{|}{N^+}}}}-CH_2-COCl \;\; +$$

-continued

[starch structure with OH groups] $\xrightarrow[\text{Dioxane}]{\text{Pyridine}}$

[starch betainate structure with $-O-C(=O)-CH_2-N(CH_3)_3^+$ $Cl^-$]

Betainyl chloride had been earlier prepared by reacting glycine betaine with thionyl chloride in dichloromethane.

On the other hand, none of these pieces of prior art addresses the possibility to quaternize directly a polyol bearing two or more secondary hydroxyl groups, the reactivity of which differs substantially from the reactivity of polyols bearing primary hydroxyl groups, as it could now be achieved within the frame of the present invention.

It was thus another object of the present invention to provide a new, efficient and easy method for the direct quaternization of diols of formula $$R^h\overset{OH}{\underset{OH}{-}}R^h$$

wherein $R^h$, which may be the same or different at each occurrence, represent an aliphatic group. In particular, it was another object of the present invention to a provide a new, efficient and easy method for the direct quaternization of diols of formula $$R\overset{OH}{\underset{OH}{-}}R$$

(with R as described herein before) whereby quaternary ammonium compounds with good surfactant properties and a good biodegradability are obtained.

This other object is achieved with a method ("invention E") which is described hereinafter under item E.1:

item E.1: a method for obtaining a quaternary ammonium compound having the general formula

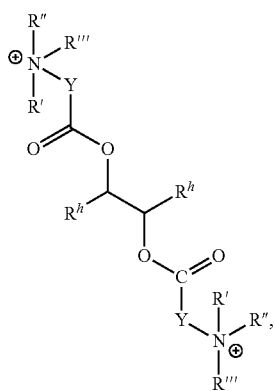

(XXII)

said method comprising reacting a diol of formula

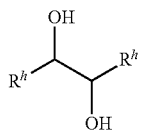

(XXIII)

with an activated form of an amino-acid or derivative thereof or their hydrohalogenide adducts,
wherein
the amino-acid or derivative thereof is of formula (XIXa)

R'R''R'''+N—Y—C(=O)—O⁻     (XIXa), and their hydrohalogenide adducts are of formula (XIXb)

R'R''R'''+N—Y—C(=O)—OHX⁻     (XIXb), $R^h$, which may be the same or different at each occurrence, is an aliphatic group
R', R'' and R''' are hydrogen or a $C_1$ to $C_4$ alkyl group,
Y is a divalent $C_1$-$C_6$ aliphatic radical, and
X denotes a halogen atom, such as chlorine or bromine.

It is understood that in formula (XXII), as it is the case for $R^h$, Y, R', R'' and R''' may be the same or different at each occurrence.

Preferred and/or particular embodiments of invention E are set hereinafter:
item E.2: the method as described in item E.1 wherein the activated form of the amino-acid or derivative thereof or their hydrohalogenide adducts is an acyl halogenide of formula (XX)

R'R''R'''+N—Y—C(=O)—XX⁻     (XX)

wherein R', R'', R''', Y and X are as described before in connection with formula (XXII);
item E.3: the method as described in item E.2 which comprises obtaining the acyl halogenide of formula (XX) by reacting the amino-acid or derivative thereof of formula (XIXa) and/or a hydrohalogenide adduct thereof of formula (XIXb) with a reagent chosen from a thionyl halogenide, an oxalyl halogenide, a phosphorus trihalogenide, a phosphorus pentahalogenide or a phosphorus oxyhalogenide, preferably by reacting the amino-acid or derivative thereof of formula (XIXa) and/or a hydrohalogenide adduct thereof of formula (XIXb) with a reagent chosen from thionyl chloride ($SOCl_2$), oxalyl chloride [$(COCl)_2$], phosphorus trichloride ($PCl_3$), phosphorus pentachloride ($PCl_5$) and phosphorus oxychloride ($POCl_3$), more preferably by reacting the amino-acid or derivative thereof of formula (XIXa) and/or a hydrohalogenide adduct of formula (XIXb) with thionyl chloride;
item E.4: the method as described in item E.1 wherein the activated form of the amino-acid or derivative thereof or their hydrohalogenide adducts is an acyl azide of formula (XXI)

R'R''R'''+N—Y—C(=O)—N=N⁺=N⁻     (XXI)

wherein R', R'', R''', Y and X are as described before in connection with formula (XXII);
item E.5: the method as described in any one of items E.1 to E.4 wherein X is chloride;
item E.6: the method as described in any one of items E.1 to E.5 wherein $R^g$ comprises at least 2, possibly at least 3 or at least 4 carbon atoms;
item E.7: the method as described in any one of items E.1 to E.6 wherein $R^g$ comprises up to 4 carbon atoms;
item E.8: the method as described in any one of items E.1 to E.6 wherein $R^g$ comprises at least 5 carbon atoms;
item E.9: the method as described in item E.8 wherein $R^g$ (i.e. each $R^g$), which may be the same or different at each occurrence, represents a $C_5$-$C_{27}$ aliphatic group, i.e. $R^g$ has the same definition as R as previously described, for example in connection with invention C, and the quaternary ammonium compound which is obtained by the present method is of formula (XI);
item E.10: the method as described in item E.9 wherein R is as described in any one of items C.2 to C.28;
item E.11: the method as described in any one of items E.1 to E.10 wherein Y is chosen —$CH_2$—, —$CH(CH_3)$—, —$CH[CH(CH_3)_2]$—, —$CH[CH_2$—$CH(CH_3)_2]$— and —$CH[CH(CH_3)$—$CH_2$—$CH_3]$—;
item E.12: the method as described in item E.11 wherein Y is —$CH_2$—;
item E.13: the method as described in any one of items E.1 to E.12 wherein at least one of R', R'' and R''' is a $C_1$ to $C_4$ alkyl group;
item E.14: the method as described in item E.13 wherein R' is a $C_1$ to $C_4$ alkyl group, R'' is a $C_1$ to $C_4$ alkyl group and R''' is a $C_1$ to $C_4$ alkyl group;
item E.15: the method as described in item E.14 wherein R', R'' and R''' are methyl;
item E.16: the method as described in any one of items E.1 to E.15 wherein the amino-acid or derivative thereof of formula (XIXa) is trimethyl glycine and the hydrohalogenide adduct of formula (XIXb) is betaine hydrochloride.

Second Process for Synthesis of Compounds Wherein A is Represented by A-5 as Exemplified by Formulae (IX) and (XI)

Acyloin Condensation

An alternative process for the synthesis of compounds in accordance with the present invention wherein A is represented by A-5 and shown in the scheme below for compounds of formulae (IX) and (XI) proceeds via an acyloin condensation in accordance with the following scheme:

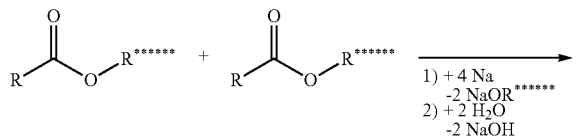

-continued

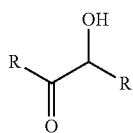

wherein R****** is an alkyl group having from 1 to 6 carbon atoms.

The acyloin condensation is generally performed by reacting an ester (typically a fatty acid methyl ester) with sodium metal as the reducing agent. The reaction be performed in a high boiling point aromatic solvent such as toluene or xylene where the metal can be dispersed at a temperature above its melting point (around 98° C. in the case of sodium). The reaction can be conducted at a temperature ranging from 100° C. to 200° C. At the end of the reduction, the reaction medium can be carefully quenched with water and the organic phase containing the desired acyloin product can be separated. The final product can be obtained after a proper work-up and the skilled person is aware of representative techniques so that no further details need to be given here.

Reactions of this type have been described in the literature, e.g. in Hansley, J. Am. Chem. Soc 1935, 57, 2303-2305 or van Heyningen, J. Am. Chem. Soc. 1952, 74, 4861-4864 or in Rongacli et al., Eur. J. Lipd Sci. Technol. 2008, 110, 846-852, to which reference is made herewith for further details.

Keto-Alcohol Hydrogenation

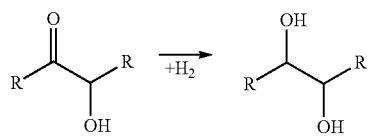

This reaction can be conducted using the conditions described hereinbefore for the first process variant for the manufacture of compounds of formulae (IX) and (XI), respectively compounds wherein A is represented by A-5.

The subsequent reaction steps are also as described hereinbefore for the first process variant for the manufacture of compounds of formulae (IX) and (XI), respectively compounds wherein A is represented by A-5.

A suitable process for the manufacture of compounds wherein A is represented by A-2, more specifically for compounds of formula (VIII) is described in the experimental part hereinafter.

The exemplary processes described before are examples of suitable processes, i.e. there might be other suitable processes to synthesize the compounds in accordance with the present invention. The processes described hereinbefore are thus not limiting as far as the methods of manufacture of the compounds according to the present invention is concerned.

The number of carbon atoms of the two groups R in compounds of formulae IV, V, VII, VIII and X are preferably any of the following couples if the internal ketones used as reactant in the exemplary processes described hereinbefore are obtained from natural fatty acids having an even number of carbon atoms:
(5,5), (7,7), (9,9), (11,11), (13,13), (15,15), (17,17)
(7,9), (7,11), (7,13), (7,15), (7,17)
(9,11), (9,13), (9,15), (9,17)
(11,13), (11,15), (11,17)
(13,15), (13,17)
(15,17).

In particular, if the internal ketones used as reactant in the exemplary processes described hereinbefore are obtained from one or more carboxylic acids having an even number of carbon atoms ranging from 12 to 18, the number of carbon atoms of the two groups R in compounds of formulae IV, V, VII, VIII and X are one or more of the following couples:
(11,11), (13,13), (15,15), (17,17)
(11,13), (11,15), (11,17)
(13,15), (13,17)
(15,17).

If the internal ketone is derived from fatty acids comprising an odd number of carbon atoms, other couples are possible and will be obtained.

For compounds of formulae VI, IX and XI, the number of carbon atoms of the two groups R are preferably any of the following couples if the internal ketones used as reactant in the exemplary processes described hereinbefore are derived from natural fatty acids having an even number of carbon atoms:
(4,5), (6,7), (8,9), (10,11), (12,13), (14,15), (16,17)
(4,7), (4,9), (4,11), (4,13), (4,15), (4,17)
(5,6), (5,8), (5,10), (5,12), (5,14), (5,16)
(6,9), (6,11), (6,13), (6,15), (6,17)
(7,8), (7,10), (7,12), (7,14), (7,16)
(8,11), (8,13), (8,15), (8,17)
(9,10), (9,12), (9,14), (9,16)
(10,13), (10,15), (10,17)
(11,12), (11,14), (11,16)
(12,15), (12,17)
(13,14), (13,16)
(14,17)
(15,16).

In particular, if the internal ketones used as reactant in the exemplary processes described hereinbefore are obtained from one or more carboxylic acids having an even number of carbon atoms ranging from 12 to 18, the number of carbon atoms of the two groups R in compounds of formulae VI, IX and XI are one or more of the following couples:
(10,11), (12,13), (14,15), (16,17)
(10,13), (10,15), (10,17)
(11,12), (11,14), (11,16)
(12,15), (12,17)
(13,14), (13,16)
(14,17)
(15,16)

If the internal ketone is obtained from fatty acids comprising an odd numbers of carbon atoms, other couples are possible and will be obtained.

Compounds wherein A is represented by A-5 and in particular compounds of formula (XI), especially compounds of formula (IX), possess a particularly interesting and advantageous property profile of surfactant properties on one hand and biodegradability properties on the other hand. As biodegradability is becoming more and more an important aspect for surfactant products, compounds wherein A is represented by A-5, and in particular amongst this group the compounds of formula (X), especially the compounds of formula (IX), constitute a preferred embodiment of the present invention.

The compounds of the present invention can be used as surfactants. Surfactants are compounds that lower the surface tension (or interfacial tension) between two liquids, a liquid and a gas or between a liquid and a solid. Surfactants may act as detergents, wetting agents, emulsifiers, foaming agents, and dispersants.

Surfactants are usually organic compounds that are amphiphilic, meaning they contain both hydrophobic groups (their tails) and hydrophilic groups (their heads). Therefore, a surfactant contains both a water-insoluble (or oil-soluble) component and a water-soluble component. Surfactants will diffuse in water and adsorb at interfaces between air and water or at the interface between oil and water, in the case where water is mixed with oil. The water-insoluble hydrophobic group may extend out of the bulk water phase, into the air or into the oil phase, while the water-soluble head group remains in the water phase.

The adsorption of a cationic surfactant on negatively charged surfaces is an important property for such surfactants. This property is usually linked to the minimum concentration of surfactant needed to produce aggregation of a negatively charged cellulose nanocrystal (CNC, which is often used as reference material)) suspension in aqueous media. Consecutive variation of size can be monitored and followed by dynamic light scattering (DLS).

Following the protocol described in E. K. Oikonomou et al., J. Phys. Chem. B, 2017, 121 (10), 2299-307 the adsorption properties of the quaternary ammonium compounds can be investigated by monitoring the ratio X=[surfactant]/[CNC] or the mass fraction M=[surfactant]/([surfactant+[CNC]), at fixed [surfactant]+[CNC]=0.01 wt % in aqueous solution, required to induce the agglomeration of the cellulose nanocrystals.

The biodegradability of the compounds of the present invention can be determined in accordance with procedures described in the prior art and known to the skilled person. Details about one such method, OECD standard 301, are given in the experimental section hereinafter.

Should the disclosure of any patents, patent applications, and publications which are incorporated herein by reference conflict with the description of the present application to the extent that it may render a term unclear, the present description shall take precedence.

WORKING EXAMPLES

Example 1—Synthesis of a Quaternary Ammonium Compound of Formula IV Wherein J is J3, i.e. Wherein n and n' in Group X are Each 1, Starting from 12-tricosanol $C_{23}$ 12-tricosanol was obtained from $C_{23}$ 12-tricosanone through catalytic hydrogenation according to US-A 2018/093936 (see example 3 in this document).

All the reactions were conducted in carefully dried vessels and under an inert argon atmosphere.

Fresh commercial anhydrous $CHCl_3$ (amylene stabilized), anhydrous toluene and anhydrous acetonitrile were used as such. Choline chloride (which is hygroscopic) was washed several times with anhydrous THF and dried under vacuum prior to use.

Into a 500 mL round bottom flask equipped with a condenser, a temperature probe, a heater and a magnetic stirrer were added 38.37 g of 12-tricosanol (112.7 mmol) followed by 150 mL of toluene. The mixture was then allowed to stir at room temperature and 0.1 g of solid KOH (1.7 mmol, 1.6 mol %) was then added followed by 18.26 g of carbonyldiimidazole (112.7 mmol, 1 eq.) and an additional 20 mL of toluene.

The mixture was then allowed to stir at 70° C.; at this temperature the mixture became transparent. Reaction progress was followed by $^1$H-NMR and after three hours at 70° C., an alcohol conversion of 99% was reached.

All the volatiles were then removed through distillation at 50° C., 9 mbar to afford 59.4 g of a residue which was used in the next stage without purification.

The residue was then solubilized in a mixture of 40 mL $CHCl_3$ and 40 mL of acetonitrile and 15.74 g of choline chloride (112.7 mmol, 1 eq.) was added at room temperature. The mixture was then allowed to stir at 50° C. overnight.

Over the course of the reaction, the reaction medium turned homogeneous and green. The reaction progress was followed by $^1$H-NMR and a conversion of 89% was obtained at this stage. The solvent was then removed under vacuum to afford around 79.1 g of crude.

The crude residue was purified by chromatography on silica gel (330 g of silica) in order to remove impurities and imidazole by-product (the specification is <0.5 wt % of imidazole) using an ethylacetate/methanol (AcOEt/MeOH) eluent (going from 100% AcOEt to 50:50 AcOEt:MeOH).

Five fractions were collected: the first fraction corresponding to the intermediate imidazole carbonate as well as the second fraction corresponding to the imidazole were discarded and the three remaining fractions were collected and re-purified.

For the second chromatography on silica gel, 200 g of silica was used with the same eluent system. Two fractions were collected: the first one was a mixture of product and imidazole and the second one was the pure product.

Finally the first fraction was purified again using 30 g of silica gel and the same eluent system to afford additional amount of product.

All clean fractions were collected affording 39.8 g of product as a white wax corresponding to 70% isolated yield.

$^1$H NMR (CDCl$_3$, 400 MHz) δ (ppm): 4.65 (quint, 1H), 4.61-4.51 (m, 2H), 4.22-4.02 (m, 2H), 3.52 (s, 9H), 1.61-1.44 (m, 4H), 1.32-1.12 (m, 36H), 0.84 (t, J=8.0 Hz, 6H).

$^{13}$C NMR (CDCl$_3$, 101 MHz) δ (ppm): 154.21, 80.88, 64.92, 61.24, 54.59, 33.96, 32.10, 29.83, 29.82, 29.80, 29.70, 29.68, 29.54, 25.36, 22.88, 14.31 (terminal CH$_3$).

Example 2—Synthesis of a Quaternary Ammonium Compound of Formula IV Wherein J is J3, i.e. Wherein n and n' in Group X are Each 1, Starting from 16-hentriacontanol $C_{31}$ 16-hentriacontanol was obtained from $C_{31}$ 16-hentriacontanol through catalytic hydrogenation according to US-A US2018/093936 (see example 3 in this document).

All the reactions were conducted in carefully dried vessels and under an inert argon atmosphere.

Fresh commercial anhydrous $CHCl_3$ (amylene stabilized), anhydrous toluene and anhydrous acetonitrile were used as such. Choline chloride (which is hygroscopic) was washed several times with anhydrous THF and dried under vacuum prior to use.

In a 500 mL round bottom flask equipped with a condenser, a temperature probe, a heater and a magnetic stirrer were added 45.2 g of 16-hentriacontanol (99.9 mmol) followed by 150 mL of toluene. The mixture was then allowed to stir at room temperature and 0.1 g of solid KOH (1.7 mmol, 1.7 mol %) was then added followed by 17.0 g of carbonyldiimidazole (105 mmol, 1.05 eq.) and an additional 50 mL of toluene.

The mixture was then allowed to stir at 60° C.; at this temperature the mixture became transparent. Reaction progress was followed by $^1$H-NMR and after one hour at 60° C., an alcohol conversion >99% was reached.

All the volatiles were then removed through vacuum to afford a white residue which was used in the next stage without purification.

The residue was then solubilized in a mixture of 80 mL CHCl$_3$ and 80 mL of acetonitrile and 13.95 g of choline chloride (99.9 mmol, 1 eq.) was added at room temperature. The mixture was then allowed to stir at 55° C. overnight.

The reaction progress was followed by $^1$H-NMR and only a weak conversion of 30% was obtained at this stage. This weak conversion could be explained by KOH decomposition (for example by reaction with CHCl$_3$).

0.3 g of KOH (5.1 mmol) was then added and the mixture was stirred at reflux during an additional 3 hours. The conversion level reached 78% according to NMR.

An additional 0.2 g of KOH was again added followed by stirring at reflux during twelve hours.

At this stage, conversion level was 83% and the color of the mixture was brown.

The solvent was then removed under vacuum to afford around 84 g of crude.

The crude residue was purified by chromatography on silica gel (2 columns with 330 g of silica) in order to remove impurities and imidazole by-product (the specification is <0.5 wt % of imidazole) using an AcOEt/MeOH eluent (going from 100% AcOEt to 50:50 AcOEt:MeOH).

Four fractions were collected: the first fraction corresponded to the intermediate imidazole carbonate and the second fraction corresponded to the imidazole. The third fraction contained a mixture of imidazole and desired product and the last fraction corresponded to the desired product.

The fourth fractions of each column were collected and subjected to a second chromatography on silica gel. 330 g of silica was used with the same eluent system to afford the desired product with good purity.

36.6 g of product as a white wax was obtained corresponding to 60% isolated yield.

$^1$H NMR (CDCl$_3$, 400 MHz) δ (ppm): 4.66 (quint, 1H), 4.62-4.52 (m, 2H), 4.24-4.04 (m, 2H), 3.53 (s, 9H), 1.62-1.46 (m, 4H), 1.34-1.14 (m, 52H), 0.85 (t, J=6.8 Hz, 6H).

$^{13}$C NMR (CDCl$_3$, 101 MHz) δ (ppm): 154.20, 80.87, 64.91, 61.23, 54.58, 33.96, 32.11, 29.90, 29.85, 29.82, 29.72, 29.69, 29.55, 25.36, 22.88, 14.31 (terminal CH3).

Example 3—Synthesis of a Mixture of Quaternary Ammonium Compounds Wherein A is Represented by A-2 or A-3 (a Mixture of Compounds of Formula (V) and (VI)) Starting from C$_{31}$-16-hentriacontanone Knoevenagel Condensation to Afford Diester Intermediate:

All the reactions were conducted in carefully dried vessels and under an inert argon atmosphere.

Fresh commercial anhydrous CHCl$_3$, anhydrous THF and anhydrous pyridine were used as such.

In a 1 L double-jacketed reactor equipped with a mechanical stirrer (propeller with four inclined plows), a condenser, an addition funnel and a temperature probe were added 36.5 mL of TiCl$_4$ (63.00 g, 0.332 mole), followed by 146.3 mL of CHCl$_3$.

The mixture was stirred at −10° C. and anhydrous THF (358 mL) was slowly added through the addition funnel at a rate avoiding a temperature increase of the reaction medium above +5° C. During THF addition, a yellow precipitate appeared. Then 15.3 mL of dimethyl malonate (17.69 g, 0.134 mole) were added into the reaction mixture which was then allowed to stir at room temperature for 1 hour in order to allow malonate complexation to occur.

Then the mixture was allowed to cool down to 0° C. and a solution of 71.80 mL of anhydrous pyridine (70.50 g, 0.891 mole) in 23 mL of THF was slowly added into the reactor. During addition, the colour of the mixture turned red. The mixture was then allowed to stir at room temperature during 20 minutes to allow deprotonation to occur.

Finally, 50.00 g of C$_{31}$ ketone (0.111 mole) was added into the reaction mixture which was allowed to stir at room temperature during one night and during one more day at 35° C. 250 mL of water were then carefully added into the reactor followed by 250 mL of diethyl ether. The organic phase was separated and washed 4 times with 250 mL of water and one time with 200 mL of a saturated aqueous NaCl solution in order to remove pyridinium salts. The aqueous phases were combined and re-extracted with 3 times 250 mL of diethyl ether. The final organic phase was dried over MgSO$_4$, filtered and evaporated under vacuum to afford 70.08 g of crude orange oil. At this stage the crude contains residual amount of starting ketone as well as a main impurity corresponding to the condensation (aldolisation+crotonisation) of 2 equivalents of ketone.

The product could be easily purified by dissolving the oil in ethanol (the by-product and the starting ketone being not soluble in ethanol) followed by a filtration over celite.

The filtrate was evaporated, re-dissolved in CHCl$_3$, filtered again and evaporated to afford 52.57 g of oil with 95% of purity (RMN).

The overall purified yield was 79%.

$^1$H NMR (CDCl$_3$, 400 MHz) δ (ppm): 3.68 (s, 6H), 2.32-2.19 (m, 4H), 1.45-1.39 (m, 4H), 1.30-1.10 (m, 48H), 0.81 (t, J=6.4 Hz, 6H).

$^{13}$C NMR (CDCl$_3$, 101 MHz) δ (ppm): 166.30, 164.47, 123.65, 52.15, 34.61, 32.15, 30.16, 29.92, 29.91, 29.87, 29.76, 29.60, 28.65, 22.92, 14.34 (terminal CH3).

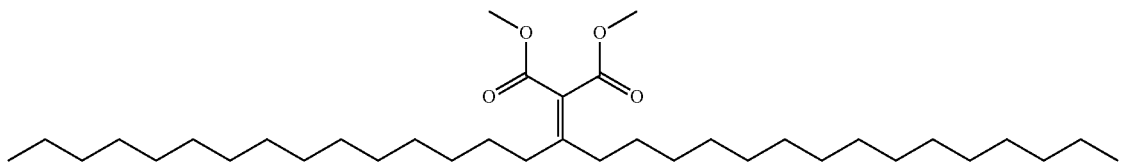 [SMILES: CCCCCCCCCCCCCCCC(CCCCCCCCCCCCCCC)=C(C(=O)OC)C(=O)OC]

Transesterification with Dimethylaminoethanol to Afford Diamine Mixtures Intermediates:

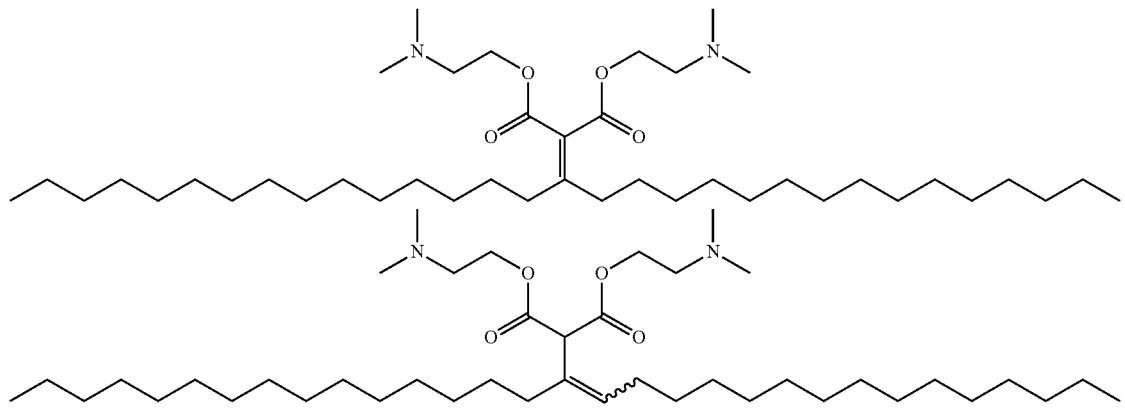

All the reactions were conducted in carefully dried vessels and under an inert argon atmosphere.

Fresh commercial anhydrous toluene and dimethylaminoethanol were used as such.

In a 2 L double-jacketed reactor equipped with a mechanical stirrer (propeller with four inclined plows), a condenser with a distillation apparatus and a temperature probe were added 42.7 g of the internal ketone/dimethyl malonate adduct (75.6 mmol) followed by 50 mL of toluene. The mixture was stirred at room temperature and 30.4 mL of dimethylaminoethanol (26.9 g, 302.2 mmol, 4 eq.) was added to the reaction system followed by 50 mL of toluene. Then 0.9 g of the catalyst dibutyltin oxide (3.8 mmol, 5 mol %) was added to the reaction mixture followed by 200 mL of toluene.

Then the mixture was allowed to stir at 120° C. and the reaction progress was followed by NMR analysis. To run a proper analysis an aliquot of the reaction medium was sampled and diluted in diethyl ether, quenched with water, decanted and the organic phase was evaporated under vacuum to be analysed in $CDCl_3$ NMR solvent. After 4 days of stirring at 120° C. NMR analysis showed that the conversion level was around 83% with 91% selectivity. In addition, by-product methanol was also present in the distillation flask. The reaction mixture was then allowed to cool down at room temperature and quenched with 500 mL of water. The medium was decanted and the aqueous phase was extracted with three times of 500 mL of diethyl ether. The organic phases were collected and washed three times with 500 mL of water and one time with 500 mL of a saturated aqueous NaCl solution in order to remove excess of dimethylaminoethanol. The organic phase was then dried over MgSO4, filtered and evaporated to give 47.9 g of a crude dark oil. At this stage the crude contained a residual amount of the starting malonate.

The product was then purified by flash chromatography on silica gel with a first eluent consisting on $CHCl_3$/AcOEt mixture going through a gradient from 100% $CHCl_3$ to 100% AcOEt.

In order to remove all the product from the column, the column was also flushed with isopropanol+$NEt_3$ mixture (10% vol $NEt_3$) allowing getting additional pure product.

The clean fractions were collected affording, after solvent evaporation, 27.8 g of a pure product corresponding to 54% isolated yield.

NMR analysis showed that the product was in the form of a mixture of two position isomers with the following ratio:

54 mol % of the isomerized product (cis and trans diastereoisomers) and 46 mol % of methylenated product.

$^1$H NMR ($CDCl_3$, 400 MHz) δ (ppm): 5.45-5.13 (m, 1H: isomer 2 cis+trans), 4.42 (s, 1H, isomer 2 cis or trans), 4.24-4.06 (m, 4H, isomer 1+2), 3.99 (s, 1H, isomer 2 cis or trans), 2.58-2.40 (m, 4H, isomer 1+2), 2.32-2.24 (m, 4H, isomer 1), 2.20 (s, 12H, isomer 1), 2.19 (s, 12H, isomer 2), 2.09-1.89 (m, 4H, isomer 2 cis+trans), 1.45-0.99 (m, 51H, isomer 1+2), 0.81 (t, J=6.8 Hz, 6H).

$^{13}$C NMR ($CDCl_3$, 101 MHz) δ (ppm): 168.60, 168.41, 165.49, 164.05, 132.07, 131.57, 131.12, 130.77, 123.73, 63.35, 62.76, 58.08, 57.49, 57.45, 53.45, 45.73, 34.45, 30.07, 30.03, 29.72, 29.68, 29.58, 29.53, 29.45, 29.38, 28.46, 28.43, 28.27, 28.09, 22.70, 14.13 (terminal $CH_3$).

Methylation to Afford a Mixture of Compounds (V) and (VI):

All the reactions were conducted in carefully dried vessels and under an inert argon atmosphere.

Fresh commercial anhydrous THF and dimethylsulfate were used as such.

In a 1 L double-jacketed reactor equipped with a mechanical stirrer, a condenser, an addition funnel and a temperature probe were added 100 mL of dry THF and 6.9 mL of dimethylsulfate (9.14 g, 72 mmol, 2 eq.). A solution of 24.6 g of the esteramine (36 mmol, 1 eq.) in 154 mL of THF was preliminary prepared in the addition funnel and was progressively added into the reactor under stirring at room temperature in order to limit the temperature increase. The mixture was then stirred at room temperature under argon and the reaction progress was monitored by NMR analysis. After 2 hours the mixture was brought to 40° C. and 0.2 mL of dimethyl sulfate (2 mmol, 0.06 eq.) were added to allow stirring and to achieve complete conversion.

Reaction was completed after one hour of stirring at 40° C. and all the volatiles (THF and remaining DMS) were removed under vacuum in order to afford 33.15 g of a 95 mol % purity product as a beige wax with 94% yield.

NMR analysis showed the presence of 2 position isomers with 55:45 ratio between isomerized derivative (cis and trans diastereoisomers) and conjugated non-isomerized methylenated derivative.

$^1$H NMR (MeOD, 400 MHz) δ (ppm): 5.60-5.25 (m, 1H: isomer 2 cis+trans), 4.80 (s, 1H, isomer 2 cis or trans), 4.75-4.50 (m, 4H, isomer 1+2), 4.38 (s, 1H, isomer 2 cis or trans), 3.84-3.72 (m, 4H, isomer 1+2), 3.69 (s, 6H, isomer 1+2), 3.22 (s, 18H, isomer 2), 3.21 (s, 18H, isomer 1), 2.50-2.35 (m, 4H, isomer 1), 2.22-2.02 (m, 4H, isomer 2 cis+trans), 1.60-1.09 (m, 35H, isomer 1+2), 0.90 (t, J=6.8 Hz, 6H).

$^{13}$C NMR (MeOD, 101 MHz) δ (ppm): 169.22, 169.01, 168.96, 165.52, 134.16, 133.22, 132.94, 131.74, 65.90, 65.81, 60.23, 60.18, 59.73, 55.27, 54.66, 54.62, 35.66, 35.54, 33.24, 33.23, 31.76, 31.01, 30.94, 30.91, 30.87, 30.85, 30.77, 30.74, 30.71, 30.66, 30.65, 30.63, 30.60, 29.73, 29.62, 29.45, 29.27, 23.89, 14.61 (terminal $CH_3$).

Example 4—Synthesis of a Mixture of Quaternary Ammonium Compounds Wherein A is Represented by A-2 or A-3 (a Mixture of Compounds of Formula (V) and (VI)) Starting from $C_{23}$-12-triocosanone Knoevenagel Condensation to Afford Diester Intermediate:

All the reactions were conducted in carefully dried vessels and under an inert argon atmosphere.

Fresh commercial anhydrous $CHCl_3$, anhydrous THF and anhydrous pyridine were used as such.

In a 1 L double-jacketed reactor equipped with a mechanical stirrer (propeller with four inclined plows), a condenser, an addition funnel and a temperature probe were added 48.6 mL of $TiCl_4$ (84.02 g, 0.443 mole), followed by 146 mL of $CHCl_3$. The mixture was stirred at −10° C. and anhydrous THF (358 mL) was slowly added through the addition funnel at a rate avoiding a temperature increase of the reaction medium above +5° C. During THF addition, a yellow precipitate appeared. Then 20.4 mL of dimethyl malonate (23.41 g, 0.177 mole) were added into the reaction mixture which was then allowed to stir at room temperature during 1 hour in order to allow malonate complexation to occur.

Then the mixture was allowed to cool down to 0° C. and a solution of 95.5 mL of anhydrous pyridine (93.44 g, 1.181 mole) in 23 mL of THF was slowly added to the reactor. During addition, the colour of the mixture turned red. The mixture was then allowed to stir at room temperature during 20 minutes to allow deprotonation to occur.

Finally, 50.00 g of $C_{23}$ ketone (0.148 mole) was added to the reaction mixture which was allowed to stir at room temperature during one night and during one more day at 35° C. 250 mL of water were then carefully added into the reactor followed by 250 mL of diethyl ether. The organic phase was separated and washed four times with 250 mL of water and one time with 200 mL of a saturated aqueous NaCl solution in order to remove pyridinium salts. The aqueous phases were collected and re-extracted with three times 250 mL of diethyl ether. The final organic phase was dried over $MgSO_4$, filtered and evaporated under vacuum to afford 69.5 g of crude orange oil. At this stage the crude contained residual amount of starting ketone as well as a main impurity corresponding to the condensation (aldolisation, crotonisation) of 2 equivalents of ketone.

The product could be easily purified by dissolving the oil in methanol (the by-product and the starting ketone being not soluble in methanol) followed by a filtration over celite.

The filtrate was evaporated to afford 54 g of oil with 95% of purity (RMN).

The overall purified yield was 77%.

$^1$H NMR ($CDCl_3$, 400 MHz) δ (ppm): 3.72 (s, 6H), 2.33-2.29 (m, 4H), 1.48-1.40 (m, 4H), 1.34-1.17 (m, 32H), 0.85 (t, J=6.4 Hz, 6H).

$^{13}$C NMR ($CDCl_3$, 101 MHz) δ (ppm): 166.28, 164.44, 123.63, 52.14, 34.6, 32.12, 30.13, 29.84, 29.73, 29.58, 29.55, 28.64, 22.90, 14.32 (terminal $CH_3$).

Transesterification with Dimethylaminoethanol to Afford Diamine Mixtures Intermediates:

All the reactions were conducted in carefully dried vessels and under an inert argon atmosphere.

Fresh commercial anhydrous toluene and dimethylaminoethanol were used as such.

In a 1 L double-jacketed reactor equipped with a mechanical stirrer (propeller with four inclined plows), a condenser with a distillation apparatus and a temperature probe was added a solution of 51.1 g of the internal ketone/dimethyl malonate adduct (110 mmol, 1 eq.) in 300 mL of toluene. The mixture was stirred at room temperature and 45.5 mL of dimethylaminoethanol (40.5 g, 450 mmol, 4 eq.) was added to the reaction medium followed by 1.37 g of the catalyst dibutyltin oxide (5.5 mmol, 5 mol %).

Then the mixture was allowed to stir at 120° C. and the reaction progress was followed by NMR analysis. To run a proper analysis an aliquot of the reaction medium was sampled and diluted in diethyl ether, quenched with water, decanted and the organic phase was evaporated under vacuum to be analysed in $CDCl_3$ NMR solvent. After 2 days of stirring at 120° C. the mixture was allowed to cool down at room temperature and was concentrated under vacuum. 200 mL of water was then added to the residue followed by 200 mL of diethyl ether. The organic phase was decanted and washed three times with 300 mL of water and one time with 300 mL of a saturated aqueous solution of NaCl in order to remove excess of dimethylaminoethanol. The aqueous phases were collected and re-extracted with 700 mL of diethyl ether. The organic phases were collected and then dried over MgSO4, filtered and evaporated. The residue obtained was re-dissolved in methanol and the precipitated solid was filtered. The filtrate was evaporated to afford 59.04 g of crude yellow oil. At this stage the crude contained residual amount of the starting malonate and some by-products.

The product was then purified by flash chromatography on silica gel with an eluent consisting on $CHCl_3$/isopropanol mixture going through a gradient from 100% $CHCl_3$ to 100% isopropanol.

The clean fractions were collected, affording after solvent evaporation 22.9 g of a pure product corresponding to 35% isolated yield.

NMR analysis showed that the product is in the form of 2 position isomers mixture with the following ratio: 60 mol % of the isomerized product (cis and trans diastereoisomers) and 40 mol % of methylenated product.

$^1$H NMR ($CDCl_3$, 400 MHz) δ (ppm): 5.45-5.15 (m, 1H: isomer 2 cis+trans), 4.42 (s, 1H, isomer 2 cis or trans), 4.24-4.08 (m, 4H, isomer 1+2), 3.99 (s, 1H, isomer 2 cis or trans), 2.65-2.40 (m, 4H, isomer 1+2), 2.32-2.24 (m, 4H, isomer 1), 2.20 (s, 12H, isomer 1), 2.19 (s, 12H, isomer 2), 2.10-1.90 (m, 4H, isomer 2 cis+trans), 1.50-0.95 (m, 35H, isomer 1+2), 0.81 (t, J=6.4 Hz, 6H).

$^{13}$C NMR ($CDCl_3$, 101 MHz) δ (ppm): 168.81, 168.62, 165.71, 164.24, 132.27, 131.78, 131.33, 130.97, 123.95, 63.57, 62.98, 58.29, 57.69, 57.65, 53.71, 45.94, 34.66, 34.28, 32.13, 31.02, 30.23, 29.90, 29.87, 29.78, 29.65, 29.57, 29.55, 28.67, 28.64, 28.47, 28.29, 22.90, 14.33 (terminal $CH_3$).

Methylation to Afford Mixture of Compounds V and VI:

All the reactions were conducted in carefully dried vessels and under an inert argon atmosphere.

Fresh commercial anhydrous THF and dimethylsulfate were used as such.

In a 200 mL double-jacketed reactor equipped with a mechanical stirrer (propeller with four inclined plows), a condenser, an addition funnel and a temperature probe were added 100 mL of dry THF and 7.59 mL of dimethylsulfate (10.1 g, 80 mmol, 2 eq.). A solution of 22.94 g of the esteramine (40 mmol, 1 eq.) in 154 mL of THF was preliminary prepared in the addition funnel and was progressively added into the reactor under stirring at room temperature in order to limit the temperature increase. The mixture was then stirred at room temperature under argon and the reaction progress was monitored by NMR analysis. Reaction was completed after one hour of stirring at room temperature and all the volatiles (THF and remaining DMS) were removed under vacuum in order to afford 32.6 g of product as a beige wax with 99% yield.

NMR analysis showed the presence of two position isomers with 60:40 ratio between isomerized derivative (cis and trans diastereoisomers) and conjugated non-isomerized methylenated derivative.

$^1$H NMR (MeOD, 400 MHz) δ (ppm): 5.60-5.25 (m, 1H: isomer 2 cis+trans), 4.80 (s, 1H, isomer 2 cis or trans), 4.75-4.50 (m, 4H, isomer 1+2), 4.38 (s, 1H, isomer 2 cis or trans), 3.84-3.72 (m, 4H, isomer 1+2), 3.69 (s, 6H, isomer 1+2), 3.22 (s, 18H, isomer 2), 3.21 (s, 18H, isomer 1), 2.50-2.35 (m, 4H, isomer 1), 2.22-2.02 (m, 4H, isomer 2 cis+trans), 1.60-1.09 (m, 35H, isomer 1+2), 0.90 (t, J=6.8 Hz, 6H).

$^{13}$C NMR (MeOD, 101 MHz) δ (ppm): 169.22, 169.01, 168.96, 165.52, 134.16, 133.22, 132.94, 131.74, 65.90, 65.81, 60.23, 60.18, 59.73, 55.27, 54.66, 54.62, 35.66, 35.54, 33.24, 33.23, 31.76, 31.01, 30.94, 30.91, 30.87, 30.85, 30.77, 30.74, 30.71, 30.66, 30.65, 30.63, 30.60, 29.73, 29.62, 29.45, 29.27, 23.89, 14.61 (terminal CH$_3$).

Example 5—Synthesis of a Compound Wherein a is Represented by A-1, Specifically a Compound of Formula VII Starting from C$_{23}$ 12 Tricosanone Reductive Amination to Afford Primary Amine All the reactions were conducted under an inert argon atmosphere.

In a 5 L three necked round bottom flask equipped with a magnetic stirrer, a condenser, a temperature probe and a heater a solution of tricosan-12-one (100 g, 0.295 mol, 1 eq.) in 700 mL of methanol was prepared.

Then NH$_4$OAc (227.386 g, 2.95 mol, 10 eq.) followed by NaCNBH$_3$ (74.15 g, 1.18 mol, 4 eq.) are added to the mixture in small portions. The reaction medium was stirred at room temperature for 1 hour. Finally, the mixture was heated under reflux during 16 hours. Then the reaction medium was cooled down to room temperature and concentrated under vacuum.

Finally, 500 mL of a saturated NaHCO$_3$ aqueous solution and 500 mL of methyl tert. butyl ether (MTBE) were added to the residue and the mixture was stirred at room temperature for one hour. Concentrated aqueous NaOH solution was added in order to adjust the pH to about 9. The product was extracted with MTBE and the organic phase was washed several times with water and brine. The organic phase was dried with K$_2$CO$_3$, filtered and concentrated in vacuum to afford 100.4 g of crude yellow oil.

The crude was then purified through flash chromatography column over silica gel using dichloromethane (DCM): methanol mixture as the eluent with a gradient going from DCM:MeOH=100:1 to DCM:MeOH=10:1+1% Et$_3$N. After solvent evaporation 93.5 g (0.275 mol) of pure light yellow oil was obtained.

Yield: 93%

Alkylation of Primary Amine to Afford Amino-Diester Intermediate

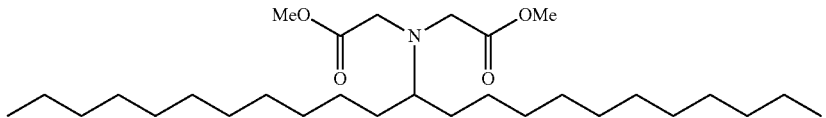

The reaction was carried out under an inert argon atmosphere.

In a 1 L round bottom flask equipped with a condenser, a temperature probe, a magnetic stirrer and a heater were added:

62.0 g (0.18 mol, 1 eq.) of the C$_{23}$ fatty primary amine.
700 mL of methyl-THF.
63.7 g of methyl 2-chloroacetate (0.59 mol, 3.3 eq.).
81.5 g of K$_2$CO$_3$ (0.59 mol, 3.3 eq.).
97.94 g of KI (0.59 mol, 3.3 eq.).

The mixture was then allowed to stir at reflux (78-80° C.) during one night.

At the end of the reaction the mixture was filtered and concentrated under vacuum to give 98.0 g of crude material that still contained methyl 2-chloroacetate.

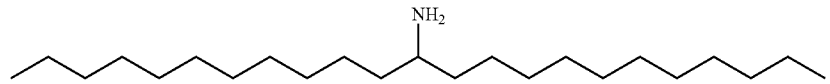 [SMILES: CCCCCCCCCCCC(N)CCCCCCCCCCC]

The product was then purified by flash chromatography over silica gel using petroleum ether:ethyl acetate mixture (50:1) as the eluent to afford after solvent evaporation 52 g of pure material (0.108 mol).

Yield: 60%

Ester Hydrolysis to Afford Iminodiacetic Acid Intermediate.

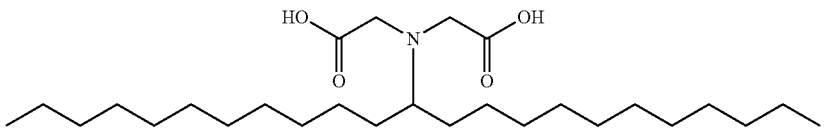 [SMILES: CCCCCCCCCCCC(CCCCCCCCCCC)N(CC(=O)O)CC(=O)O]

In a 2 L round bottom flask equipped with a magnetic stirrer were added:
27.3 g of NaOH (0.683 mol, 6.0 eq.)
300 mL of water
300 mL of methanol
300 mL of THF The solution obtained was then allowed to stir at 0° C. and 55 g of the amino-diester (0.113 mol, 1 eq.) were slowly added.

The reaction medium was then stirred at room temperature overnight.

At the end of the reaction, the pH was adjusted from 11 to 1 by the addition of concentrated HCl solution and the product was extracted using two times 3 L of dichloromethane.

The organic phases were collected and washed several times with brine, dried over $MgSO_4$, filtered and the solvent was evaporated under vacuum to afford 55 g of product which was used as such for the next step.

Quantitative Yield

Esterification with dimethylaminoethanol to afford diester intermediate

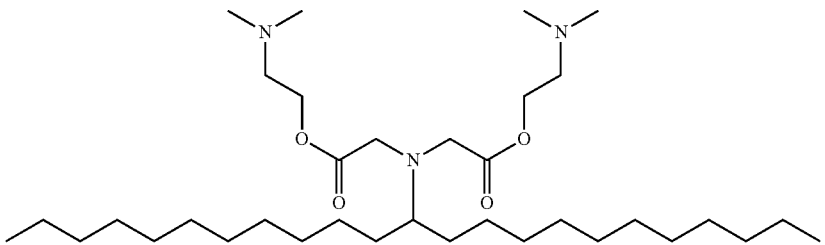 [SMILES: CCCCCCCCCCCC(CCCCCCCCCCC)N(CC(=O)OCCN(C)C)CC(=O)OCCN(C)C]

The reaction was carried out under an inert argon atmosphere.

In a 2 L round bottom flask equipped with a magnetic stirrer were added:
53.3 g (0.117 mol, 1 eq.) of the iminodiacetic acid intermediate
2 L of dichloromethane
104.2 g of dimethylaminoethanol (1.17 mole, 10 eq.)
142 g of trimethylamine (1.40 moles, 12 eq.)
189.7 g of HOBt (1.40 moles, 12 eq.)

The mixture was allowed to cool down to 0° C. and 220 g of EDCl (1.15 moles, 10 eq.) were added into the reaction vessel.

The mixture was allowed to stir at room temperature during twenty hours allowing the reaction to reach completion.

The reaction mixture was then washed with water and the organic phase was dried over $MgSO_4$, filtered and evaporated under vacuum to afford 118 g of crude product as dark yellow oil.

The crude material was then purified through flash chromatography over silica gel using first petroleum ether: CH2Cl2 mixture (9:1) as the eluent and then $CH_2Cl_2$:isopropanol (50:1)+1.5% $NEt_3$ mixture.

Two fractions were obtained: a first fraction containing 31.0 g of product and a second fraction containing 35 g of material.

The second fraction was then purified a second time to afford 29.2 g of deep yellow oil.

Overall 60.2 g (101 mmoles) of pure product were obtained as a yellow oil.

Yield: 86%

Quaternization to Obtain Compound of Formula (VII)

All the reactions were conducted in carefully dried vessels and under an inert argon atmosphere.

Fresh commercial anhydrous THF and dimethylsulfate were used as such.

In a 200 mL double-jacketed reactor equipped with a mechanical stirrer (propeller with four inclined plows), a condenser, an addition funnel and a temperature probe were added 100 mL of dry THF and 8.0 mL of dimethylsulfate (10.6 g, 84 mmol, 2 eq.). A solution of 25.2 g of the esteramine (42 mmol, 1 eq.) in 154 mL of THF was prepared in the addition funnel and was progressively added to the reactor under stirring at room temperature in order to limit the temperature increase. The mixture was then stirred at room temperature under argon and the reaction progress was monitored by NMR analysis. Reaction was completed after one hour of stirring at room temperature and all the volatiles (THF and remaining DMS) were removed under vacuum in order to afford 35.7 g of product as a beige wax in quantitative yield.

$^1$H NMR (MeOD, 400 MHz) δ (ppm): 4.59-4.50 (m, 4H), 3.78-3.71 (m, 4H), 3.68 (s, 6H), 3.59-3.51 (brs, 4H), 3.25 (s, 18H), 2.68-2.54 (m, 1H), 1.60-1.00 (m, 40H), 0.90 (t, J=6.4 Hz, 6H).

$^{13}$C NMR (MeOD, 101 MHz) δ (ppm): 173.02, 66.13, 65.49, 59.35, 55.26, 54.69, 54.34, 33.23, 32.82, 31.04, 30.95, 30.93, 30.91, 30.63, 28.27, 23.89, 14.61 (terminal $CH_3$).

Example 6—Synthesis of a Compound Wherein a is Represented by A-1, Specifically a Compound of Formula VII Starting from $C_{31}$ 16-hentriacontanone Reductive Amination to Afford Primary Amine.

Same protocol as described in Example 5 above for the $C_{23}$ derivative was followed.

Alkylation of Primary Amine to Afford Amino-Diester Intermediate.

The reaction was carried out under an inert argon atmosphere.

In a 500 mL round bottom flask equipped with a condenser, a temperature probe, a magnetic stirrer and a heater were added:

18.0 g (40 mmoles, 1 eq.) of the $C_{31}$ fatty primary amine.
500 mL of methyl-THF.
12.48 g of methyl 2-chloroacetate (132 mmoles, 3.3 eq.).
18.24 g of $K_2CO_3$ (132 mmoles, 3.3 eq.).
21.92 g of KI (132 mol, 3.3 eq.).

The mixture was then allowed to stir at reflux (78-80° C.) during one night.

At the end of the reaction the mixture was filtered over a plug of celite. The solid was washed with THF and the filtrate was concentrated under vacuum to afford a crude material that still contained methyl 2-chloroacetate.

The product was then purified by flash chromatography over silica gel using petroleum ether:ethyl acetate mixture (100:1) as the eluent to afford after solvent evaporation 22.4 g of pure material (37.6 mmoles).

Yield: 94%

Ester Hydrolysis to Afford Imino-Diacetic Acid Intermediate.

In a 1 L round bottom flask equipped with a magnetic stirrer were added:

11.3 g of NaOH (0.282 mol, 6.0 eq.)
100 mL of water
100 mL of methanol
100 mL of THF The solution obtained was then allowed to stir at 0° C. and 28 g of the amino-diester (0.047 mol, 1 eq.) was slowly added.

The reaction medium was then stirred at room temperature overnight.

At the end of the reaction, the pH was adjusted from 11 to 2 by the addition of 1M HCl aqueous solution and the product was extracted using dichloromethane.

The organic phases were collected and washed several times with brine and finally concentrated. The residue was redissolved in THF and the organic solution was dried over $MgSO_4$, filtered and the solvent was evaporated under vacuum to afford 26 g of product (45.8 mmoles) which was used as such for the next step.

Yield: 97%.

Esterification with Dimethylaminoethanol to Afford Diester Intermediate.

Same protocol as described in Example 5 for the $C_{23}$ derivative was followed.

Quaternization to Obtain Compound of Formula VII

Same protocol as described in Example 5 for the $C_{23}$ derivative was followed.

$^1$H NMR (MeOD, 400 MHz) δ (ppm): 4.52-4.36 (m, 4H), 3.71-3.61 (m, 4H), 3.58 (s, 6H), 3.46-3.39 (brs, 4H), 3.15 (s, 18H), 2.58-2.39 (m, 1H), 1.60-1.00 (m, 56H), 0.80 (t, J=6.8 Hz, 6H).

$^{13}$C NMR (MeOD, 101 MHz) δ (ppm): 173.09, 66.09, 65.23, 59.31, 55.25, 54.69, 54.29, 33.25, 32.82, 31.03, 30.99, 30.96, 30.91, 30.87, 30.66, 28.24, 28.13, 23.91, 14.68 (terminal $CH_3$).

Example 7—Synthesis of a Compound of Formula (VIII) Starting from 16-hentriacontanone Reductive Amination to Afford Aminodiol Intermediate

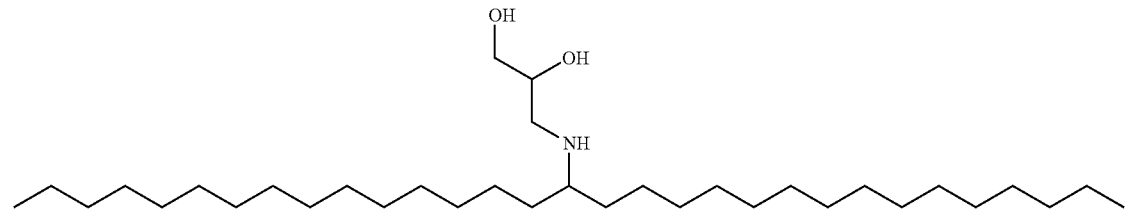 [SMILES: CCCCCCCCCCCCCCCC(CCCCCCCCCCCCCCC)NCC(O)CO]

The reaction was conducted under an inert argon atmosphere.

In a 1 L double-jacketed reactor equipped with a mechanical stirrer (propeller with four inclined plows), a condenser and a temperature probe were added:

50 g of 16-hentriacontanone (111 mmoles, 1 eq.)
281 mL of $CHCl_3$
17.73 mL of 3-amino-1,2-propanediol (20.8 g, 222 mmoles, 2 eq.)

The mixture was then stirred at room temperature and 54.71 mL of $Ti(OEt)_4$ (59.52 g, 222 mmoles, 2 eq.) was added into the reactor. The mixture was then stirred at 65° C. overnight and it was observed that during the course of the reaction the mixture became homogeneous.

At the end of the reaction, the temperature was cooled down to 40° C. and 56 mL of anhydrous methanol was added into the reactor followed by the careful and slow addition of 8.74 g of $NaBH_4$ (222 mmoles, 2 eq.). Care was taken to avoid foaming during $NaBH_4$ addition.

The reaction medium was then stirred at 40° C. during three hours.

Then the mixture was cooled down to room temperature and 100 mL of water were added followed by 100 mL of diethyl ether. During water addition precipitation of $TiO_2$ occurred.

The suspension was filtered, the solid was washed several times with diethyl ether and the biphasic filtrate was separated. The organic phase was again filtered over celite and was washed with water and brine. The organic phase was then dried over $MgSO_4$, filtered and evaporated to afford the crude material as a yellow paste (48.9 g).

The crude was then purified through flash chromatography over silica gel using $CHCl_3$:isopropanol mixture as the eluent with a gradient going from 100:0 to 50:50.

After solvent evaporation 28.75 g of pure product was obtained (54.70 mmoles).

Yield: 49%

$^1$H NMR (MeOD, 400 MHz) δ (ppm): 3.78-3.64 (m, 1H), 3.62-3.42 (m, 2H), 2.78 (dd, J=11.6 Hz, J=3.6 Hz, 1H), 2.62-2.40 (m, 2H), 1.70-1.11 (m, 56H), 0.90 (t, J=6.4 Hz, 6H).

$^{13}$C NMR (MeOD, 101 MHz) δ (ppm): 71.78, 66.46, 59.03, 51.08, 34.67, 33.26, 31.08, 31.04, 30.97, 30.95, 30.92, 30.83, 30.80, 30.66, 26.87, 26.85, 23.91, 14.62 (terminal $CH_3$).

Esterification with Glycine Betaine to Afford Quaternary Ammonium Compound of Formula VIII All the reactions were conducted in carefully dried vessels and under an inert argon atmosphere.

Commercial anhydrous THF, anhydrous toluene and anhydrous CHCl3 stabilized with amylene were used as such.

Glycine betaine hydrochloride was dried through several washings with anhydrous THF followed by drying under vacuum prior to use.

In a 250 mL four necked round bottom flask equipped with a condenser, a distillation apparatus connected to a NaOH trap, a temperature probe, a magnetic stirrer and a heater were added:

7.13 g of betaine hydrochloride (46.4 mmol)

10 mL of $SOCl_2$ (16.38 g, 136.9 mmol) was then carefully introduced into the reactor vessel and the resulting suspension was progressively heated to 70° C. under stirring. It was observed that when the temperature reached 68° C., gas was released ($SO_2$ and HCl) and the mixture turned homogeneously yellow.

The mixture was then allowed to stir at 70° C. during two hours and hot anhydrous toluene (25 mL, 80° C.) was added into the vessel. The mixture was stirred and decanted at 0° C. to make the betainyl chloride precipitate. The upper phase of toluene was then removed through cannula and the operation of toluene washing was repeated four times in order to remove all $SOCl_2$ excess.

NMR analysis showed complete conversion of glycine betaine hydrochloride but also formation of $NMe_3 \cdot HCl$ adduct ($NMe_3 \cdot HCl$ content in the solid: 19.3 mol %).

20 mL of $CHCl_3$ was then added to the solid betainyl chloride.

A solution of the fatty diol (9.85 g, 18.7 mmol) in 30 mL of $CHCl_3$ was then prepared and was added dropwise to the betainyl chloride/$CHCl_3$ suspension at −3° C. at a rate avoiding the temperature of the reaction medium to go above 5° C. At the end of the addition the mixture was allowed to warm-up at room temperature and was then stirred at 50° C. for the night.

All the volatiles were then removed under vacuum at 30° C. to afford 16 g of a beige wax.

NMR analysis showed that the purity of the resulting product is around 73 wt % (the remaining by-products are: protonated starting alcohol, $NMe_3 \cdot HCl$, betaine hydrochloride and mono-ester).

Yield: 75% (14 mmoles)

$^1$H NMR (CDCl$_3$-MeOD, 400 MHz) δ (ppm): 5.55-5.63 (m, 1H), 4.93 (d, J=16.8 Hz, 1H), 4.92 (d, J=16.8 Hz, 1H), 4.81 (d, J=16.8 Hz, 1H), 4.70 (d, J=16.8 Hz, 1H), 4.49 (dd, J=12 Hz, J=3.6 Hz, 1H), 4.39 (dd, J=12 Hz, J=6.4 Hz, 1H), 3.36 (s, 9H), 3.33 (s, 9H), 3.32-3.28 (m, 2H), 1.80-1.45 (m, 4H), 1.45-1.10 (m, 52H), 0.84 (t, J=6.8 Hz, 6H).

$^{13}$C NMR (MeOD, 101 MHz) δ (ppm): 166.06, 71.18, 65.29, 64.59, 64.28, 61.35, 54.99, 54.87, 45.99, 45.55, 33.24, 30.96, 30.93, 30.91, 30.80, 30.64, 30.61, 30.60, 26.34, 26.21, 23.89, 14.61 (terminal $CH_3$).

Example 8—Synthesis of a Quaternary Ammonium Compound Wherein a is Represented by A-5 and Corresponding to Formula (IX) Starting from $C_{31}$ 16-hentriacontanone $C_{31}$ internal olefin was obtained from palmitic acid according to the protocol described in U.S. Pat. No. 10,035, 746, example 4.

Epoxidation of Internal Olefin to Fatty Epoxide

The reaction was conducted under an inert argon atmosphere.

In a 1 L double-jacketed reactor equipped with a mechanical stirrer (propeller with four inclined plows), a condenser, an addition funnel and a temperature probe were added 61.9 g of $C_{31}$ alkene (0.142 mol), followed by 16.3 mL (17.1 g, 0.285 mol) of acetic acid and 13.6 g (22 wt %) of Amberlite® IR 120H resin. The mixture was heated to 65° C. to melt the fatty alkene. The agitation was started and then 21.8 mL (24.2 g, 0.214 mol) of an aqueous solution of $H_2O_2$ (conc. 30%) was slowly added to the mixture using the addition funnel at a rate avoiding a significant temperature increase. This required about one hour. The temperature was then increased to 75° C. and the reaction mixture was allowed to stir overnight (after 15 min, NMR analysis showed that the conversion level was already around 60% with 99% selectivity). Then additional 10.2 mL (11.3 g, 0.1 mol) of an aqueous solution of $H_2O_2$ (30%) was added slowly and after 4 hours following the second addition of $H_2O_2$ NMR analysis showed that the conversion level was around 88% (98% selectivity). Another addition of 8.14 mL of acetic acid (8.55 g, 0.142 mol) followed by 11.6 mL of 30% $H_2O_2$ (12.91 g, 0.114 mol) was finally performed in order to increase the conversion level.

The mixture was allowed to stir a second night at 75° C.

Finally NMR analysis showed a conversion level of 93% (95% selectivity).

The mixture was allowed to cool down to room temperature and then 300 mL of chloroform were added. The mixture was transferred to a separating funnel and the organic phase was washed three times with 300 mL of water and then the aqueous phase was extracted twice with 100 mL of chloroform. The Amberlite® solid catalyst stayed in the aqueous phase and was removed during the first separation with the aqueous phase. The organic phases were collected, dried over $MgSO_4$, filtered and evaporated to give 65.3 g of a white solid with a purity of 91% w/w (epoxide+dialcohol).

The yield taking into account the purity was 92%.

$^1$H NMR (CDCl$_3$, 400 MHz) δ (ppm): 2.91-2.85 (m, 2H, diastereoisomer 1), 2.65-2.6 (m, 2H, diastereoisomer 2), 1.53-1.00 (m, 54H), 0.86 (t, J=6.8 Hz, 6H).

$^{13}$C NMR (CDCl$_3$, 101 MHz) δ (ppm): 58.97, 57.28, 32.18, 31.96, 29.72, 29.6, 29.4, 27.86, 26.95, 26.63, 26.09, 22.72, 14.15 (terminal CH$_3$).

Hydrolysis of Fatty Epoxide to Afford Fatty Diol

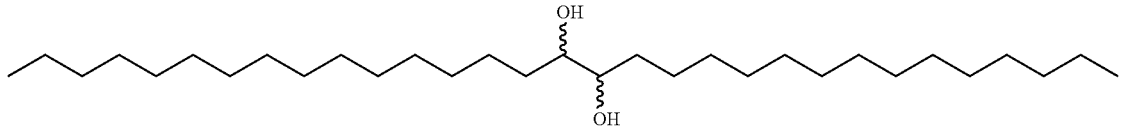 [SMILES: CCCCCCCCCCCCCCCC(O)C(O)CCCCCCCCCCCCCC]

The reaction was conducted under an inert argon atmosphere.

In a 1 L double-jacketed reactor equipped with a mechanical stirrer (propeller with four inclined plows), a condenser and a temperature probe were added 82.9 g of C$_{31}$ epoxide (purity: 94.5 wt %, 0.174 mol) followed by 480 mL of methyl-THF.

The mixture was allowed to stir at room temperature and 73 mL of a 3 M aqueous solution of H$_2$SO$_4$ was then added. The reaction medium was then stirred at 80° C. during 90 minutes. NMR analysis showed that the reaction was completed. The biphasic mixture was allowed to cool down to room temperature and the organic phase was separated. The solvent was then removed under vacuum and the residue was suspended in 200 mL of diethyl ether. The suspension was filtered and the resulting solid was washed 3 times with 50 mL of diethyl ether. The white solid was finally washed 2 times with 50 mL of methanol and was dried under vacuum to remove traces of solvent.

At the end 75.53 g of product was obtained as a white powder with a purity of 95.7% w/w corresponding to a yield of 89%.

$^1$H NMR (CDCl$_3$, 400 MHz) δ (ppm): 3.61-3.55 (m, 2H, diastereoisomer 1), 3.43-3.25 (m, 2H, diastereoisomer 2), 1.88 (brd, J=2.4 Hz, OH, diastereoisomer 2), 1.72 (brd, J=3.2 Hz, OH, diastereoisomer 1), 1.53-1.10 (m, 54H), 0.86 (t, J=6.8 Hz, 6H).

$^{13}$C NMR (CDCl$_3$, 101 MHz) δ (ppm): 74.71, 74.57, 33.66, 31.96, 31.23, 29.71, 29.39, 26.04, 25.68, 22.72, 14.15 (terminal CH$_3$)

Esterification of Fatty Diol with Trimethylglycine to Afford Compound of Formula IX All the reactions were conducted in carefully dried vessels and under an inert argon atmosphere.

Fresh commercial anhydrous CHCl$_3$ (amylene stabilized) and anhydrous toluene were used as such.

Betaine hydrochloride (19.66 g, 128.4 mmoles) was washed ten times with 20 mL of anhydrous THF followed by drying under vacuum to remove traces of solvent prior to use.

In a 100 mL four-neck round-bottom flask equipped with a magnetic stirrer, a heater, a condenser, a temperature probe and a curved distillation column connected to two traps of NaOH were quickly added: 19.66 g of dried betaine hydrochloride (128.4 mmoles) and 28 mL of SOCl$_2$ (45.86 g, 0.386 mol).

The heterogeneous mixture was stirred and the temperature was then slowly increased to 70° C. It was observed that when the temperature reached 68° C., gas was released (SO$_2$ and HCl) and the mixture turned homogeneous yellow.

The mixture was then allowed to stir at 70° C. during two hours and hot anhydrous toluene (25 mL, 80° C.) was added into the vessel. The mixture was stirred and then decanted at 0° C. (white-yellow precipitate formation) and the upper phase of toluene was removed through a cannula. The operation of toluene washing was repeated seven times in order to remove all SOCl$_2$ excess. NMR analysis showed complete conversion of glycine betaine hydrochloride but also formation of NMe$_3$·HCl adduct (NMe$_3$·HCl content in the solid: 12.3 mol %).

20 mL of dry CHCl$_3$ was then added to the solid betainyl chloride.

A solution of 26.19 g (56 mmol) of fatty diol in 90 mL of anhydrous CHCl$_3$ was prepared at 55° C. and was added dropwise under stirring to the reaction vessel at room temperature (exothermicity and emission of HCl was observed). The mixture was then allowed to stir at 55° C. overnight. Over the course of the reaction, the mixture turned homogeneously orange. NMR analysis showed that the conversion level was around 100%.

The mixture was then allowed to cool down to room temperature and the solvent was evaporated under vacuum.

The residue was solubilized in methanol at 0° C. and the formed precipitate was filtered out. The obtained filtrate was then evaporated to give 39.7 g of crude product.

This product was then deposited on a sinter filter and washed with cyclohexane to remove some remaining organic impurities. The resulting washed solid was dried under vacuum to afford 22 g of crude material. A final purification with a mixture of CH$_2$Cl$_2$/cyclohexane 50:50 was carried out; the solid was solubilized again in this solvent mixture at 50° C. and was allowed to cool down to room temperature. The formed precipitate was filtered out and after evaporation of the filtrate 19 g of a beige wax was obtained with the following composition:

95 wt % of glycine betaine diester
1.5 wt % of methyl betainate
2 wt % of trimethylamine hydrochloride
1.5 wt % of glycine betaine hydrochloride.

The purified yield was 44%.

$^1$H NMR (MeOD-d4, 400 MHz) δ (ppm): 5.3-5.2 (m, 2H), 4.68 (d, J=16.8 Hz, 2H), 4.50 (d, J=16.8 Hz, 2H), 4.53 (s, 1H), 4.48 (s, 1H), 3.37 (s, 18H), 1.75-1.55 (m, 4H), 1.39-1.10 (m, 50H), 0.9 (t, J=6.8 Hz, 6H).

$^{13}$C NMR (MeOD-d4, 101 MHz) δ (ppm): 164.58, 75.76, 62.43, 53.10, 31.68, 30.05, 29.41, 29.38, 29.33, 29.28, 29.15, 29.09, 28.96, 24.71, 22.34, 13.05 (terminal CH$_3$).

Example 9—Evaluation of Adsorption Properties on Nanocellulose Crystals

Adsorption of cationic surfactant on negatively charged surface is an important property for various applications. This property is linked to the minimal concentration of cationic surfactant needed to produce aggregation of negatively charged cellulose nano crystal (CNC) in suspension in aqueous media. Comparison of the aggregate size can be monitored by dynamic light scattering (DLS).

Following the protocol described in literature (Ref.: E. K. Oikonomou, et al., J. Phys. Chem. B, 2017, 121 (10), pp 2299-2307), adsorption properties of quaternary ammonium were investigated by monitoring the ratio X=[surfactant]/[CNC] or the mass fraction M=[surfactant]/([surfactant]+[CNC]), at fixed [surfactant]+[CNC]=0.01 wt % in aqueous solution, required to induce the agglomeration of the cellulose nano crystal.

The range of CNC aggregation correspond to the range of ratio X (or M) triggering an aggregation of CNC, i.e. the range where the aggregate size measured by DLS is higher than a pure aqueous solution of CNC or an aqueous solution of surfactant at 0.01 wt %.

Ranges of X and M of aggregation of CNC are summarized in Table 1. The lower range of aggregation X or M, the better the adsorption properties on negatively charged surface

TABLE 1

| Compound of | Range of CNC aggregation (Ratio) X = [surfactant]/[CNC] $X_{min} - X_{max}$ | Range of CNC aggregation (Mass fraction) $M_{min} - M_{max}$ |
|---|---|---|
| Fentacare® TEP [1] | 1-33 | 0.50-0.97 |
| Example 1 | 0.1-1.82 | 0.09-0.65 |
| Example 3 | 0.1-1.82 | 0.09-0.65 |
| Example 4 | 0.9-1.1 | 0.47-0.52 |

[1] Fentacare ® TEP was used as a comparison. Fentacare ® TEP is a commercial surfactant representing the benchmark.

The data show that the surfactant properties of the compounds in accordance with the present invention are superior compared to the commercial surfactant Fentacare® TEP.

The properties of the compounds of Examples 2 and 5 to 8, as far as adsorption of cellulose nanocrystals is concerned are similar to the properties of the compounds of Examples 1, 3 and 4 for which values are given in Table 1.

Example 10—Determination of Biodegradability

Biodegradability of the test substances has been measured according to the 301 F OECD protocol.

A measured volume of inoculated mineral medium, containing a known concentration of the test substance in order to reach about 50 to 100 mg ThOD/l (Theoretical Oxygen Demand) as the nominal sole source of organic carbon, was stirred in a closed flask (OxitopTmrespirometric flask) at a constant temperature (20±2° C.) for up to 28 days. Oxitop™ respirometric bottles were used in this test in order to access the biodegradability of the test samples: sealed culture BOD flasks were used at a temperature of 20±2 C during 28 days.

Evolved carbon dioxide was absorbed by pellets of Natrium or Potassium hydroxide present in the head space of the bottle. The amount of oxygen taken up by the microbial population (=oxygen consumption expressed in mg/l) during biodegradation process (biological oxidation of the test substance) decreased the pressure of the head space (A P measured by the pressure switch) and was mathematically converted in mg $O_2$ consumed/litre. Inoculum corresponded to a municipal activated sludge washed in mineral medium (ZW media) in order to decrease the DOC (Dissolved Oxygen Carbon) content. Control solutions containing the reference substance sodium acetate and also toxicity control (test substance+reference substance) were used for validation purposes. Reference substance, sodium acetate, has been tested in one bottle (at a nominal concentration of 129 mg/l corresponding to 100 mg ThOD/l) in order to check the viability of the inoculum. Toxicity control corresponds to the mixture of the substance reference and the test substance; it will check if the test substance is toxic towards the inoculum (if so, the test has to be redone at a lower test substance concentration, if feasible regarding the sensitivity of the method).

As the substances of the present invention are for a majority of them not very soluble in water (if some are soluble in water, their metabolite after hydrolysis containing the alkyl chain has often very low solubility in water), we used a specific protocol named the "emulsion protocol". This protocol enabled us to increase the bioavailability of the poorly water soluble substance in the aqueous phase where we had the inoculum.

Emulsion protocol consisted of adding the test substance in the bottle through a stock solution made in an emulsion.

Emulsion was a 50/50 v/v mixture of a stock solution of the test substance dissolved in a non-biodegradable surfactant (Synperonic® PE 105 at 1 g/l) and then mixed with a mineral silicone oil AR 20 (Sigma).

The first dissolution of the test substance in the non-biodegradable surfactant solution often required magnetic stirrer agitation followed by ultrasonication.

Once the dissolution was made, we mixed the aqueous solution with a mineral silicone oil at a 50/50 volume/volume ratio. This emulsion was maintained by magnetic stirrer agitation and was sampled for an addition in the corresponding bottle in order to reach the required test substance concentration.

Two emulsion controls were run in parallel during the test in order to remove their value from the emulsion bottle containing the test substance added through the emulsion stock solution.

The results of the biodegradability test are summarized in Table 2

| Compound of | Biodegradability after 28 days |
|---|---|
| Example 2 | 0% (OECD 301F) |
| Example 3 | 17% (OECD 301D) |
| Example 7 | 15% (OECD 301F) |
| Example 8 | 92% (OECD 301F) |

The results show that the compound of example 8 has the best biodegradability amongst the compounds used in the working examples, i.e. the biodegradablity of compounds in accordance with the present invention wherein A is represented by A-5 and specifically the compounds of formula IX is higher than for other compounds. This beneficial effect is achieved without detrimentally affecting the surfactant properties of the compounds.

Example 11—Synthesis of a Quaternary Di-Ammonium Compound Starting from 16-hentriacontanone 16-hentriacontanone was purchased from TCI, but could have been obtained from palmitic acid following Piria ketonization protocol described in US 2018/0093936.

Hydrogenation of 16-hentriacontanone to 16-hentriacontanol

In a 100 mL autoclave equipped with a mechanical stirrer (Rushton turbine) were added:
  4.36 g of Ru/C (4.87% Ru) catalyst (5 wt % of dry catalyst with respect to the ketone, catalyst containing 54.9% $H_2O$)
  39.3 g (87.2 mmol) of melted $C_{31}$ ketone.

The reaction was performed under 20 bar hydrogen pressure. 4 nitrogen purges are performed followed by 3 purges of hydrogen at 20 bars. The temperature of the reaction mixture was then set at 100° C. to melt the ketone substrate. The temperature was left at 100° C. during 10 min and stirring was slowly started at 200 rpm. When proper stirring was confirmed, the stirring rate was increased at 1200 rpm and the temperature was set at 150° C.

After 6 h reaction time at 150° C., heating was stopped and the mixture was allowed to cool down at 90° C. while stirring. Stirring was then stopped. The mixture was cooled down to room temperature and the autoclave was carefully depressurized.

NMR analysis in $CDCl_3$ of the crude showed a ketone conversion level >99% and molar purity of 99% for the fatty alcohol. The compact solid containing the product and the catalyst was grounded to powder and then introduced into a 1 L flask. 500 mL of chloroform were added and the flask was then heated at 60° C. to dissolve completely the alcohol. The suspension was filtered at 60° C. over celite. The solid cake was rinsed with hot chloroform at 60° C. several times. The filtrate was evaporated to give 35.6 g (78.7 mmol) of white powder with a weight purity around 99% for the desired $C_{31}$ fatty alcohol corresponding to 90% isolated yield.

Dehydration of 16-hentriacontanol to Internal Olefin

The reaction was conducted under an inert argon atmosphere. In a 200 mL quartz reactor equipped with a heating mattress, a mechanical stirrer (A320-type stirring mobile manufactured by 3D-printing with Inox SS316L), a condenser connected to a 50 mL two-neck distillate collection flask and a temperature probe were added:

56.1 g of $C_{31}$ fatty alcohol (124 mmol, 1 eq.)
5.61 g (10 wt %) of $Al_2O_3$-η.

The temperature of the reaction media was then increased to 150° C. to melt the alcohol and stirring was started (about 500 rpm). Finally the temperature was set-up at 300° C. and the mixture was allowed to stir at 1000 rpm under argon. Reaction progress was monitored thanks to NMR analysis with a borosilicate glass tube.

After 2 hours reaction at 300° C., NMR analysis in $CDCl_3$ showed complete conversion of the fatty alcohol and the presence of 1.5 mol % ketone which had been formed as a by-product.

Stirring and heating were then stopped. The temperature was lowered to 80° C. and the molten crude was transferred to a beaker. The reactor vessel and the stirring mobile were rinsed with chloroform ($Al_2O_3$ is insoluble). The suspension was filtered and the solvent was evaporated under vacuum to afford 52.24 g (120.2 mmol) of transparent oil which became a white solid (99 wt % purity) at room temperature corresponding to 97% isolated yield (NMR).

$^1$H NMR ($CDCl_3$, 400 MHz) δ (ppm): 5.38-5.29 (m, 2H), 2.03-1.93 (m, 4H), 1.35-1.19 (m, 48H), 0.86 (t, J=6.8 Hz, 6H).

$^{13}$C NMR ($CDCl_3$, 101 MHz) δ (ppm): 130.6, 130.13, 32.84, 32.16, 30.01, 29.93, 29.8, 29.6, 29.55, 29.4, 22.93, 14.35 (terminal $CH_3$).

Epoxidation of Internal Olefin to Oxirane

The reaction was conducted under an inert argon atmosphere. In a double-jacketed 1 L reactor equipped with a mechanical stirrer (propeller with four inclined plows), a condenser and a temperature probe were added 92.4 g of $C_{31}$ alkene (0.212 mol), followed by 18.2 mL (19.1 g, 0.319 mol) of acetic acid and 27.7 g (30 wt %) of Amberlite® IR 120H resin.

The mixture was heated to 75° C. in order to melt the fatty alkene. The agitation was then started and 32.6 mL (36.1 g, 0.319 mol) of aqueous $H_2O_2$ 30% were slowly added into the mixture using an addition funnel while reaction mass temperature was monitored to avoid temperature increase. The addition required about one hour.

After the end of $H_2O_2$ addition, the temperature was increased to 85° C. and reaction progress was followed thanks to NMR analysis. After 4 hours reaction time, the olefin conversion level was >99% with around 99% selectivity toward the desired epoxide (trace amounts of valuable diol were also formed during the reaction).

Heating was then stopped and 300 mL of chloroform were added to the reaction vessel when the temperature was around 50° C. The mixture was transferred to a separating funnel. The organic phase was washed 3 times with 300 mL of water. Then, the aqueous phase was extracted twice with 100 mL of chloroform. Amberlite® resin was removed during phase separation with the aqueous phase. The organic phase was dried over $MgSO_4$, filtered and evaporated to give 95.3 g of a white solid with a purity of 98% w/w (epoxide+diol). The yield taking into account the purity was 97%.

$^1$H NMR ($CDCl_3$, 400 MHz) δ (ppm): 2.91-2.85 (m, 1.5H), 2.65-2.6 (m, 0.5H), 1.53-1.36 (m, 4H), 1.35-1.19 (m, 48H), 0.86 (t, J=6.8 Hz, 6H).

$^{13}$C NMR ($CDCl_3$, 101 MHz) δ (ppm): 58.97, 57.28, 32.18, 31.96, 29.72, 29.6, 29.4, 27.86, 26.95, 26.63, 26.09, 22.72, 14.15 (terminal $CH_3$).

Condensation with Chloroacetic Acid (with $H_2SO_4$ as an Optional Catalyst)

The reaction was conducted under an inert argon atmosphere in a 500 mL three necked round bottom flask equipped with a magnetic stirrer, a heater, a condenser, a temperature probe and an insulated addition funnel. In the round bottom flask itself were added 128.7 g of chloroacetic acid (1.35 moles, 8 eq). In the insulated addition funnel maintained at 65° C. were added 77.8 g of melted fatty epoxide (98 wt % purity, 0.169 moles, 1 eq).

The first step of intermediate hydroxyl-ester formation was conducted at 65° C. by the slow addition of the fatty epoxide into chloroacetic acid in order to limit the formation of ketone and epoxide self-condensation by-products. The fatty epoxide was therefore added drop-wise over 30 minutes into the reactor containing chloroacetic acid at 65° C. under stirring.

At the end of the addition, the mixture was allowed to stir at 65° C. during additional 20 min. NMR analysis showed a conversion level >99% for the starting epoxide.

Then, for the formation of the final bis-ester, 0.19 mL of 95% $H_2SO_4$ (3.37 mmol, 2 mol %) was added into the reactor and the condenser was replaced by a curved distillation column.

The mixture was allowed to stir at 140° C. during 3 h 30 under a light vacuum (800 mbar) in order to remove water formed as a by-product during the esterification reaction.

After 3 h 30 at 140° C., NMR analysis showed a selectivity (monoester+bis-ester) of 83 mol % and the following approximate crude mixture composition: 80 mol % of bis-ester, 3 mol % of mono-ester, 2 mol % of esterified dimer and 4 mol % of ketone.

The mixture was then cooled down at room temperature (about 23° C.) and 300 mL of toluene were added. The solution was transferred into a separating funnel and the organic phase was washed 3 times with 500 mL of an aqueous solution of NaOH (0.3M) to remove excess of chloroacetic acid. The organic phase was dried over $MgSO_4$, filtered and then evaporated to give 102.7 g of crude product.

The product could be easily purified by dissolving the oil in ethanol (the starting ketone being not soluble in ethanol) followed by a filtration over celite. The filtrate was evaporated to afford 94 g of black oil with a purity of 89 wt % for the bis-ester corresponding to a isolated yield of 80% (RMN).

$^{1}$H NMR (CDCl$_3$, 400 MHz) δ (ppm): 5.11-5.02 (m, 2H), 4.04 (s, isomer 1, 2H), 4.03 (s, isomer 2, 2H), 1.66-1.49 (m, 4H), 1.43-1.19 (m, 50H), 0.86 (t, J=6.8 Hz, 6H).

$^{13}$C NMR (CDCl$_3$, 101 MHz) δ (ppm): 167.14, 167, 76.22, 75.83, 40.92, 40.82, 31.96, 30.6, 29.72, 29.69, 29.63, 29.54, 29.39, 29.33, 29.28, 28.85, 25.47, 24.96, 22.72, 14.15 (terminal CH$_3$).

Condensation with Chloroacetic Acid (with Triflic Acid as an Optional Catalyst)

The reaction was conducted under an inert argon atmosphere in a 500 mL three necked round bottom flask equipped with a magnetic stirrer, a heater, a condenser, a temperature probe and an insulated addition funnel. In the round bottom flask itself were added 85.63 g of chloroacetic acid (0.897 mol, 5 eq). In the insulated addition funnel were added 83.3 g of melted fatty epoxide (97 wt % purity, 0.179 mol, 1 eq).

The first step of monoester formation was conducted at 65° C. without triflic acid to limit the formation of ketone and dehydration by-products. The fatty epoxide was therefore added drop-wise over 2 h into the reactor containing chloroacetic acid at 65° C. under stirring in order to limit the self-condensation of fatty epoxide. At the end of the addition, the mixture was left at 65° C. under stirring during an additional hour. NMR analysis showed a conversion level >99% for the starting epoxide.

For the formation of the bis-ester, 3.2 µL of 99% triflic acid (0.036 mmol, 0.02 mol %) were then added into the reaction mixture. The condenser was replaced by a curved distillation column and the mixture was allowed to stir at 140° C. during 5 h 00 under a light vacuum (975 mbar) in order to remove water formed as a by-product of the esterification reaction.

After 5 h 00, NMR analysis showed a selectivity (monoester+bis-ester) of 88 mol % and a composition of 82 mol % of bis-ester, 6 mol % of mono-ester, 5 mol % of esterified dimer and 3 mol % of ketone.

The vacuum was then increased to 800 mbar and progressively until 10 mbar in order to distil chloroacetic acid, triflic acid catalyst and to complete conversion of mono-ester toward bis-ester.

Once all chloroacetic acid had been distilled out (verified by NMR analysis), the mixture was allowed to cool down at room temperature and atmospheric pressure was restored. The crude oil was transferred into a flask for purification. The product could be easily purified by dissolving the oil in ethanol (the starting ketone being not soluble in ethanol) followed by a filtration over celite. The filtrate was evaporated to afford 107.3 g of a black oil with a purity of 93 wt % for the bis-ester corresponding to an isolated yield of 89%.

$^{1}$H NMR (CDCl$_3$, 400 MHz) δ (ppm): 5.11-5.02 (m, 2H), 4.04 (s, isomer 1, 2H), 4.03 (s, isomer 2, 2H), 1.66-1.49 (m, 4H), 1.43-1.19 (m, 50H), 0.86 (t, J=6.8 Hz, 6H).

$^{13}$C NMR (CDCl$_3$, 101 MHz) δ (ppm): 167.14, 167, 76.22, 75.83, 40.92, 40.82, 31.96, 30.6, 29.72, 29.69, 29.63, 29.54, 29.39, 29.33, 29.28, 28.85, 25.47, 24.96, 22.72, 14.15 (terminal CH$_3$)

Quaternization Reaction with NMe$_3$

The reaction was conducted under an inert argon atmosphere. In a 1 L double-jacketed reactor equipped with a mechanical stirrer, a condenser and a temperature probe, were added:

107.3 g (93 wt % purity, 0.16 mol, 1 eq.) of chloroacetate bis-ester C$_{31}$ 687 mL (1.28 mol, 8 eq.) of a solution of trimethylamine (NMe$_3$) in THF (~2 mol/L) dried beforehand on molecular sieve activated the day before.

The reaction mixture was heated at 40° C. and stirring was started at 1000 rpm. After 6 h, NMR analysis in d$_4$-MeOH showed a conversion level >99% for the starting bis-ester with a molar composition of ~86 mol % for glycine betaine bis-ester. The reactor was drained, rinsed with CH$_2$Cl$_2$ and the volatiles were evaporated under vacuum.

The brown solid was reduced into a powder, deposited on a sinter filter and washed 5 times with 200 mL of ethyl acetate. The solid was dried under vacuum.

Then, the product was transferred into a 1 L reactor equipped with a mechanical stirrer, a condenser, a heater and a temperature probe. The product was solubilized into 800 mL of chloroform and 150 g of activated charcoal pellets were added. The mixture was stirred at 40° C. for 2 hours in order to whiten the product.

After 2 h, the suspension was filtrated over celite and the solvent was evaporated to afford 109 g of a brown wax with a weight composition of ~95 wt % of quaternary di-ammonium compound of formula (IX), 2 wt % of quaternary mono-ammonium, 0.1 wt % of C$_{31}$ ketone and 4 wt % of the ether by-product. The purified yield of the glycine betaine bis-ester was ~87%.

Example 12—Synthesis of a Quaternary Di-Ammonium Compound Starting from C$_{16}$-C$_{18}$ (30:70) Fatty Acid Cut Piria Ketonization Toward Internal C$_{31}$-C$_{35}$ Ketones Cut The reaction was conducted under an inert argon atmosphere in a 200 mL quartz reactor equipped with a mechanical stirring (A320-type stirring mobile manufactured by 3D-printing with Inox SS316L), an insulated addition funnel, a distillation apparatus, a heating mattress and a temperature probe.

In the reactor were introduced:

12.5 g of MASCID™ acid 1865 (from Musim Mas Group) composed of 33.7 wt % of palmitic acid and 65.3 wt % of stearic acid (0.045 mole of fatty acids), and 0.935 g of MgO (0.023 mole).

In the insulated addition funnel were added 37.5 g of the same melted fatty acids mixture (0.135 mole).

The temperature of the reaction media was then raised to 250° C. Once the temperature reached 150° C., stirring was started (1200 rpm). After 2 h 00 reaction time at 250° C., FTIR analysis showed complete conversion of the starting fatty acids into the intermediate magnesium carboxylate complex.

The temperature of the reaction mass was then raised further to 330° C. and the mixture was allowed to stir at this temperature during 1 h 30 in order to allow decomposition of the intermediate magnesium carboxylate complex to the desired ketone.

Then, 12.5 g of the melted fatty acid mixture was progressively added into the reactor thanks to the addition funnel during 30 minutes and the mixture was stirred at 330° C. during an additional 1 h 00. FTIR analysis showed complete conversion of fatty acids and magnesium complex to the desired ketone.

Two additional cycles of 12.5 g fatty acid addition during 30 minutes followed by additional 1 h 00 stirring at 330° C. were then realized.

After the last cycle the mixture was allowed to stir at 330° C. during an additional 1 h 00 to ensure complete conversion of the intermediate magnesium complex to the desired ketone which was confirmed by FTIR analysis.

The temperature of the reaction mixture was then allowed to cool down at room temperature and the crude was solubilized in hot $CHCl_3$. The suspension was filtered on a plug of silica (70 g) and the product was further eluted with additional amounts of $CHCl_3$.

After solvent evaporation 41.83 g (0.086 mole) of product was obtained as a white wax corresponding to an isolated yield of 96%.

$^1H$ NMR ($CDCl_3$, 400 MHz) δ (ppm): 2.45-2.25 (t, J=7.6 Hz, 4H), 1.62-1.46 (m, 4H), 1.45-1.05 (m, 54H), 0.86 (t, J=6.8 Hz, 6H).

$^{13}C$ NMR (CDCl3, 101 MHz) δ (ppm): 212.00, 43.05, 32.16, 29.93, 29.91, 29.88, 29.84, 29.72, 29.65, 29.59, 29.51, 24.13, 22.92, 14.34 (terminal $CH_3$).

Hydrogenation of Ketones Mixture Toward Internal $C_{31}$-$C_{35}$ Fatty Alcohols Mixture Same protocol as the one described in example 11 under "Hydrogenation of 16-hentriacontanone to 16-hentriacontanol" part was followed to obtain the desired fatty alcohols mixture in excellent yield.

Dehydration of $C_{31}$-$C_{35}$ Fatty Alcohols into Internal Olefins

All the reactions were conducted under an inert argon atmosphere.

In a 200 mL quartz reactor equipped with a heating mattress, a mechanical stirrer (A320-type stirring mobile manufactured by 3D-printing with Inox SS316L), surmounted by a condenser connected to a 50 mL two-neck distillate collection flask and a temperature probe were added:

41.3 g of the $C_{31-35}$ fatty alcohol (85 mmol, 1 eq.), and
4.13 g (40 mmol, 10 wt %) of $Al_2O_3$-η.

The temperature of the reaction media was increased to 150° C. to melt the alcohol and stirring was started (about 500 rpm). Then, the temperature was set-up at 300° C. and the mixture was allowed to stir at 1000 rpm under argon. The reaction progress was monitored thanks to NMR analysis with a borosilicate glass tube.

After 2 hours reaction at 300° C., NMR analysis in $CDCl_3$ showed complete conversion of the fatty alcohol and the presence of 1.5 mol % of ketone which had been formed as a by-product.

Stirring and heating were then stopped and the temperature was lowered to 80° C. The molten crude was transferred to a beaker. The reactor vessel and the stirring mobile were rinsed with chloroform ($Al_2O_3$ is insoluble).

The mixture was filtered and the solvent was evaporated under vacuum to afford 39 g of a clear yellow oil which solidified at room temperature to give a white solid in the form of wax (98 wt % purity) corresponding to 97% yield (NMR).

$^1H$ NMR ($CDCl_3$, 400 MHz) δ (ppm): 5.38-5.29 (m, 2H), 2.03-1.93 (m, 4H), 1.35-1.19 (m, 55H (average H number)), 0.86 (t, J=6.8 Hz, 6H).

$^{13}C$ NMR (CDCl3, 101 MHz) δ (ppm): 130.6, 130.13, 32.84, 32.16, 30.01, 29.93, 29.8, 29.6, 29.55, 29.4, 22.93, 14.35 (terminal $CH_3$).

Epoxidation of Internal Olefins to Afford $C_{31-35}$ Oxiranes

The reaction was conducted under an inert argon atmosphere.

In a 300 mL double-jacketed reactor equipped with a mechanical stirrer (propeller with four inclined plows) and baffles, a condenser and a temperature probe were added:

38.2 g of $C_{31-35}$ alkene (98 wt % purity, 80 mmol)
6.9 mL (7.2 g, 120 mmol) of acetic acid, and
11.3 g (30 wt %) of Amberlite® IR 120H resin.

The mixture was heated to 75° C. to melt the fatty alkene. The agitation was then started and 12.3 mL (13.7 g, 120 mmol) of $H_2O_2$ 30% were slowly added into the mixture using an addition funnel while monitoring temperature of the reaction medium to prevent temperature increase of the reaction mass (exothermicity). This required about 20 min. During the addition, the agitation was increased to improve transfers due to the heterogeneous nature of the reaction media.

At the end of the addition, the temperature of the reaction medium was increased at 85° C. and after 6 h 10 of stirring at this temperature, NMR analysis showed that the conversion level was around 99% with 98% selectivity.

Heating was then stopped and 150 mL of chloroform were added when the temperature of the reaction mass was around 50° C. The mixture was transferred to a separating funnel and the organic phase was washed 3 times with 150 mL of water. The resin catalyst that stayed in the aqueous phase was removed during phase separation. The aqueous phase was extracted twice with 50 mL of chloroform. The organic phase was dried over $MgSO_4$, filtered and evaporated to afford 39.2 g of a white solid with a purity of 98 wt % (epoxide+di-alcohol by-product). The yield taking into account the purity was 99%.

$^1H$ NMR ($CDCl_3$, 400 MHz) δ (ppm): 2.91-2.85 (m, 1.5H), 2.65-2.6 (m, 0.5H), 1.53-1.36 (m, 4H), 1.35-1.19 (m, 55H (aver. H number)), 0.86 (t, J=6.8 Hz, 6H).

$^{13}C$ NMR ($CDCl_3$, 101 MHz) δ (ppm): 58.97, 57.28, 32.18, 31.96, 29.72, 29.6, 29.4, 27.86, 26.95, 26.63, 26.09, 22.72, 14.15 (terminal $CH_3$).

Condensation with Chloroacetic Acid to Afford Chloroacetate Bis-Ester $C_{31-35}$ (with $H_2SO_4$ as an Optional Solvent)

The reaction was conducted under an inert argon atmosphere in a 250 mL three necked round bottom flask equipped with a magnetic stirrer, a heater, a condenser, a temperature probe and an insulated addition funnel. In the round bottom flask itself were added 59.2 g of chloroacetic acid (0.62 mol, 8 eq). In the insulated dropping funnel maintained at 60° C., were added 38.3 g of melted $C_{31-35}$ epoxide (purity: 98 wt %, 77.6 mmol, 1 eq).

The first step of hydroxyl-ester formation was conducted at 70° C. without sulfuric acid to limit the formation of ketone and dehydrated by-products and through progressive addition of fatty epoxide into chloroacetic acid in order to limit epoxide self-condensation. The reaction mixture was allowed to stir at 70° C. in order to melt the chloroacetic acid.

The melted epoxide was then added drop-wise into the reaction mixture under stirring over 1 h 00 in order to limit self-condensation of the epoxide.

At the end of the addition, the mixture was allowed to stir at 70° C. for an additional 20 min. At this stage NMR analysis showed nearly a complete conversion of the epoxide to the intermediate monoester.

For the conversion of the mono-ester to the bis-ester, 87 μL of 95% $H_2SO_4$ (1.6 mmol, 2 mol %) were added into the reaction mixture. The condenser was replaced by a curved distillation column and the mixture was allowed to stir at 140° C. during 6 h 30 while applying a 800 mbar vacuum to facilitate water removal. After 6 h 30 reaction time, NMR analysis showed the estimated composition of the crude media:

79 mol % of bis-ester
6 mol % of mono-ester
1 mol % of esterified dimer by-product, and
5 mol % of ketone by-product.

The mixture was cooled down at room temperature and 150 mL of toluene were added to the crude. The organic solution was transferred into a separating funnel and was washed 7 times with 250 mL of an aqueous NaOH solution (0.15M) to remove excess of chloroacetic acid. The aqueous phase was extracted 2 times using 100 mL of toluene.

The organic phases were gathered and washed with 150 mL of an aqueous HCl (0.1N) solution and then with 150 mL of saturated NaCl solution. The organic phase was dried over $MgSO_4$, filtered and then evaporated to give 48 g of the crude product.

The product could be easily purified by dissolving the oil in isopropanol (the starting ketone being not soluble in isopropanol) followed by a filtration over celite. The filtrate was evaporated to give 45.7 g of black oil with an estimated purity of 91 wt % for the bis-ester corresponding to a yield of 81% (RMN).

$^1$H NMR ($CDCl_3$, 400 MHz) δ (ppm): 5.11-5.02 (m, 2H), 4.04 (s, isomer 1, 2H), 4.03 (s, isomer 2, 2H), 1.66-1.49 (m, 4H), 1.43-1.19 (m, 55H (average H number)), 0.86 (t, J=6.8 Hz, 6H).

$^{13}$C NMR ($CDCl_3$, 101 MHz) δ (ppm): 167.14, 167, 76.22, 75.83, 40.92, 40.82, 31.96, 30.6, 29.72, 29.69, 29.63, 29.54, 29.39, 29.33, 29.28, 28.85, 25.47, 24.96, 22.72, 14.15 (terminal $CH_3$).

Quaternization with $NMe_3$

The reaction was conducted under 5 bar nitrogen pressure. In a 750 mL autoclave equipped with a mechanical stirrer (Rushton turbine), were added:
 45.7 g (91 wt % purity, 63 mmol, 1 eq.) of chloroacetate bis-ester $C_{31-35}$, and
 169 mL (316 mmol, 5 eq.) of trimethylamine solution in THF (~2 mol/L) that had been dried beforehand on molecular sieve activated the day before.

Three nitrogen purges are performed. The reaction mixture was heated at 40° C. and stirring was started at 1000 rpm.

After 4 h 15 reaction time, NMR analysis in MeOD/$CDCl_3$ showed a conversion level of approximately 99% for the starting chloroacetate bis-ester with approximately 81 mol % of the desired glycine betaine bis-ester.

The mixture was allowed to cool down at room temperature, the reactor was depressurized and the solution was then drained. The reactor is rinsed with $CH_2Cl_2$ and the solvent evaporated to afford 43 g of crude product.

The solid was then deposited on a sinter filter and washed several times with ethyl acetate to remove some organic impurities. The solid was dried under vacuum and transferred into a 500 mL three necked round bottom flask equipped with a magnetic stirrer, a heater, a condenser and a temperature probe.

The product was solubilized in 250 mL of chloroform and 25 g of activated charcoal were added. The reaction mixture was then heated under reflux for 2 hours in order to whiten the product.

After cooling down at room temperature, the suspension was filtered over celite then evaporated to give 33 g of a beige wax with the following approximate composition: 92 wt % of quaternary di-ammonium compound of formula (IX), 5 wt % of quaternary mono-ammonium compound and 3 wt % of an ether by-products.

$^1$H NMR (MeOD-$d_4$, 400 MHz) δ (ppm): 4.78 (s, 1H), 4.74 (s, 1H), 4.53 (s, 1H), 4.49 (s, 1H), 3.38 (s, 18H), 1.77-1.6 (m, 4H), 1.51-1.25 (m, 55H (average H numbers)), 0.9 (t, J=6.8 Hz, 6H).

$^{13}$C NMR (MeOD-$d_4$, 101 MHz) δ (ppm): 166.39, 166.12, 79.62, 78.17, 77.28, 64.25, 63.98, 54.8, 54.65, 33.21, 31.61, 30.95, 30.83, 30.69, 30.64, 30.5, 30.44, 29.81, 26.7, 26.21, 23.9, 14.58 (terminal $CH_3$).

Example 13—Synthesis of a Quaternary Di-Ammonium Compound Starting from $C_{16}$-$C_{18}$ (60:40) Fatty Acid Cut Piria Ketonization Toward Internal $C_{31}$-$C_{35}$ Ketones Cut The reaction was conducted under an inert argon atmosphere in a 200 mL quartz reactor equipped with a heating mattress, a mechanical stirring (A320-type stirring mobile manufactured by 3D-printing with Inox SS316L), an insulated addition funnel, a distillation apparatus and a temperature probe.

In the reactor itself were introduced:
 15 g of MASCID™ acid 1801 (from Musim Mas Group) with the following composition: 60.9 wt % of palmitic acid and 38.2 wt % of stearic acid (0.056 mole of fatty acids), and
 1.15 g of MgO (0.028 mole).

In the insulated addition funnel were added 45 g of the same melted fatty acids mixture (0.167 mole).

The temperature of the reaction mixture was then raised to 250° C. and once the temperature had reached 150° C., the stirring was started (1200 rpm). After 1 h 15 reaction time at 250° C., FTIR analysis showed complete conversion of the starting fatty acids into the intermediate magnesium carboxylate complex.

The temperature of the reaction mass was then raised further to 330° C. and the mixture was allowed to stir at this temperature during 1 h 30 in order to allow decomposition of the magnesium complex to the desired ketone.

Then 15 g of the melted fatty acid mixture were progressively added to the reactor thanks to the addition funnel during 15 minutes and the mixture was stirred at 330° C. during one additional hour. FTIR analysis confirmed complete conversion of fatty acids and magnesium complex to the desired ketone.

Two additional cycles of 15 g fatty acid addition during 15 minutes followed by one hour stirring at 330° C. were then realized. Following the last addition cycle the mixture was allowed to stir at 330° C. during one additional hour in order to ensure complete conversion of the intermediate magnesium carboxylate complex to the desired ketone, which was confirmed thanks to FTIR and NMR analysis according to the following protocol: the sample was dissolved in chloroform and washed three times with 2N HCl aqueous solution and the solvent was evaporated. NMR and IR analysis on the residue did not show any presence of starting fatty acid that might have been formed by complex hydrolysis.

The temperature of the reaction mixture was allowed to cool down at 60° C. and the crude was solubilized in 350 mL of hot $CHCl_3$ (60° C.). The suspension was filtered on a plug of silica (100 g) and the product was further eluted with additional amounts of $CHCl_3$. After solvent evaporation 50.5 g of crude product were obtained.

The product was washed 3 times with 200 mL of isopropanol on a sintered filter in order to remove trace of by-products. The solid was dried to afford the desired ketone as a white powder with a purity of 100 mol % corresponding to a yield of 90%.

$^1$H NMR (CDCl3, 400 MHz) δ (ppm): 2.35 (t, J=7.6 Hz, 4H), 1.62-1.46 (m, 4H), 1.34-1.16 (m, 54.8H (average number)), 0.86 (t, J=6.8 Hz, 6H).

$^{13}$C NMR (CDCl3, 101 MHz) δ (ppm): 212.00, 43.06, 32.16, 29.92, 29.89, 29.85, 29.72, 29.66, 29.6, 29.52, 24.16, 22.93, 14.35 (terminal CH$_3$).

Hydrogenation of Ketones Mixture Toward Internal C$_{31}$-C$_{35}$ Fatty Alcohols Mixture Same protocol as the one described in example 11 under "Hydrogenation of 16-hentriacontanone to 16-hentriacontanol" part was followed to obtain the desired fatty alcohols mixture in excellent yield.

Dehydration of C$_{31}$-C$_{35}$ Fatty Alcohols to Internal Olefins

The reaction was conducted under an inert argon atmosphere. In a 200 mL quartz reactor equipped with a heating mattress, a mechanical stirrer (A320-type stirring mobile manufactured by 3D-printing with Inox SS316L), surmounted by a condenser connected to a 50 mL two-necked distillate collection flask and a temperature probe were added:

43.6 g of the C$_{31-35}$ fatty alcohol (92 mmol, 1 eq)
4.4 g (43 mmol, 10 wt %) of Al$_2$O$_3$-η.

The reaction medium was first heated at 150° C. in order to melt the fatty alcohol mixture and stirring was started (about 500 rpm). Then, the temperature was increased up to 300° C. and the mixture was allowed to stir at 1000 rpm under argon atmosphere. The reaction progress was monitored thanks to NMR analysis. After 2 hours reaction time at 300° C., NMR analysis in CDCl$_3$ showed complete conversion of the fatty alcohol and also presence of 0.3 mol % of ketone which had been formed as a by-product.

Stirring and heating were then stopped to allow the crude media to cool down. Once the temperature had decreased to about 80° C. the molten crude was transferred to a beaker. The reactor vessel and the stirring mobile were rinsed with chloroform (Al$_2$O$_3$ is insoluble).

The suspension was filtered to remove catalyst and the solvent was evaporated under vacuum to afford 40.1 g of a clear yellow oil which solidified at room temperature to give a white compact solid in the form of a wax (>99 wt % purity) and 95% yield (NMR).

$^1$H NMR (CDCl$_3$, 400 MHz) δ (ppm): 5.42-5.29 (m, 2H), 2.04-1.9 (m, 4H), 1.35-1.19 (m, 52.8H (average number)), 0.86 (t, J=6.8 Hz, 6H).

$^{13}$C NMR (CDCl$_3$, 101 MHz) δ (ppm): 130.59, 130.13, 32.84, 32.16, 30.02, 29.93, 29.77, 29.6, 29.55, 29.4, 27.44, 22.93, 14.35 (terminal CH$_3$).

Epoxidation of Internal Olefins to Afford C$_{31-35}$ Oxiranes

The reaction was conducted under an inert argon atmosphere. In a 300 mL double-jacketed reactor equipped with a mechanical stirrer (propeller with four inclined plows) and baffles, a condenser, an addition funnel and a temperature probe were added:

39 g of C$_{31-35}$ alkene (>99 wt % purity, 86 mmol)
7.3 mL (7.7 g, 128 mmol) of acetic acid, and
11.7 g (30 wt %) of Amberlite® IR 120H resin.

The mixture was heated to 75° C. in order to melt the fatty alkene. Stirring was then started and 13.1 mL (14.6 g, 128 mmoles) of H$_2$O$_2$ 30% were slowly added into the mixture using the addition funnel while monitoring temperature of the reaction medium in order to avoid temperature increase of the reaction mass (slight exothermicity). This required about 20 min. During the addition, stirring rate was increased to improve mass transfers due to the heterogeneous nature of the reaction media. At the end of the addition, the temperature of the reaction medium was increased to 85° C. After 4 h 30 of stirring, NMR analysis showed an alkene conversion level around 97%.

In order to complete the reaction, additional 4.4 mL (4.8 g, 43 mmol) of H$_2$O$_2$ 30% were added to the reaction media. After 7 hours of total reaction time at 85° C., NMR analysis showed a complete conversion level for the alkene.

Stirring was then stopped in order to allow the liquid phases to separate in the reactor at 85° C. Solid Amberlite® resin had sedimented at the bottom of the reactor. Aqueous phase was removed by draining through the bottom valve. 100 mL of water were then added into the reactor and the mixture was allowed to stir during 15 minutes. The phases were again separated and the aqueous phase was removed.

Finally, the melted organic phase was drained into a PYREX® beaker (with the catalyst) and the reactor was rinsed 2 times with 100 mL of chloroform in order to recover remaining product. The organic phase was dried over MgSO$_4$, filtered and evaporated to afford 40.1 g of a white compact solid with a purity of 99 wt % (epoxide+di-alcohol by-product). The yield taking into account the purity was 98%.

$^1$H NMR (CDCl$_3$, 400 MHz) δ (ppm): 2.91-2.85 (m, 1.5H), 2.65-2.6 (m, 0.5H), 1.53-1.36 (m, 4H), 1.35-1.19 (m, 52.8H (average number)), 0.86 (t, J=6.8 Hz, 6H).

$^{13}$C NMR (CDCl$_3$, 101 MHz) δ (ppm): 58.97, 57.29, 32.18, 31.96, 29.73, 29.6, 29.49, 29.4, 27.86, 26.63, 26.09, 22.72, 14.15 (terminal CH$_3$).

Catalyst-Free Condensation with Chloroacetic Acid to Afford Chloroacetate Bis-Ester C$_{31-35}$ The reaction was conducted under an inert argon atmosphere in a 500 mL three necked round bottom flask reactor equipped with a magnetic stirrer, a heater, a condenser, a temperature probe and an insulated addition funnel. In the bottom flask reactor itself were added 39.19 g of chloroacetic acid (410.5 mmol, 5 eq). In the insulated addition funnel maintained at 65° C. were added 38.6 g of melted fatty epoxide (purity: 99 wt %, 82.1 mmol, 1 eq).

The first step of hydroxyl-ester formation was conducted at 65° C. to limit the formation of ketone and dehydration by-products. The fatty epoxide was therefore added dropwise over 1 h 30 into the reactor containing chloroacetic acid at 65° C. under stirring in order to limit the self-condensation of two fatty epoxide molecules. Upon completion of the addition of the fatty epoxide, the mixture was allowed to stir at 65° C. during 30 min. NMR analysis showed a conversion level >98% for the starting epoxide.

For the formation of the final bis-ester, the condenser was replaced by a curved distillation column and the mixture was allowed to stir at 140° C. during 5 h 30 under a light vacuum (975 mbar) in order to assist the removal of water which was formed as a by-product of the esterification reaction. After 5 h at 140° C., NMR analysis showed a selectivity (monoester+bis-ester) of 92 mol % and the following approximate crude mixture composition: 90 mol % of bis-ester, 2 mol % of mono-ester, 1 mol % of esterified dimer and 2 mol % of ketone.

The pressure was then decreased down to 800 mbar and progressively until 10 mbar in order to distil the excess of chloroacetic acid and to complete conversion of mono-ester toward bis-ester. Once the whole amount of chloroacetic acid had been distilled out (verified by NMR analysis), the mixture was cooled down to room temperature and the atmospheric pressure was re-established. The crude oil was then transferred into a flask for purification.

The product could be easily purified by dissolving the oil in 300 mL of isopropanol (the starting ketone being not soluble in isopropanol) followed by a filtration over celite. The filtrate was evaporated to afford 49.1 g of a black oil with a purity of 93 wt % for the bis-ester corresponding to an isolated yield of 86% (RMN).

¹H NMR (CDCl₃, 400 MHz) δ (ppm): 5.11-5.02 (m, 2H), 4.04 (s, isomer 1, 2H), 4.03 (s, isomer 2, 2H), 1.66-1.49 (m, 4H), 1.43-1.19 (m, 52.8H (average number)), 0.86 (t, J=6.8 Hz, 6H).

¹³C NMR (CDCl₃, 101 MHz) δ (ppm): 167.14, 167, 76.22, 75.83, 40.92, 40.82, 31.96, 30.6, 29.73, 29.64, 29.54, 29.39, 29.28, 28.85, 25.47, 24.96, 22.72, 14.15 (terminal CH₃).

Quaternization with NMe₃

The reaction was conducted under an inert argon atmosphere. In a 1 L double-jacketed reactor equipped with a mechanical stirrer, a condenser and a temperature probe, were added:

48.1 g (69 mmol, 1 eq) of chloroacetate bis-ester C₃₁₋₃₅ (purity: 93 wt %)

334 mL (625 mmol, 9 eq) of a solution of trimethylamine in THF (~2 mol/L).

The reaction mixture was then stirred (1000 rpm) at 40° C. After 3 h, the mixture was allowed to cool down at room temperature and stirred overnight. The next day, NMR analysis (d₄-MeOD) showed a full conversion of the starting bis-ester with an approximate selectivity of 92 mol % (NMR) toward the desired product glycine betaine bis-ester. The reactor was drained, rinsed with THF and the volatiles were removed under vacuum.

The product was reduced to a powder, deposited on a sinter filter and washed 5 times with 100 mL of ethyl acetate in order to remove the organic impurities. The solid was dried under vacuum to afford 53 g of a brown wax with the following approximate weight composition: 94 wt % of NQ19 quaternary bis-ammonium, 2 wt % of quaternary mono-ammonium, 0.1 wt % of N(Me)₃·HCl and 3.5 wt % of an ether by-products. The purified yield of the glycine betaine bis-ester was 94%.

¹H NMR (MeOD-d₄, 400 MHz) δ (ppm): 5.3-5.13 (m, 2H), 4.79 (s, 1H), 4.75 (s, 1H), 4.53 (s, 1H), 4.49 (s, 1H), 3.38 (s, 18H), 1.78-1.63 (m, 4H), 1.49-1.2 (m, 52.8H (average number)), 0.9 (t, J=6.8 Hz, 6H).

¹³C NMR (MeOD-d₄, 101 MHz) δ (ppm): 166.39, 166.12, 79.62, 78.17, 77.28, 64.25, 63.98, 54.8, 54.65, 33.21, 31.61, 30.95, 30.83, 30.69, 30.64, 30.5, 30.44, 29.81, 26.7, 26.21, 23.9, 14.58 (terminal CH₃).

Overall, the compounds of the present invention show a good combination of surfactant properties combined with a reasonable to good biodegradabilty—a combination which is in many cases not achieved by commercial surfactants.

Since the compounds of the present invention are also easily available starting from internal ketones which are easily accessible from fatty acids or fatty acid derivatives, the compounds of the present invention also provide economical benefits over the prior art compounds.

The invention claimed is:

1. An ionic compound of general formula I

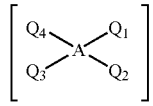
(I)

wherein

A is a tetravalent linker A-5

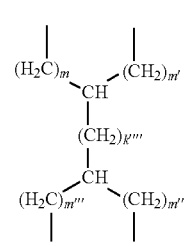
A-5

$Q_1$ to $Q_4$, which may be identical or different from each other, are selected from the group consisting of R and X, wherein R, which may be the same or different at each occurrence, is a $C_5$-$C_{27}$ aliphatic group, m, m', m" and m''' are 0, k'''' is 0 and X, which may be the same or different at each occurrence, is represented by formula II

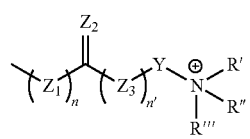
(II)

wherein $Z_1$, $Z_2$ and $Z_3$, which may be the same or different, are O, S or NH, Y is a divalent $C_1$-$C_6$ aliphatic radical, R', R" and R''', which may be the same or different, are hydrogen or a $C_1$ to $C_4$ alkyl group, n and n' are 0 or 1 with the sum of n+n' being 1 or 2, wherein two of substituents $Q_1$ to $Q_4$ are X with each carbon atom of linker A carrying one group X and one group R wherein X and R might be the same or different at each occurrence.

2. The compound in accordance with claim 1 wherein n+n' is 1.

3. The compound in accordance with claim 1 wherein n+n' is 2.

4. The compound in accordance with claim 1, wherein n' is 1 and Y is a $C_2$-$C_6$ aliphatic group.

5. The compound in accordance with claim 1 wherein in groups X, n is 1, n' is 0, and Y is $CH_2$.

6. An electroneutral compound of general formula (III)

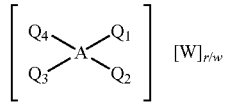
(III)

wherein
A is a tetravalent linker A-5,

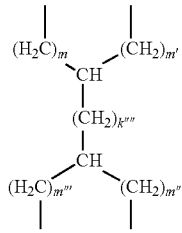 A-5

$Q_1$ to $Q_4$ are identical or different from each other and are selected from the group consisting of R and X, wherein R, which may be the same or different at each occurrence, is a $C_5$-$C_{27}$ aliphatic group, m, m', m" and m''' are 0, k"" is 0, and X, which may be the same or different at each occurrence, is represented by formula II

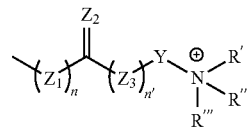 (II)

wherein $Z_1$, $Z_2$ and $Z_3$, which may be the same or different, are O, S or NH, Y is a divalent $C_1$-$C_6$ aliphatic radical, R', R" and R''', which may be the same or different, are hydrogen or a $C_1$ to $C_4$ alkyl group, n and n' are 0 or 1 with the sum of n+n' being 1 or 2, wherein two of substituents $Q_1$ to $Q_4$ are X with each carbon atom of linker A carrying one group X and one group R wherein X and R might be the same or different at each occurrence, W is an anion or an anionic group bearing w negative charges and r is the number of substituents $Q_1$ to $Q_4$ which are represented by a group X.

* * * * *